United States Patent
Pan

(10) Patent No.: US 12,389,474 B1
(45) Date of Patent: Aug. 12, 2025

(54) METHOD AND APPARATUS FOR TRIGGERING SIDELINK RELAY RLC CHANNEL RELEASE IN UE-TO-UE RELAY COMMUNICATION IN A WIRELESS COMMUNICATION SYSTEM

(71) Applicant: ASUS Technology Licensing Inc., Taipei (TW)

(72) Inventor: Li-Te Pan, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 19/073,769

(22) Filed: Mar. 7, 2025

Related U.S. Application Data

(60) Provisional application No. 63/563,025, filed on Mar. 8, 2024.

(51) Int. Cl.
| | | |
|---|---|---|
| *H04W 76/14* | (2018.01) | |
| *H04W 76/20* | (2018.01) | |
| *H04W 76/30* | (2018.01) | |
| H04W 88/04 | (2009.01) | |
| H04W 92/18 | (2009.01) | |

(52) U.S. Cl.
CPC ........... *H04W 76/14* (2018.02); *H04W 76/20* (2018.02); *H04W 76/30* (2018.02); *H04W 88/04* (2013.01); *H04W 92/18* (2013.01)

(58) Field of Classification Search
CPC ..... H04W 76/14; H04W 76/20; H04W 76/30; H04W 88/04; H04W 92/18
See application file for complete search history.

(56) References Cited

U.S. PATENT DOCUMENTS 12,256,457 B1 * 3/2025 Lee-Chee Kuo ..... H04W 88/04

FOREIGN PATENT DOCUMENTS

WO 2023216118 11/2023

OTHER PUBLICATIONS

Fujitsu, "Discussions on U2U relay," 3rd Generation Partnership Project, 3GPP TSG-RAN WG2 Meeting #124, R2-2312007, Nov. 3, 2023 (Year: 2023).*

* cited by examiner

*Primary Examiner* — Thomas R Cairns
(74) *Attorney, Agent, or Firm* — Blue Capital Law Firm, P.C.

(57) ABSTRACT

A method and device for a first end User Equipment (UE) are disclosed. The first end UE establishes a PC5 connection with a relay UE for supporting a UE-to-UE relay communication between the first end UE and a second end UE via the relay UE. The first end UE establishes a first end-to-end Sidelink (SL) Data Radio Bearer (DRB) and associates the first end-to-end SL DRB with a first PC5 Relay Radio Link Control (RLC) channel for supporting the UE-to-UE relay communication, wherein the first PC5 Relay RLC channel is established between the first end UE and the relay UE. The first end UE establishes a second end-to-end SL DRB and associates the second end-to-end SL DRB with a second PC5 Relay RLC channel for supporting the UE-to-UE relay communication, wherein the second PC5 Relay RLC channel is established between the first end UE and the relay UE.

20 Claims, 19 Drawing Sheets

METHOD AND APPARATUS FOR TRIGGERING SIDELINK RELAY RLC CHANNEL RELEASE IN UE-TO-UE RELAY COMMUNICATION IN A WIRELESS COMMUNICATION SYSTEM

CROSS-REFERENCE TO RELATED APPLICATIONS

The present Application claims the benefit of U.S. Provisional Patent Application Ser. No. 63/563,025 filed on Mar. 8, 2024, the entire disclosure of which is incorporated herein in its entirety by reference.

FIELD

This disclosure generally relates to wireless communication networks, and more particularly, to a method and apparatus for triggering sidelink relay Radio Link Control (RLC) channel release in UE-to-UE relay communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for a first end User Equipment (UE) are disclosed. In one embodiment, the first end UE establishes a PC5 connection with a relay UE for supporting a UE-to-UE relay communication between the first end UE and a second end UE via the relay UE. The first end UE also establishes a first end-to-end Sidelink (SL) Data Radio Bearer (DRB) and associates the first end-to-end SL DRB with a first PC5 Relay Radio Link Control (RLC) channel for supporting the UE-to-UE relay communication, wherein the first PC5 Relay RLC channel is established between the first end UE and the relay UE. The first end UE further establishes a second end-to-end SL DRB and associates the second end-to-end SL DRB with a second PC5 Relay RLC channel for supporting the UE-to-UE relay communication, wherein the second PC5 Relay RLC channel is established between the first end UE and the relay UE. In addition, the first end UE determines to serve the first end-to-end SL DRB and the second end-to-end SL DRB with the second PC5 Relay RLC channel. Furthermore, the first end UE, in response to the determination of serving the first end-to-end SL DRB and the second end-to-end SL DRB with the second PC5 Relay RLC channel, releases the first PC5 Relay RLC channel.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP $N_R$ (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 23.304 V18.4.0, "Proximity based Services (ProSe) in the 5G System (5GS) (Release 18)"; TS 38.300 V18.0.0, "NR; NR and NG-RAN Overall Description; Stage 2 (Release 18)"; TS 38.331 V18.0.0, "NR; Radio Resource Control (RRC) protocol specification (Release 18)"; and 3GPP email discussion [Post 125][402][Relay] 38.331 Rel-18 relay CR (Huawei), "Draft_38.331_CR4549r1_(Rel-18)_RRC corrections_v2 Rapp.docx". The standards and documents listed above are hereby expressly incorporated by reference in their entirety.

Figure 1:
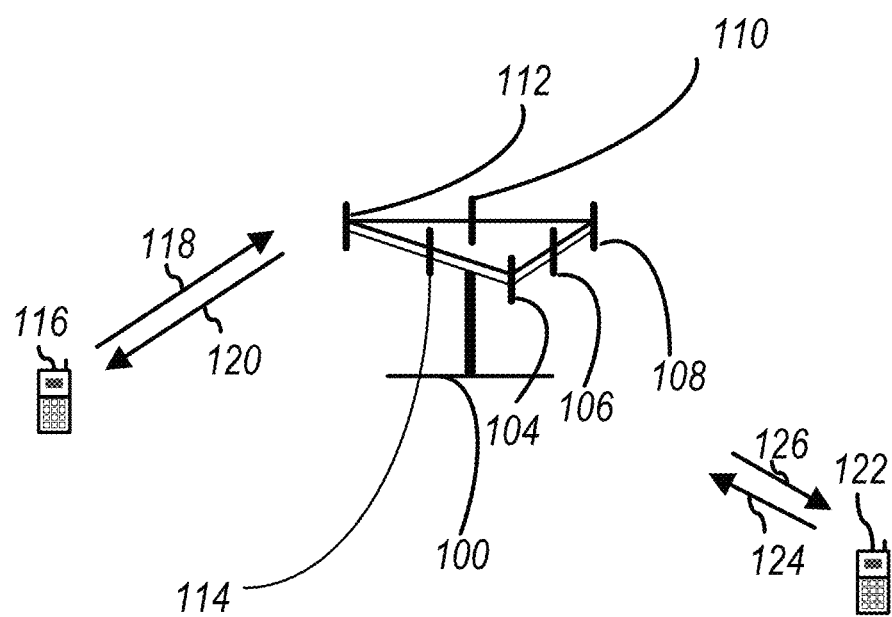
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
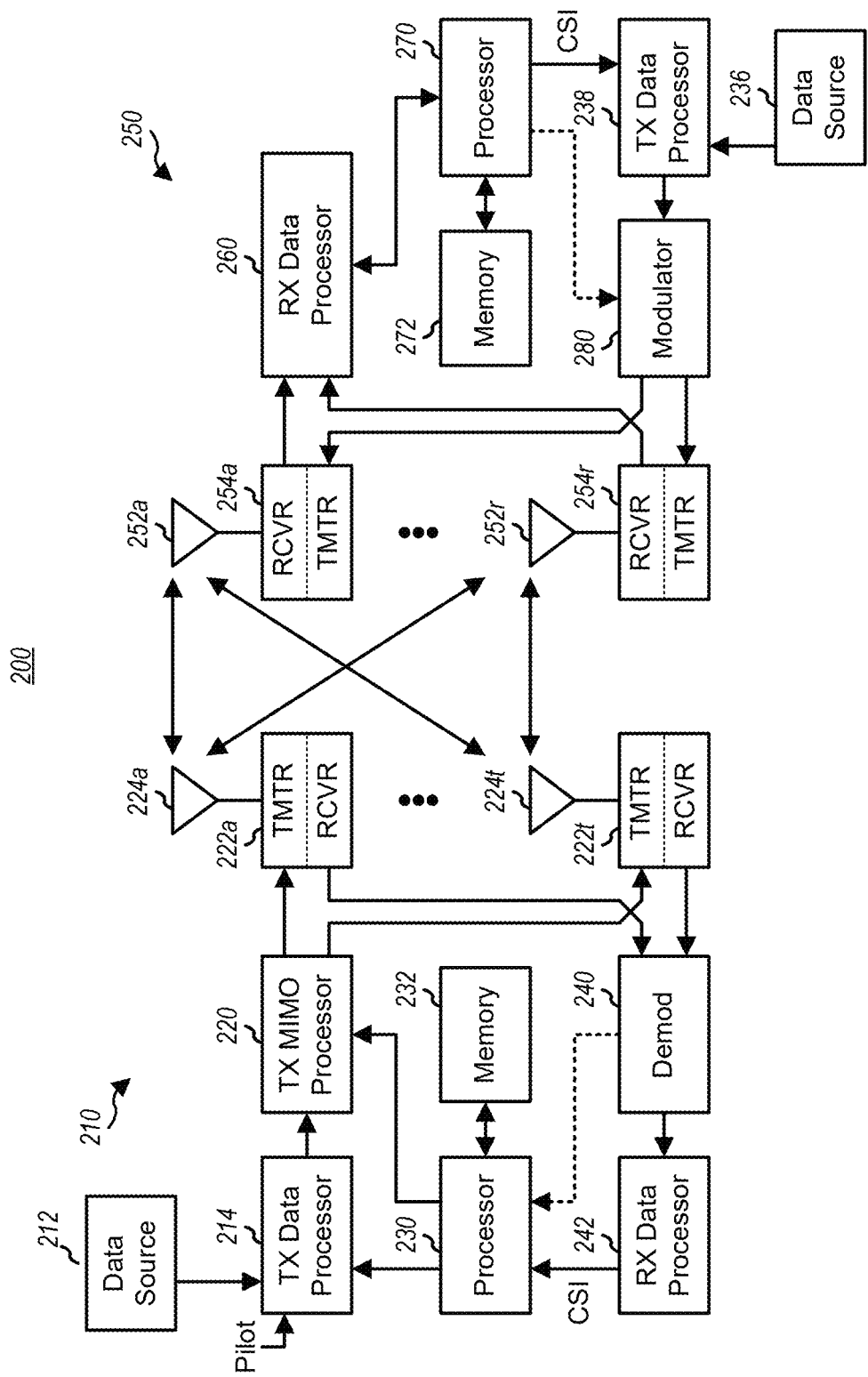
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
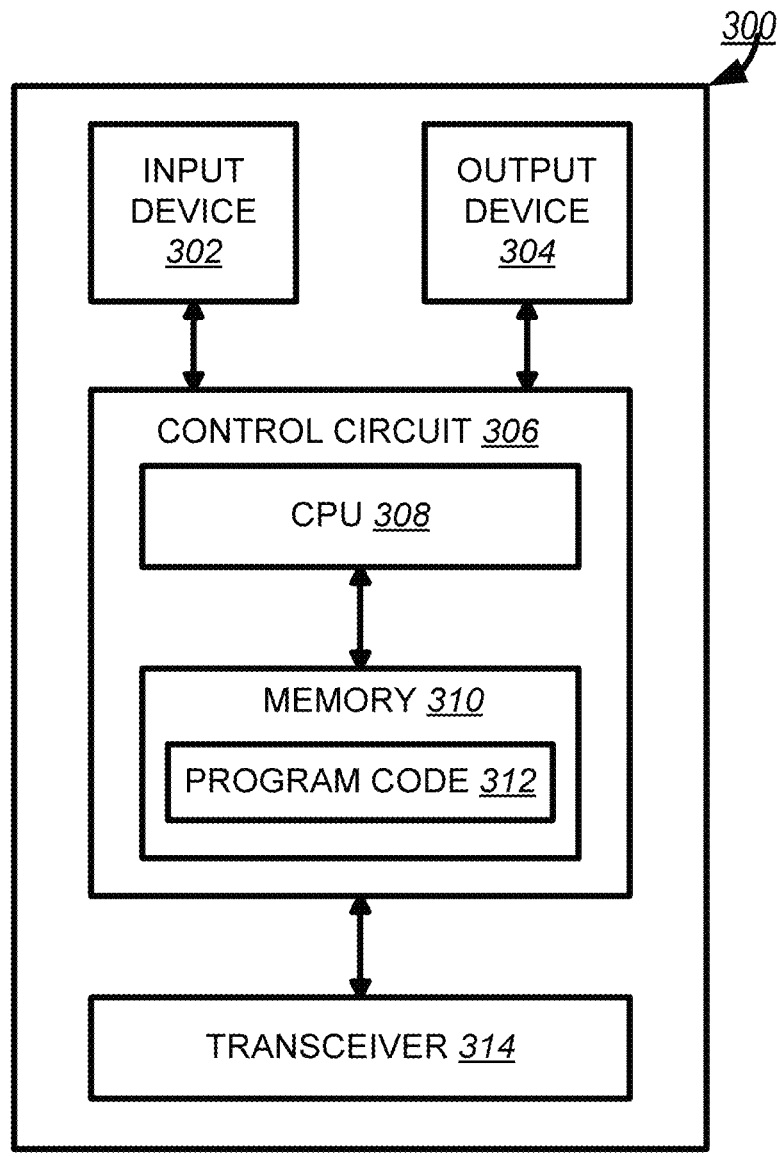
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
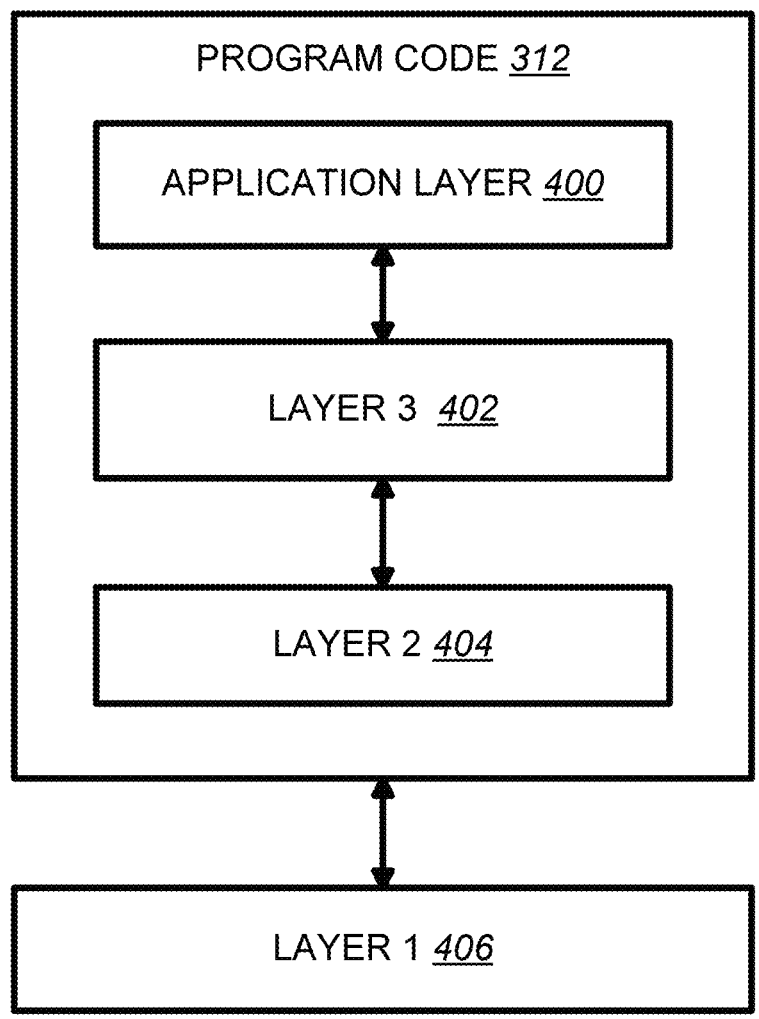
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 23.304 introduced the following:

4.2.8 5G ProSe UE-to-UE Relay Reference Architecture

FIG. 4.2.8-1 shows the Layer-2 and Layer-3 5G ProSe UE-to-UE Relay reference architecture. The 5G ProSe End UEs communicate with each other via a 5G ProSe UE-to-UE Relay.

Figure 5:
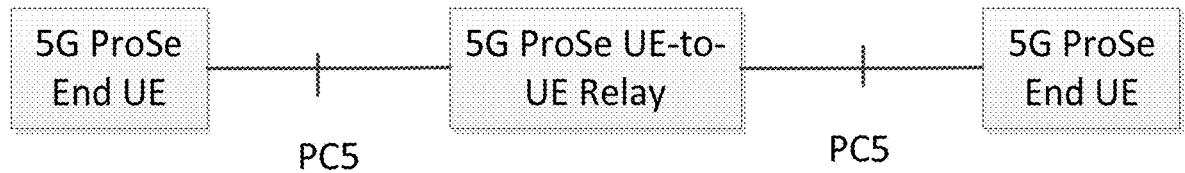
FIG. 5 is a reproduction of FIG. 4.2.8-1 of 3GPP TS 23.304 V18.4.0.

[FIG. 4.2.8-1 of 3GPP TS 23.304 V18.4.0, Entitled "Reference Architecture for 5G ProSe UE-to-UE Relay", is Reproduced as FIG. 5]

Each 5G ProSe End UE and the 5G ProSe UE-to-UE Relay may have subscriptions from the same PLMN or different PLMNs.

[ . . . ]

5.8.4 Identifiers for 5G ProSe UE-to-UE Relay Discovery

5.8.4.1 General

The 5G ProSe UE-to-UE Relay Discovery message contains two sets of identifiers, a Direct Discovery set and a UE-to-UE Relay Discovery set.

The Direct Discovery set of identifiers are part of the contents of the 5G ProSe Direct Discovery message as defined in clause 5.8.1.

The UE-to-UE Relay Discovery set of identifiers contain information to support the discovery of the 5G ProSe UE-to-UE Relay and extensions of the Direct Discovery. 5G ProSe UE-to-UE Relay shall modify the UE-to-UE Relay Discovery set of identifiers and forward the Direct Discovery set and the UE-to-UE Relay Discovery set of identifiers during the discovery procedures.

5.8.4.2 Common Identifiers for 5G ProSe UE-to-UE Relay Discovery

The following parameters are used for the 5G ProSe UE-to-UE Relay Discovery Announcement message (Model A), where Source Layer-2 ID and Destination Layer-2 ID are used for sending and receiving the message and User Info ID and Relay Service Code are contained in the message:

Source Layer-2 ID: the 5G ProSe UE-to-UE Relay self-selects a Source Layer-2 ID for 5G ProSe UE-to-UE Relay Discovery Announcement message.

Destination Layer-2 ID: the Destination Layer-2 ID for 5G ProSe UE-to-UE Relay Discovery Announcement message is selected based on the configuration as described in clause 5.1.5.1.

User Info ID of 5G ProSe UE-to-UE Relay: provides information about the 5G ProSe UE-to-UE Relay.

list of User Info ID of 5G ProSe End UE: provides information about the 5G ProSe End UE.

Relay Service Code: information to indicate the connectivity service the 5G ProSe UE-to-UE Relay provides to 5G ProSe End UEs.

The following parameters are used for the 5G ProSe UE-to-UE Relay Discovery Solicitation message (Model B) between discoverer 5G ProSe End UE and 5G ProSe UE-to-UE Relay, where Source Layer-2 ID and Destination Layer-2 ID are used for sending and receiving the message and User Info ID and Relay Service Code are contained in the message:

Source Layer-2 ID: the discoverer 5G ProSe End UE self-selects a Source Layer-2 ID for 5G ProSe UE-to-UE Relay Discovery Solicitation message.

Destination Layer-2 ID: the Destination Layer-2 ID for 5G ProSe UE-to-UE Relay Discovery Solicitation message is selected based on the configuration as described in clause 5.1.5.1.

User Info ID of discoverer 5G ProSe End UE: provides information about the discoverer 5G ProSe End UE.

User Info ID of discoveree 5G ProSe End UE: provides information about the discoveree 5G ProSe End UE.

Relay Service Code: information about connectivity service that the discoverer 5G ProSe End UE is interested in.

The following parameters are used in the 5G ProSe UE-to-UE Relay Discovery Response message (Model B) between discoverer 5G ProSe End UE and 5G ProSe UE-to-UE Relay, where Source Layer-2 ID and Destination Layer-2 ID are used for sending and receiving the message and User Info ID and Relay Service Code are contained in the message:

Source Layer-2 ID: the 5G ProSe UE-to-UE Relay self-selects a Source Layer-2 ID for 5G ProSe UE-to-UE Relay Discovery Response message.

Destination Layer-2 ID: set to the Source Layer-2 ID of the received 5G ProSe UE-to-UE Relay Discovery Solicitation message.

User Info ID of discoveree 5G ProSe End UE: provides information about the discoveree 5G ProSe End UE.

User Info ID of 5G ProSe UE-to-UE Relay: provides information about the 5G ProSe UE-to-UE Relay.

Relay Service Code: identifies the connectivity service the 5G ProSe UE-to-UE Relay provides to 5G ProSe End UEs that matches the Relay Service Code from the corresponding Discovery Solicitation message.

The following parameters are used for the 5G ProSe UE-to-UE Relay Discovery Solicitation message (Model B) between 5G ProSe UE-to-UE Relay and discoveree 5G ProSe End UE, where Source Layer-2 ID and Destination Layer-2 ID are used for sending and receiving the message and User Info ID and Relay Service Code are contained in the message:

Source Layer-2 ID: the 5G ProSe UE-to-UE Relay self-selects a Source Layer-2 ID for 5G ProSe UE-to-UE Relay Discovery Solicitation message.

Destination Layer-2 ID: the Destination Layer-2 ID for 5G ProSe UE-to-UE Relay Discovery Solicitation message is selected based on the configuration as described in clause 5.1.5.1.

User Info ID of discoverer 5G ProSe End UE: provides information about the discoverer 5G ProSe End UE.

User Info ID of discoveree 5G ProSe End UE: provides information about the discoveree 5G ProSe End UE.

User Info ID of 5G ProSe UE-to-UE Relay: provides information about the 5G ProSe UE-to-UE Relay.

Relay Service Code: identifies the connectivity service the 5G ProSe UE-to-UE Relay provides to 5G ProSe End UEs.

The following parameters are used in the 5G ProSe UE-to-UE Relay Discovery Response message (Model B) between 5G ProSe UE-to-UE Relay and discoveree 5G ProSe End UE, where Source Layer-2 ID and Destination Layer-2 ID are used for sending and receiving the message and User Info ID and Relay Service Code are contained in the message:

Source Layer-2 ID: the discoveree 5G ProSe End UE self-selects a Source Layer-2 ID for 5G ProSe UE-to-UE Relay Discovery Response message.

Destination Layer-2 ID: set to the Source Layer-2 ID of the received 5G ProSe UE-to-UE Relay Discovery Solicitation message.

User Info ID of discoveree 5G ProSe End UE: provides information about the discoveree 5G ProSe End UE.

User Info ID of discoverer 5G ProSe End UE: provides information about the discoverer 5G ProSe End UE.

Relay Service Code: identifies the connectivity service the 5G ProSe UE-to-UE Relay provides to 5G ProSe End UEs that matches the Relay Service Code from the corresponding Discovery Solicitation message.

NOTE: The UE implementation needs to ensure that when the UE self-selects Source Layer-2 IDs, the self-selected Source Layer-2 IDs are different between 5G ProSe Direct Discovery (including 5G ProSe UE-to-Network Relay Discovery and 5G ProSe UE-to-UE Relay Discovery) in clause 6.3.2 and 5G ProSe Direct Communication (including 5G ProSe UE-to-Network Relay Communication and 5G ProSe UE-to-UE Relay Communication) in clause 6.4, 6.5 and 6.7 and are different from any other provisioned Destination Layer-2 IDs as described in clause 5.1 and any other self-selected Source Layer-2 IDs used in a simultaneous 5G ProSe Direct Discovery (including 5G ProSe UE-to-Network Relay Discovery and 5G ProSe UE-to-UE Relay Discovery) with a different discovery model.

5.8.5 Identifiers for 5G ProSe UE-to-UE Relay Communication with Integrated Discovery For the broadcast Direct Communication Request message over the first hop PC5 reference point, the Source Layer-2 ID is self-selected by the source 5G ProSe End UE and the Destination Layer-2 ID is selected based on the configuration as described in clause 5.1.

For the broadcast Direct Communication Request message over the second hop PC5 reference point, the Source Layer-2 ID is self-selected by the 5G ProSe UE-to-UE Relay and the Destination Layer-2 ID is selected based on the configuration as described in clause 5.1.

5G ProSe UE-to-UE Relay may send a unicast Direct Communication Request message to the target 5G ProSe End UE by setting the Destination Layer-2 ID with a received unicast Destination Layer-2 ID of the target 5G ProSe End UE as specified in clause 6.4.3.7. The Source Layer-2 ID is self-selected by the 5G ProSe UE-to-UE Relay.

For unicast Direct Communication Accept message, the Source Layer-2 ID is self-selected by the target 5G ProSe End UE or 5G ProSe UE-to-UE Relay.

[ . . . ]

6.3.2.4 5G ProSe UE-to-UE Relay Discovery 6.3.2.4.1 General

5G ProSe UE-to-UE Relay Discovery is applicable to both 5G ProSe Layer-3 and Layer-2 UE-to-UE Relay Discovery for public safety use and commercial services. To perform 5G ProSe UE-to-UE Relay Discovery, the 5G ProSe End UE and the 5G ProSe UE-to-UE Relay are pre-configured or provisioned with the related information as described in clause 5.1.

A Relay Service Code (RSC) is used in the 5G ProSe UE-to-UE Relay Discovery, to indicate the connectivity service the 5G ProSe UE-to-UE Relay provides to 5G ProSe End UEs. The RSCs are pre-configured or provisioned on the 5G ProSe UE-to-UE Relay and the 5G ProSe End UE as defined in clause 5.1. The 5G ProSe UE-to-UE Relay and the 5G ProSe End UE are aware of whether a RSC is offering 5G ProSe Layer-2 or Layer-3 UE-to-UE Relay service based on the UE-to-UE Relay Layer indicator as specified in clause 5.1. A 5G ProSe UE-to-UE Relay supporting multiple RSCs advertises the RSCs using multiple discovery messages, with one RSC per discovery message.

6.3.2.4.2 Procedure for 5G ProSe UE-to-UE Relay Discovery with Model A

Figure 6:
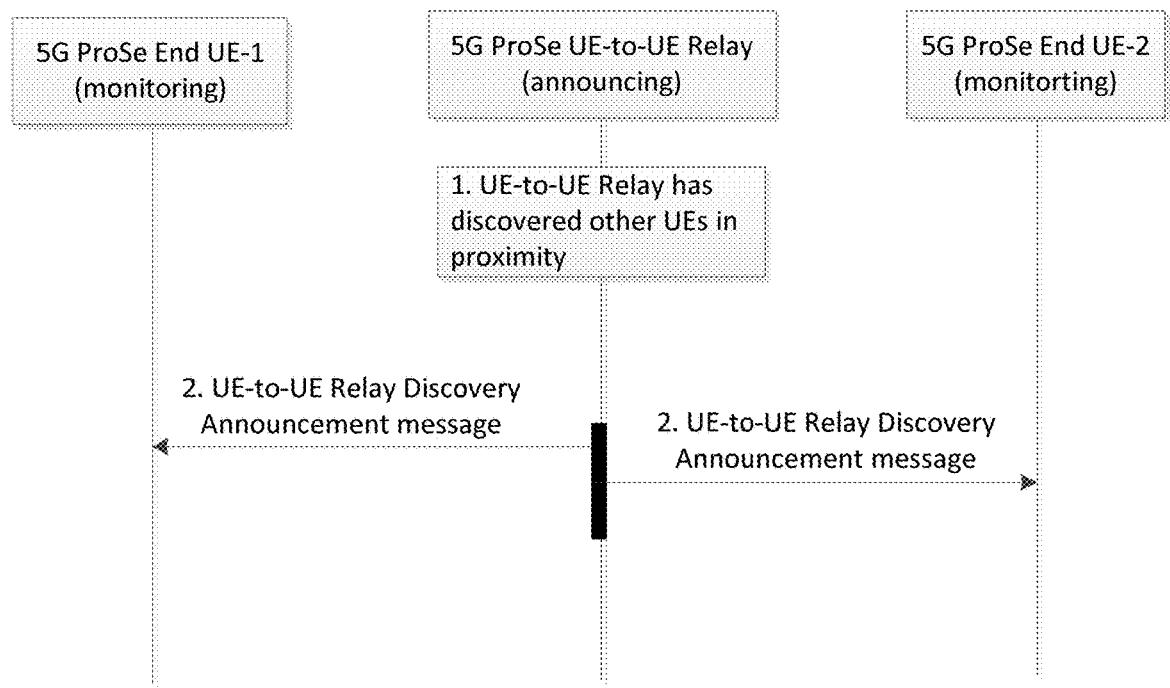
FIG. 6 is a reproduction of FIG. 6.3.2.4.2-1 of 3GPP TS 23.304 V18.4.0.

Depicted in FIG. 6.3.2.4.2-1 is the procedure for 5G ProSe UE-to-UE Discovery with Model A.

[FIG. 6.3.2.4.2-1 of 3GPP TS 23.304 V18.4.0, Entitled "5G ProSe UE-to-UE Relay Discovery with Model A", is Reproduced as FIG. 6]

1. The 5G ProSe UE-to-UE Relay has discovered other UEs in proximity (e.g. via a previous 5G ProSe UE-to-UE Relay Discovery or 5G ProSe UE-to-UE Relay Communication procedures). The 5G ProSe UE-to-UE Relay obtains the User Info ID of other UEs in proximity per RSC.

2. The 5G ProSe UE-to-UE Relay sends a UE-to-UE Relay Discovery Announcement message. The UE-to-UE Relay Discovery Announcement message contains the Type of Discovery Message, User Info ID of the 5G ProSe UE-to-UE Relay, RSC and list of User Info ID of the 5G ProSe End UEs supporting the RSC. The UE-to-UE Relay Discovery Announcement message is sent using the Source Layer-2 ID and Destination Layer-2 ID as described in clause 5.8.4.

The 5G ProSe UE-to-UE Relay shall only announce User Info IDs of other UEs in proximity that did not include an Announce Prohibited Indication when they were previously discovered.

NOTE: 5G ProSe UE-to-UE Relay announces User Info IDs of other UEs in proximity only if their PC5 signal strength measured by the 5G ProSe UE-to-UE Relay is above configured signal strength threshold as specified in TS 38.331 [16].

A 5G ProSe End UE monitors announcement messages from a 5G ProSe UE-to-UE Relay. The 5G ProSe End UEs determine the Destination Layer-2 ID for signalling reception as specified in clause 5.1.

6.3.2.4.3 Procedure for 5G ProSe UE-to-UE Relay Discovery with Model B

Depicted in FIG. 6.3.2.4.3-1 is the procedure for 5G ProSe UE-to-UE Relay Discovery with Model B.

Figure 7:
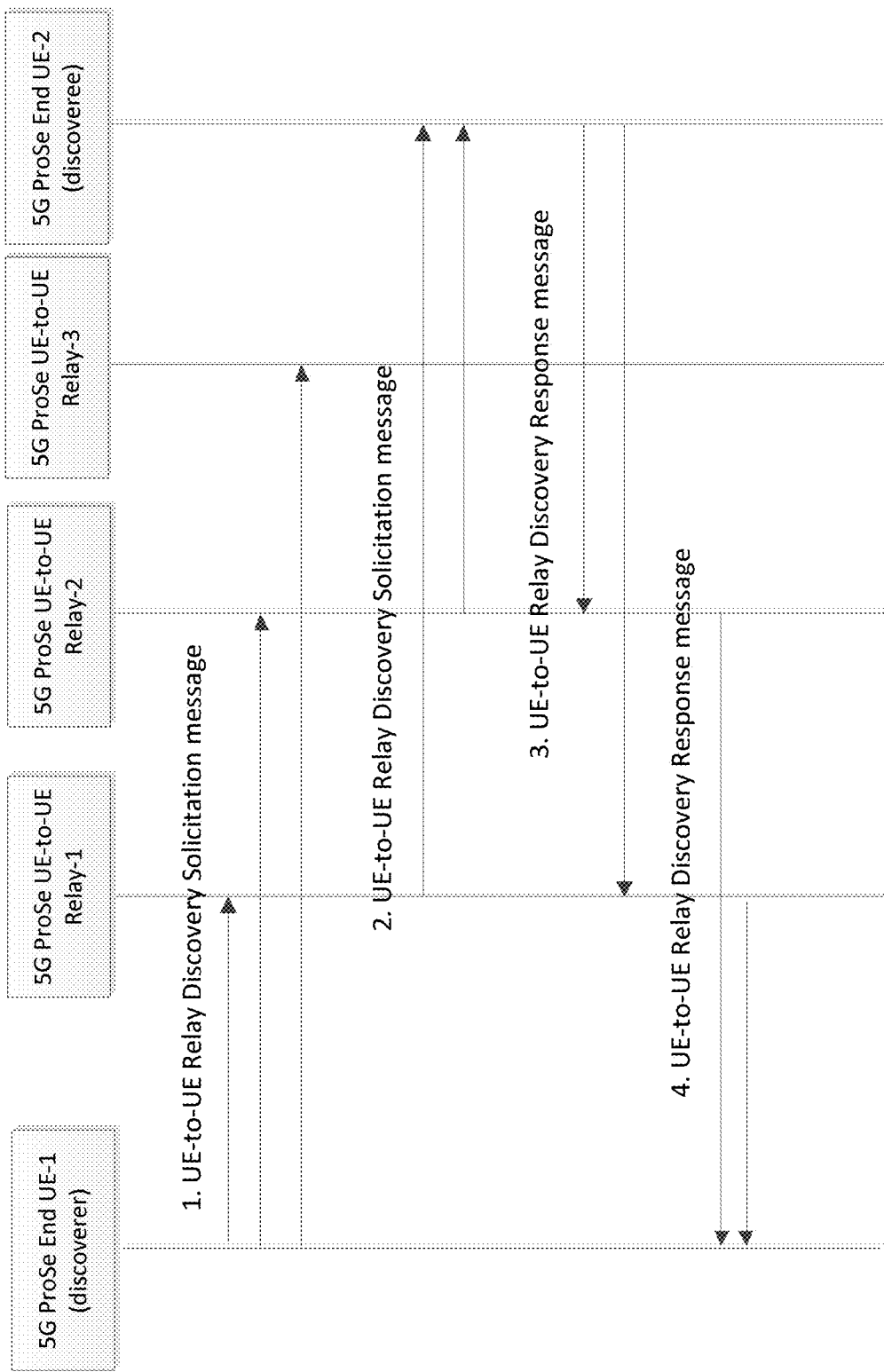
FIG. 7 is a reproduction of FIG. 6.3.2.4.3-1 of 3GPP TS 23.304 V18.4.0.

[FIG. 6.3.2.4.3-1 of 3GPP TS 23.304 V18.4.0, Entitled "5G ProSe UE-to-UE Relay Discovery with Model B", is Reproduced as FIG. 7]

1. The discoverer 5G ProSe End UE (UE-1) sends a 5G ProSe UE-to-UE Relay Discovery Solicitation message. The 5G ProSe UE-to-UE Relay Discovery Solicitation message contains the Type of Discovery Message, User Info ID of itself, RSC and User Info ID of the discoveree 5G ProSe End UE (UE-2) and is sent using the Source Layer-2 ID and Destination Layer-2 ID as described in clause 5.8.4.

A 5G ProSe UE-to-UE Relay determines the Destination Layer-2 ID for signalling reception as specified in clause 5.1.

The discoverer 5G ProSe End UE may include an Announce Prohibited Indication in the UE-to-UE Relay Discovery Solicitation message. If a 5G ProSe UE-to-UE Relay receives a Relay Discovery Solicitation message with an Announce Prohibited Indication it does not consider the 5G ProSe End UE as discovered during this procedure for inclusion in 5G ProSe UE-to-UE Relay Discovery with Model A, see clause 6.3.2.4.2, step 1.

2. If the RSC contained in the solicitation message matches any of the (pre) configured RSC(s), as specified in clause 5.1.5.1, of a 5G ProSe UE-to-UE Relay, the 5G ProSe UE-to-UE Relay sends a 5G ProSe UE-to-UE Relay Discovery Solicitation message. The 5G ProSe UE-to-UE Relay Discovery Solicitation message contains the Type of Discovery Message, User Info ID of the discoverer 5G ProSe End UE (UE-1), User Info ID of UE-to-UE Relay, RSC and User Info ID of the discoveree 5G ProSe End UE (UE-2) and is sent using the Source Layer-2 ID and Destination Layer-2 ID as described in clause 5.8.4.

A 5G ProSe End UE determines the Destination Layer-2 ID for signalling reception as specified in clause 5.1.

3. If the RSC contained in the solicitation message matches any of the (pre) configured RSC(s), as specified in clause 5.1.5.1, of the discoveree 5G ProSe End UE (UE-2), and the discoveree 5G ProSe End UE (UE-2) matches the User Info ID of the discoveree 5G ProSe End UE (UE-2) contained in the solicitation message, then the discoveree 5G ProSe End UE (UE-2) responds to the 5G ProSe UE-to-UE Relay with a 5G ProSe UE-to-UE Relay Discovery Response message. The 5G ProSe UE-to-UE Relay Discovery Response message contains the Type of Discovery Message, RSC, User Info ID of the discoverer 5G ProSe End UE (UE-1) and User Info ID of discoveree 5G ProSe End UE (UE-2) and is sent using the Source Layer-2 ID and Destination Layer-2 ID as described in clause 5.8.4. If the discoveree 5G ProSe End UE (UE-2) receives multiple UE-to-UE Relay Discovery Solicitation messages from different 5G ProSe UE-to-UE Relays with the same RSC and the User Info ID of the discoveree 5G ProSe End UE (UE-2), it may choose to respond or not to a 5G ProSe UE-to-UE Relay (e.g. based on the PC5 signal strength of each message received).

The discoveree 5G ProSe End UE may include an Announce Prohibited Indication in the UE-to-UE Relay Discovery Response message. If a 5G ProSe UE-to-UE Relay receives a Relay Discovery Response message with an Announce Prohibited Indication it does not consider the 5G ProSe End UE as discovered during this procedure for inclusion in 5G ProSe UE-to-UE Relay Discovery with Model A, see clause 6.3.2.4.2, step 1.

4. The 5G ProSe UE-to-UE Relay sends a 5G ProSe UE-to-UE Relay Discovery Response message. The 5G ProSe UE-to-UE Relay Discovery Response message contains the Type of Discovery Message, User Info ID of UE-to-UE Relay, RSC, User Info ID of the discoverer 5G ProSe End UE (UE-1) and User Info ID of the discoveree 5G ProSe End UE (UE-2) and is sent using the Source Layer-2 ID and Destination Layer-2 ID as described in clause 5.8.4.

6.3.2.4.4 Candidate 5G ProSe UE-to-UE Relay Discovery

This procedure for candidate 5G ProSe UE-to-UE Relay Discovery to support the negotiated Relay reselection as described in clause 6.7.4 when the discoverer End UE discovers a candidate 5G ProSe UE-to-UE Relay.

The procedure for 5G ProSe UE-to-UE Relay Discovery with Model B (see clause 6.3.2.4.3) is used with the following differences:

Step 1: In the 5G ProSe UE-to-UE Relay Discovery Solicitation message the RSC and the User Info ID of a candidate 5G ProSe UE-to-UE Relay are included, and the discoveree 5G ProSe End UE User Info ID is not included. If the 5G ProSe End UE receives the Layer-2 ID of the candidate 5G ProSe UE-to-UE Relay in a Link Modification Request message, it may set the Layer-2 ID of the candidate 5G ProSe UE-to-UE Relay as the Destination Layer-2 ID.

NOTE: The User Info ID of the candidate 5G ProSe UE-to-UE Relay and the User Info ID of the discoveree 5G ProSe End UE can be distinguished by the 5G ProSe UE-to-UE Relay as different IEs in the message.

Step 2 and step 3 are skipped because the discoveree 5G ProSe End UE User Info ID is absent, and the User Info ID of the candidate 5G ProSe UE-to-UE Relay in the received 5G ProSe UE-to-UE Relay Discovery Solicitation message matches that of the 5G ProSe UE-to-UE Relay.

Step 4: If a 5G ProSe UE-to-UE Relay matches the User Info ID of a candidate 5G ProSe UE-to-UE Relay received in the 5G ProSe UE-to-UE Relay Discovery Solicitation then it sends the 5G ProSe UE-to-UE Relay Discovery Response (with the RSC received in step 1) and does not include the User Info ID of the discoveree 5G ProSe End UE.

[ . . . ]

6.4.3 Unicast Mode 5G ProSe Direct Communication

6.4.3.1 Layer-2 Link Establishment Over PC5 Reference Point

To perform unicast mode of ProSe Direct communication over PC5 reference point, the UE is configured with the related information as described in clause 5.1.3.

FIG. 6.4.3.1-1 shows the layer-2 link establishment procedure for the unicast mode of ProSe Direct communication over PC5 reference point.

Figure 8:
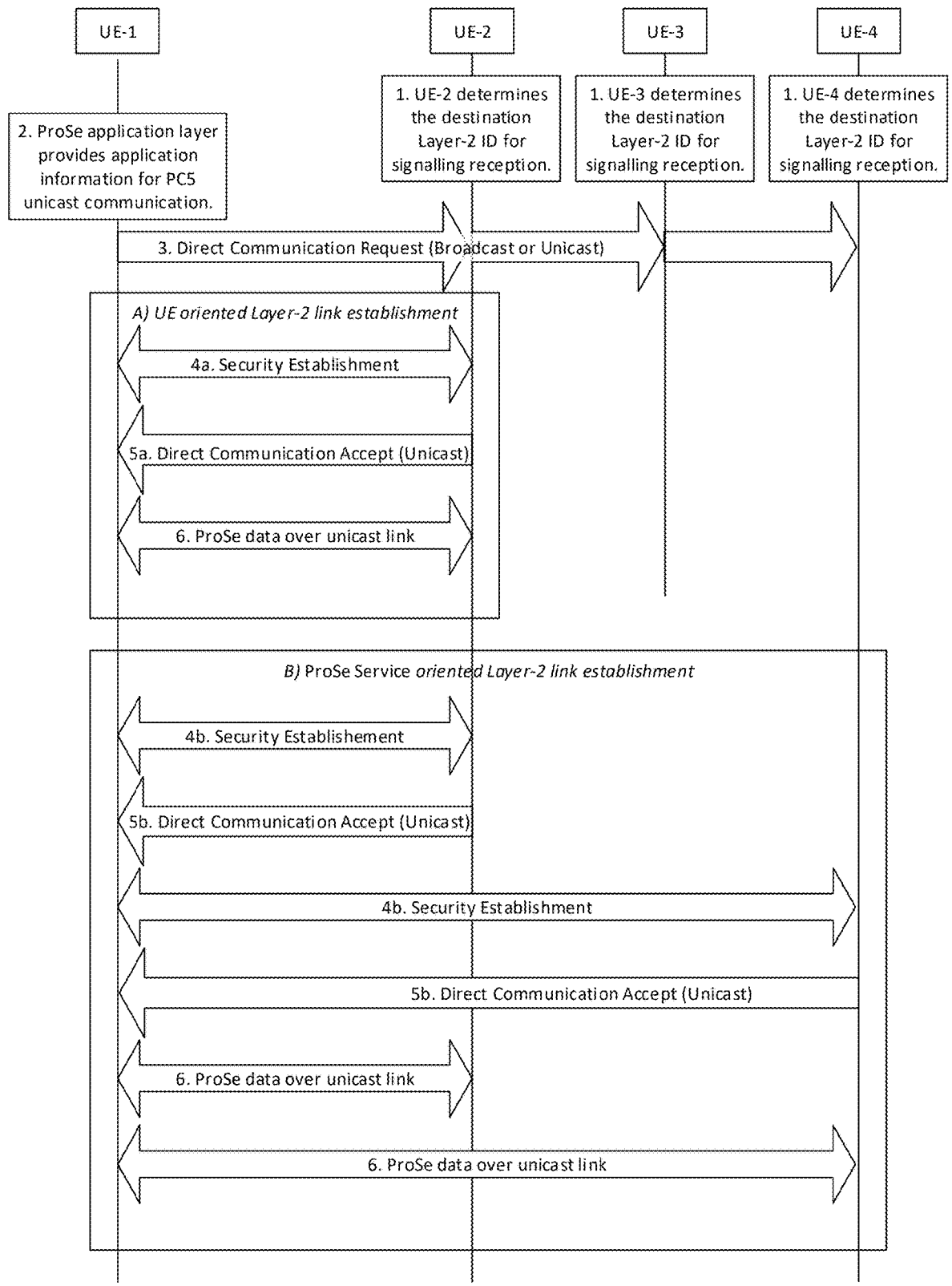
FIG. 8 is a reproduction of FIG. 6.4.3.1-1 of 3GPP TS 23.304 V18.4.0.

[FIG. 6.4.3.1-1 of 3GPP TS 23.304 V18.4.0, Entitled "Layer-2 Link Establishment Procedure", is Reproduced as FIG. 8]

1. The UE(s) determine the destination Layer-2 ID for signalling reception for PC5 unicast link establishment as specified in clause 5.8.2.4.
2. The ProSe application layer in UE-1 provides application information for PC5 unicast communication. The application information includes the ProSe Service Info, UE's Application Layer ID. The target UE's Application Layer ID may be included in the application information.
   The ProSe application layer in UE-1 may provide ProSe Application Requirements for this unicast communication. UE-1 determines the PC5 QOS parameters and PFI as specified in clause 5.6.1.
   If UE-1 decides to reuse the existing PC5 unicast link as specified in clause 5.3.4, the UE triggers the Layer-2 link modification procedure as specified in clause 6.4.3.4.
3. UE-1 sends a Direct Communication Request message to initiate the unicast layer-2 link establishment procedure. The Direct Communication Request message includes:
   Source User Info: the initiating UE's Application Layer ID (i.e. UE-1's Application Layer ID).
   If the ProSe application layer provided the target UE's Application Layer ID in step 2, the following information is included:
      Target User Info: the target UE's Application Layer ID (i.e. UE-2's Application Layer ID).
   ProSe Service Info: the information about the ProSe identifier(s) requesting Layer-2 link establishment.
   Security Information: the information for the establishment of security.
NOTE 1: The Security Information and the necessary protection of the Source User Info and Target User Info are defined in TS 33.503 [29].
   The source Layer-2 ID and destination Layer-2 ID used to send the Direct Communication Request message are determined as specified in clauses 5.8.2.1 and 5.8.2.4. The destination Layer-2 ID may be broadcast or unicast Layer-2 ID. When unicast Layer-2 ID is used, the Target User Info shall be included in the Direct Communication Request message.
   UE-1 sends the Direct Communication Request message via PC5 broadcast or unicast using the source Layer-2 ID and the destination Layer-2 ID.
   A default PC5 DRX configuration may be used for transmitting and receiving of this message (see TS 38.300 [12]).
4. Security with UE-1 is established as below:
   4a. If the Target User Info is included in the Direct Communication Request message, the target UE, i.e. UE-2, responds by establishing the security with UE-1.
   4b. If the Target User Info is not included in the Direct Communication Request message, the UEs that are interested in using the announced ProSe Service(s) over a PC5 unicast link with UE-1 responds by establishing the security with UE-1.
NOTE 2: The signalling for the Security Procedure is defined in TS 33.503 [29].
   When the security protection is enabled, UE-1 sends the following information to the target UE:
   If IP communication is used:
      IP Address Configuration: For IP communication, IP address configuration is required for this link and indicates one of the following values:
         "DHCPv4 server" if only IPv4 address allocation mechanism is supported by the initiating UE, i.e., acting as a DHCPv4 server; or
         "IPv6 Router" if only IPV6 address allocation mechanism is supported by the initiating UE, i.e., acting as an IPV6 Router; or
         "DHCPv4 server & IPv6 Router" if both IPv4 and IPV6 address allocation mechanism are supported by the initiating UE; or
         "address allocation not supported" if neither IPv4 nor IPv6 address allocation mechanism is supported by the initiating UE.
      Link-Local IPv6 Address: a link-local IPv6 address formed locally based on RFC 4862 if UE-1 does not support the IPV6 IP address allocation mechanism, i.e. the IP Address Configuration indicates "address allocation not supported".
   QoS Info: the information about PC5 QoS Flow(s). For each PC5 QoS Flow, the PFI and the corresponding PC5 QoS parameters (i.e. PQI and conditionally other parameters such as MFBR/GFBR, etc.) and optionally the associated ProSe identifier(s).
   Optional PC5 QoS Rule(s).
   The source Layer-2 ID used for the security establishment procedure is determined as specified in clauses 5.8.2.1 and 5.8.2.4. The destination Layer-2 ID is set to the source Layer-2 ID of the received Direct Communication Request message.
   Upon receiving the security establishment procedure messages, UE-1 obtains the peer UE's Layer-2 ID for future communication, for signalling and data traffic for this unicast link.
5. A Direct Communication Accept message is sent to UE-1 by the target UE(s) that has successfully established security with UE-1:
   5a. (UE oriented Layer-2 link establishment) If the Target User Info is included in the Direct Communication Request message, the target UE, i.e. UE-2 responds with a Direct Communication Accept message if the Application Layer ID for UE-2 matches.
   5b. (ProSe Service oriented Layer-2 link establishment) If the Target User Info is not included in the Direct Communication Request message, the UEs that are interested in using the announced ProSe Service(s) respond to the request by sending a Direct Communication Accept message (UE-2 and UE-4 in FIG. 6.4.3.1-1).

The Direct Communication Accept message includes:
Source User Info: Application Layer ID of the UE sending the Direct Communication Accept message.
QOS Info: the information about PC5 QOS Flow(s). For each PC5 QoS Flow, the PFI and the corresponding PC5 QoS parameters requested by UE-1 (i.e. PQI and conditionally other parameters such as MFBR/GFBR, etc.) and optionally the associated ProSe identifiers(s).
Optional PC5 QoS Rule(s).
If IP communication is used:
IP Address Configuration: For IP communication, IP address configuration is required for this link and indicates one of the following values:
"DHCPv4 server" if only IPv4 address allocation mechanism is supported by the target UE, i.e., acting as a DHCPv4 server; or
"IPv6 Router" if only IPv6 address allocation mechanism is supported by the target UE, i.e., acting as an IPV6 Router; or
"DHCPv4 server & IPV6 Router" if both IPv4 and IPV6 address allocation mechanism are supported by the target UE; or
"address allocation not supported" if neither IPv4 nor IPv6 address allocation mechanism is supported by the target UE.
Link-Local IPv6 Address: a link-local IPv6 address formed locally based on RFC 4862 if the target UE does not support the IPV6 IP address allocation mechanism, i.e. the IP Address Configuration indicates "address allocation not supported" and UE-1 included a link-local IPV6 address in the security establishment in step 4. The target UE shall include a non-conflicting link-local IPv6 address.
If both UEs (i.e. the initiating UE and the target UE) are selected to use link-local IPV6 address, they shall disable the duplicate address detection defined in RFC 4862 [17].
NOTE 3: When either the initiating UE or the target UE indicates the support of IPV6 routing, the corresponding address configuration procedure would be carried out after the establishment of the layer 2 link and the link-local IPv6 addresses are ignored.
The ProSe layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.
Two UEs may negotiate the PC5 DRX configuration in the AS layer and the PC5 DRX parameter values can be configured per pair of source and destination Layer-2 IDs in the AS layer.
6. ProSe data is transmitted over the established unicast link as below:
The PC5 Link Identifier and PFI are provided to the AS layer, together with the ProSe data. Optionally in addition, the Layer-2 ID information (i.e. source Layer-2 ID and destination Layer-2 ID) is provided to the AS layer.
NOTE 4: It is up to UE implementation to provide the Layer-2 ID information to the AS layer. UE-1 sends the ProSe data using the source Layer-2 ID (i.e. UE-1's Layer-2 ID for this unicast link) and the destination Layer-2 ID (i.e. the peer UE's Layer-2 ID for this unicast link).
NOTE 5: PC5 unicast link is bi-directional, therefore the peer UE of UE-1 can send the ProSe data to UE-1 over the unicast link with UE-1.
[ . . . ]

6.4.3.2 Link Identifier Update for a Unicast Link

FIG. 6.4.3.2-1 shows the link identifier update procedure for a unicast link. When privacy requirements are configured for a ProSe Identifier associated with the unicast link, identifiers used for the unicast mode of 5G ProSe communication over PC5 reference point (e.g. Application Layer ID, Source Layer-2 ID and IP address/prefix) shall be changed over time as specified in clauses 5.8.2.1 and 5.8.2.4. A UE may decide to change the identifiers for other reasons, e.g. application layer requirement. This procedure is used to update and exchange new identifiers between the source and the peer UEs for a unicast link before using the new identifiers, to prevent service interruptions. When there are privacy requirements as indicated above, this procedure is executed over a security protected unicast link.

If a UE has multiple unicast links using the same Application Layer IDs or Layer-2 IDs, the UE needs to perform the link identifier update procedure over each of the unicast links.

Figure 9:
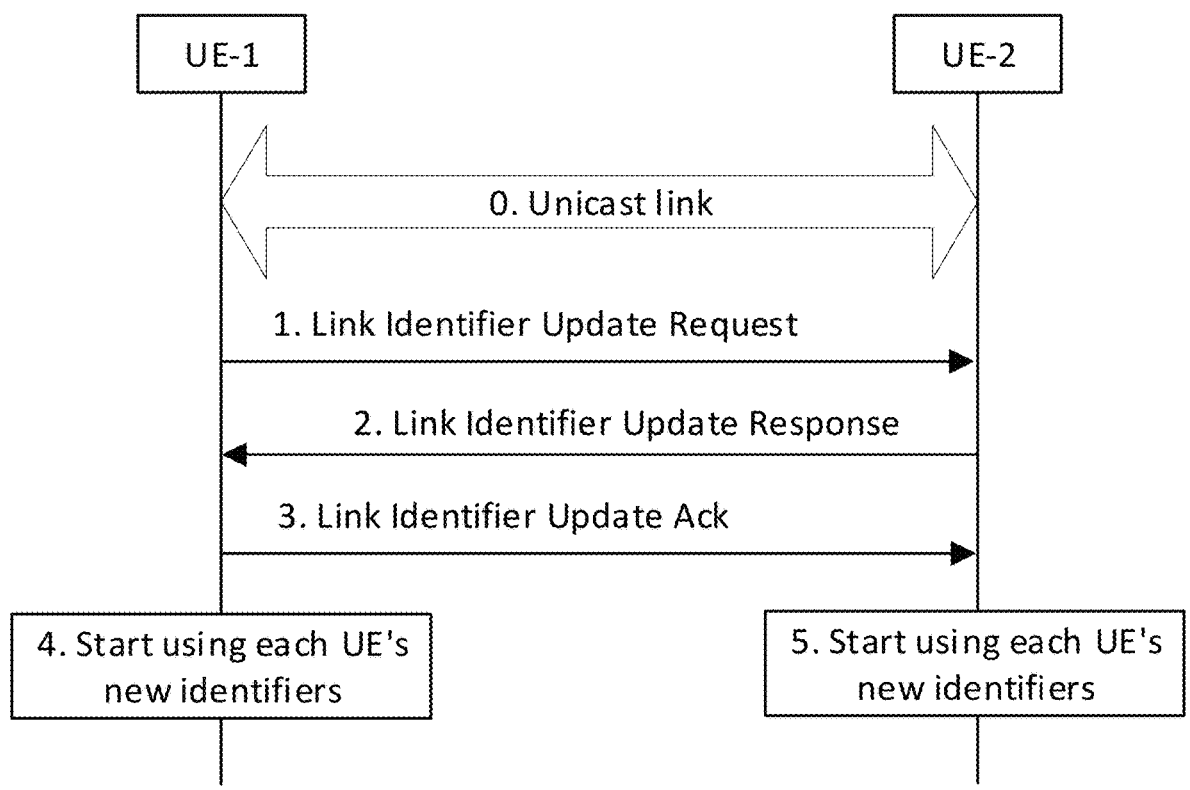
FIG. 9 is a reproduction of FIG. 6.4.3.2-1 of 3GPP TS 23.304 V18.4.0.

[FIG. 6.4.3.2-1 of 3GPP TS 23.304 V18.4.0, Entitled "Link Identifier Update Procedure", is Reproduced as FIG. 9]

0. UE-1 and UE-2 have a unicast link established as described in clause 6.4.3.1.
1. UE-1 decides to change its identifier(s), e.g. due to the Application Layer ID change or upon expiry of a timer. UE-1 generates its new Layer-2 ID and sends a Link Identifier Update Request message to UE-2 using the old identifiers.
   The Link Identifier Update Request message includes the new identifier(s) to use (including the new Layer-2 ID, Security Information, optionally the new Application Layer ID and optionally new IP address/prefix if IP communication is used). The new identifier(s) shall be cyphered to protect privacy if security is configured for the unicast link. After sending the Link Identifier Update Request message, if the UE-1 has data to send, UE-1 keeps sending data traffic to UE-2 with the old identifiers until UE-1 sends the Link Identifier Update Ack message to UE-2.
NOTE 1: The timer is running on per Source Layer-2 ID.
NOTE 2: When one of the two UEs acts as IPV6 router as described in clause 5.5.1.1 and the IP address/prefix also needs to be changed, the corresponding address configuration procedure would be carried out after the Link Identifier update procedure.
2. Upon reception of the Link Identifier Update Request message, UE-2 changes its identifier(s). UE-2 responds with a Link Identifier Update Response message which includes the new identifier(s) to use (including the new Layer-2 ID, Security Information, optionally the new Application Layer ID and optionally a new IP address/prefix if IP communication is used). The new identifier(s) shall be cyphered to protect privacy if security is configured for the unicast link. The Link Identifier Update Response message is sent using the old identifiers. UE-2 continues to receive traffic with the old Layer-2 ID from UE-1 until UE-2 receives traffic with the new Layer-2 ID from UE-1. After sending the Link Identifier Update Response message, UE-2 keeps sending data traffic to UE-1 with the old identifier, if UE-2 has data to send, until UE-2 receives the Link Identifier Update Ack message from UE-1.

3. Upon reception of the Link Identifier Update Response message, UE-1 responds with a Link Identifier Update Ack message. The Link Identifier Update Ack message includes the new identifier(s) from UE-2, as received on the Link Identifier Update Response message. The Link Identifier Update Ack message is sent using the old identifiers. UE-1 continues to receive traffic with the old Layer-2 ID from UE-2 until UE-1 receives traffic with the new Layer-2 ID from UE-2.

4. The ProSe layer of UE-1 passes the PC5 Link Identifier for the unicast link and the updated Layer-2 IDs (i.e. new Layer-2 ID for UE-1 for the source and new Layer-2 ID of UE-2 for the destination) down to the AS layer. This enables the AS layer to update the provided Layer-2 IDs for the unicast link.

UE-1 starts using its new identifiers and UE-2's new identifiers for this unicast link.

5. Upon reception of the Link Identifier Update Ack message, the ProSe layer of UE-2 passes the PC5 Link Identifier for the unicast link and the updated Layer-2 IDs (i.e. new Layer-2 ID of UE-2 for the source and new Layer-2 ID for UE-1 for the destination) down to the AS layer. This enables the AS layer to update the provided Layer-2 IDs for the unicast link. UE-2 starts using its new identifiers and UE-1's new identifiers for this unicast link.

NOTE 3: The Security Information in the above messages also needs to be updated at the same time as the Layer-2 IDs. This is defined in TS 33.503 [29].

[ . . . ]

6.4.3.4 Layer-2 Link Modification for a Unicast Link

Figure 10:
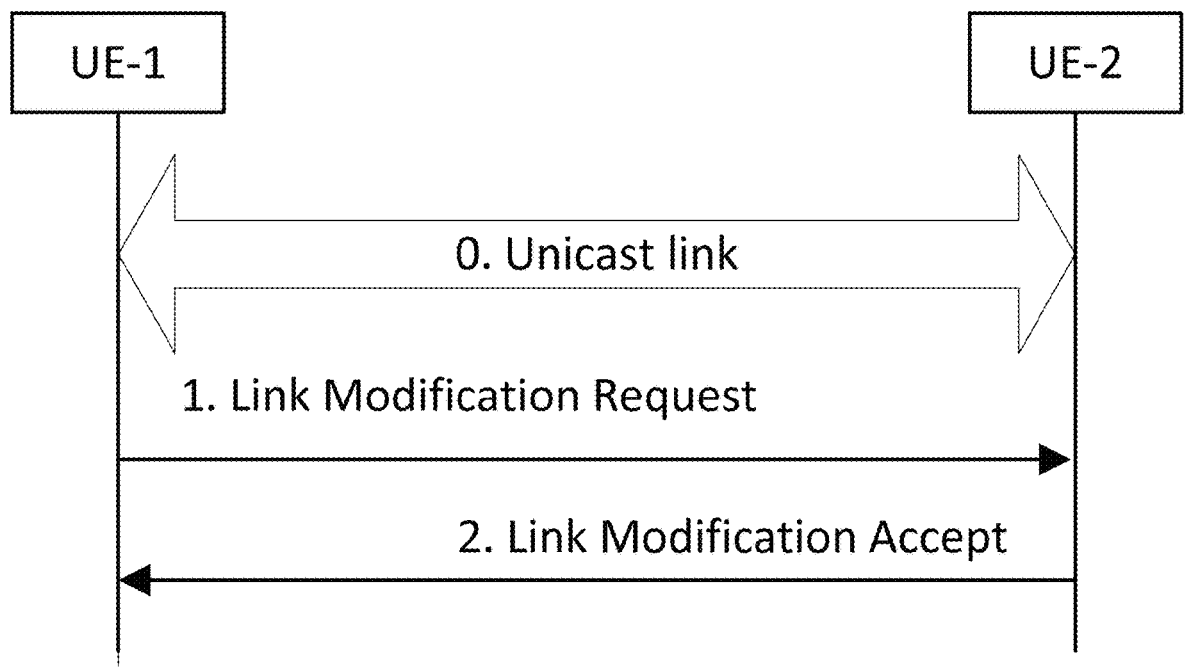
FIG. 10 is a reproduction of FIG. 6.4.3.4-1 of 3GPP TS 23.304 V18.4.0.

FIG. 6.4.3.4-1 shows the layer-2 link modification procedure for a unicast link. This procedure is used to:
add new PC5 QoS Flow(s) in the existing PC5 unicast link.
 This covers the case for adding new PC5 QoS Flow(s) to the existing ProSe service(s) as well as the case for adding new PC5 QoS Flow(s) to new ProSe service(s).
modify existing PC5 QoS Flow(s) in the existing PC5 unicast link.
 This covers the case for modifying the PC5 QoS parameters for existing PC5 Qos Flow(s).
 This also covers the case for removing the associated ProSe service(s) from existing PC5 QoS Flow(s) as well as the case for associating new ProSe service(s) with existing PC5 QoS Flow(s).
remove existing PC5 QoS Flow(s) in the existing PC5 unicast link.
[FIG. 6.4.3.4-1 of 3GPP TS 23.304 V18.4.0, Entitled "Layer-2 Link Modification Procedure", is Reproduced as FIG. 10]

0. UE-1 and UE-2 have a unicast link established as described in clause 6.4.3.1.
1. The ProSe application layer in UE-1 provides application information for PC5 unicast communication. The application information includes the ProSe Service Info and the initiating UE's Application Layer ID. The target UE's Application Layer ID may be included in the application information. If UE-1 decides to reuse the existing PC5 unicast link as specified in clause 5.3.4, so decides to modify the unicast link established with UE-2, UE-1 sends a Link Modification Request to UE-2.

The Link Modification Request message includes:
 a) To add new PC5 QoS Flow(s) in the existing PC5 unicast link:
  QoS Info: the information about PC5 QoS Flow(s) to be added. For each PC5 Qos Flow, the PFI, the corresponding PC5 QoS parameters (i.e. PQI and conditionally other parameters such as MFBR/GFBR, etc.) and optionally the associated ProSe identifier(s).
  Optional PC5 QoS Rule(s).
 b) To modify PC5 QoS Flow(s) in the existing PC5 unicast link:
  QoS Info: the information about PC5 QoS Flow(s) to be modified. For each PC5 QoS Flow, the PFI, the corresponding PC5 QoS parameters (i.e. PQI and conditionally other parameters such as MFBR/GFBR, etc.) and optionally the associated ProSe identifier(s).
  Optional PC5 QoS Rule(s).
 c) To remove PC5 QoS Flow(s) in the existing PC5 unicast link:
  PFIs.

2. UE-2 responds with a Link Modification Accept message.
 The Link Modification Accept message includes:
 For case a) and case b) described in step 1:
  QoS Info: the information about PC5 QOS Flow(s) requested by UE-1. For each PC5 QoS Flow, the PFI, the corresponding PC5 QoS parameters (i.e. PQI and conditionally other parameters such as MFBR/GFBR, etc.) and optionally the associated ProSe identifier(s).
  Optional PC5 QoS Rule(s).
 The ProSe layer of each UE provides information about the unicast link modification to the AS layer. This enables the AS layer to update the context related to the modified unicast link.

[ . . . ]

6.4.3.7.1 Common Part for Layer-2 Link Management Over PC5 Reference Point for 5G ProSe UE-to-UE Relay For the 5G ProSe Communication via 5G ProSe UE-to-UE Relay as described in clause 6.7.1 and clause 6.7.2:
 The Direct Communication Request message over the first hop PC5 reference point includes:
  User Info ID of source 5G ProSe End UE: the identity of the source 5G ProSe End UE requesting relay operation.
  User Info ID of 5G ProSe UE-to-UE Relay: the identity of the UE-to-UE Relay provided to the source 5G ProSe End UE during 5G ProSe UE-to-UE Relay Discovery procedure.
  User Info ID of target 5G ProSe End UE: the identity of the target 5G ProSe End UE provided to the source 5G ProSe End UE during UE-to-UE Relay Discovery procedure.
  (optional) Destination Layer-2 ID of target 5G ProSe End UE: the unicast destination Layer-2 ID of the target 5G ProSe End UE determined by the source 5G ProSe End UE as specified in clause 5.8.2.4.

ProSe Service Info: the information about the ProSe identifier(s) requesting Layer-2 link establishment.

RSC: the connectivity service provided by the 5G ProSe UE-to-UE Relay as requested by the source 5G ProSe End UE.

Security Information: the information for the establishment of security for the first hop PC5 link establishment.

NOTE 1: The Security Information is defined by SA WG3.

The Direct Communication Request message over the second hop PC5 reference point includes:

User Info ID of source 5G ProSe End UE.
User Info ID of target 5G ProSe End UE.
User Info ID of 5G ProSe UE-to-UE Relay.
ProSe Service Info: the information about the ProSe identifier(s).
RSC: the connectivity service provided by the 5G ProSe UE-to-UE Relay as requested by the source 5G ProSe End UE.
Security Information: the information for the establishment of security for the second hop PC5 link establishment.
NOTE 2: The Security Information is defined by SA WG3.

The Direct Communication Accept message over the second hop PC5 reference point includes:
User Info ID of target 5G ProSe End UE.

The Direct Communication Accept message over the first hop PC5 reference point includes:
User Info ID of target 5G ProSe End UE.
User Info ID of 5G ProSe UE-to-UE Relay.

The Link Modification Request message over the first hop PC5 reference point includes:
User Info ID of target 5G ProSe End UE: the identity of the target 5G ProSe End UE provided to the source 5G ProSe End UE during UE-to-UE Relay Discovery procedure.
(optional) Destination Layer-2 ID of target 5G ProSe End UE: the unicast destination Layer-2 ID of the target 5G ProSe End UE determined by the source 5G ProSe End UE as specified in clause 5.8.2.4.

The Link Modification Request message over the second hop PC5 reference point includes:
User Info ID of source 5G ProSe End UE.
User Info ID of target 5G ProSe End UE.

The Link Modification Accept message over the second hop PC5 reference point includes:
User Info ID of target 5G ProSe End UE.

The Link Modification Accept message over the first hop PC5 reference point includes:
User Info ID of target 5G ProSe End UE.

6.4.3.7.2 Layer-2 Link Management Over PC5 Reference Point for 5G ProSe Layer-2 UE-to-UE Relay For the 5G ProSe Communication via 5G ProSe Layer-2 UE-to-UE Relay as described in clause 6.7.2, the description in clause 6.4.3.7.1 applies.

The message contents over PC5 reference point for unicast mode 5G ProSe Direct Communication as depicted from clause 6.4.3.1 to clause 6.4.3.5 are same for the end-to-end connection between peer 5G ProSe End UEs.

Editor's note: Whether the LIU between peer Layer-2 End UEs has same message contents as direct PC5 LIU messages is FFS.

[ ... ]

6.4.3.7.4 Layer-2 Link Management Over PC5 Reference Point for 5G ProSe UE-to-UE Relay Communication with Integrated Discovery This clause is for the 5G ProSe UE-to-UE Relay Communication with integrated Discovery procedure as described in clause 6.7.3.

The Direct Communication Request message over the first hop PC5 reference point includes:
User Info ID of source 5G ProSe End UE.
(optional) User Info ID of target 5G ProSe End UE: the identity of the target 5G ProSe End UE if provided from the ProSe application layer.
(optional) Destination Layer-2 ID of target 5G ProSe End UE: the unicast destination Layer-2 ID of the target 5G ProSe End UE determined by the source 5G ProSe End UE as specified in clause 5.8.2.4.
ProSe Service Info: the information about the ProSe identifier(s) requesting Layer-2 link establishment.
RSC: the connectivity service provided by the 5G ProSe UE-to-UE Relay as requested by the source 5G ProSe End UE.
Relay_indication: indicates whether the Direct Communication Request message can be forwarded by a 5G ProSe UE-to-UE Relay.
Security Information: the information for the establishment of security for the first hop PC5 link establishment.
NOTE 1: The Security Information is defined by SA WG3.

The Direct Communication Request message over the second hop PC5 reference point includes:
User Info ID of source 5G ProSe End UE.
User Info ID of 5G ProSe UE-to-UE Relay.
(optional) User Info ID of target 5G ProSe End UE.
ProSe Service Info: the information about the ProSe identifier(s).
RSC: the connectivity service provided by the 5G ProSe UE-to-UE Relay as requested by the source 5G ProSe End UE.
Security Information: the information for the establishment of security for the second hop PC5 link establishment.
NOTE 2: The Security Information is defined by SA WG3.

The Direct Communication Accept message over the second hop PC5 reference point includes:
User Info ID of target 5G ProSe End UE.

The Direct Communication Accept message over the first hop PC5 reference point includes:
User Info ID of target 5G ProSe End UE.
User Info ID of 5G ProSe UE-to-UE Relay.

For the 5G ProSe Communication via 5G ProSe Layer-3 UE-to-UE Relay, additional clarifications are as following:
In the Security Procedure of the second hop PC5 reference point, the 5G ProSe Layer-3 UE-to-UE Relay provides the IP Address Configuration or Link-Local IPV6 Address to the target 5G ProSe End UE.
The Direct Communication Accept message over the second hop PC5 reference point additionally includes IP Address Configuration or Link-Local IPv6 Address (if IP communication is used), Ethernet MAC address of target 5G ProSe End UE (if Ethernet communication is used). QoS Info is not included in the Security Procedure or Direct Communication Accept message of the second hop PC5 reference point.

In the Security Procedure of the first hop PC5 reference point, the source 5G ProSe End UE provides the IP Address Configuration, Link-Local IPV6 Address and QoS Info of the end-to-end QoS to the 5G ProSe Layer-3 UE-to-UE Relay.

The 5G ProSe Layer-3 UE-to-UE Relay provides the QoS info of the second hop QoS to the target 5G ProSe End UE using the Layer-2 link modification as described in the clause 6.4.3.4.

The 5G ProSe Layer-3 UE-to-UE Relay decides the QoS Info of the first hop QoS with considering the received second hop QoS from the target 5G ProSe End UE, the Direct Communication Accept message over the first hop PC5 reference point additionally includes IP Address Configuration or Link-Local IPV6 Address, QoS Info of the first hop Qos and may include IP address of the target 5G ProSe End UE (if IP communication is used) or Ethernet MAC address of target 5G ProSe End UE (if Ethernet communication is used).

For the 5G ProSe Communication via 5G ProSe Layer-2 UE-to-UE Relay, the message contents over PC5 reference point for unicast mode 5G ProSe Direct Communication as depicted from clause 6.4.3.1 to clause 6.4.3.5 are same for the end-to-end connection between peer 5G ProSe End UEs. [ . . . ]

6.7.2 5G ProSe Communication Via 5G ProSe Layer-2 UE-to-UE Relay

This procedure applies to 5G ProSe Layer-2 UE-to-UE Relay.

Figure 11:
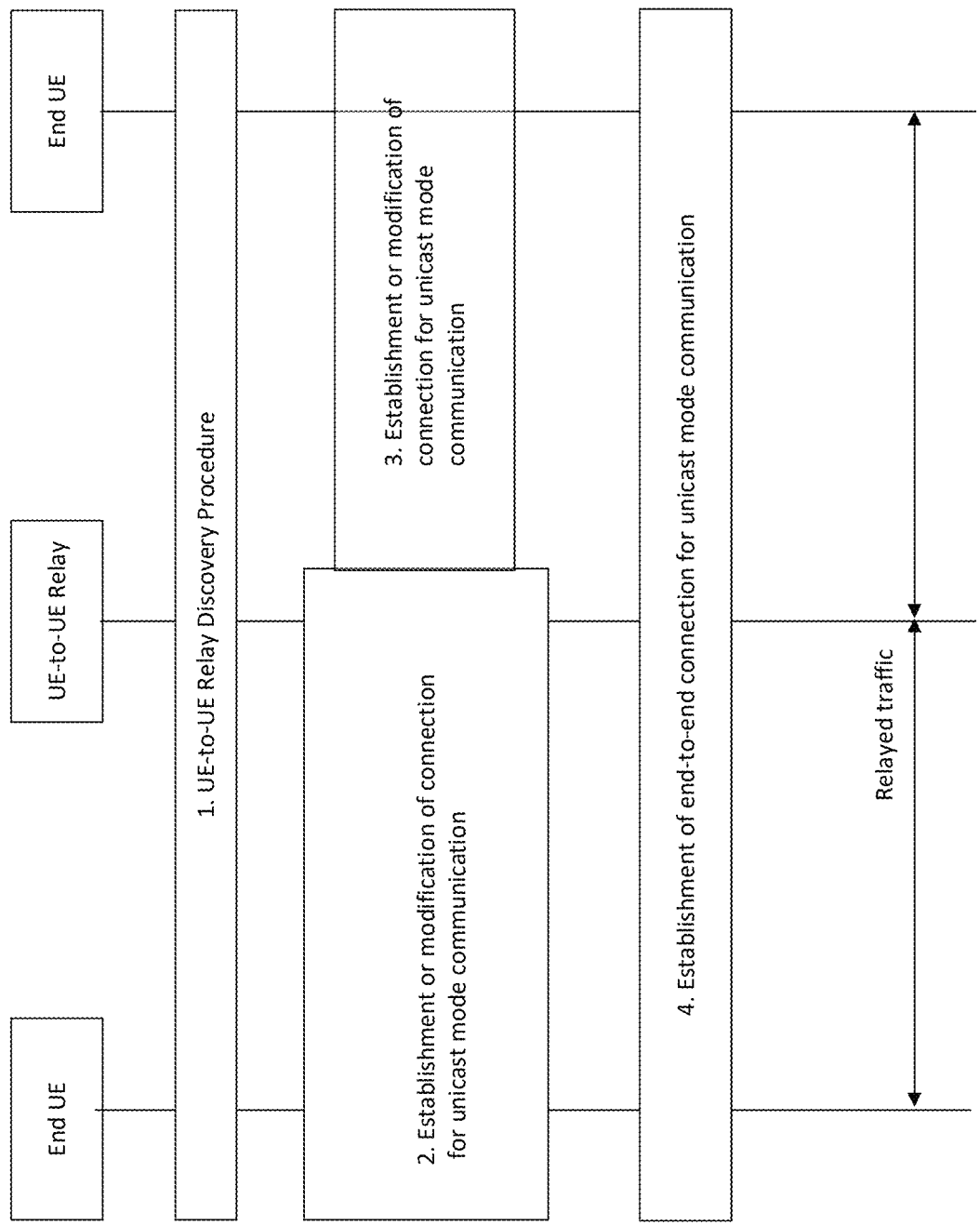
FIG. 11 is a reproduction of FIG. 6.7.2-1 of 3GPP TS 23.304 V18.4.0.

[FIG. 6.7.2-1 of 3GPP TS 23.304 V18.4.0, Entitled "5G ProSe Communication Via 5G ProSe Layer-2 UE-to-UE Relay", is Reproduced as FIG. 11]

Service authorization and provisioning has been performed for the 5G ProSe Layer-2 UE-to-UE Relay and the 5G ProSe End UEs as described in clause 6.2 before this procedure.

1. Model A or Model B 5G ProSe UE-to-UE Relay Discovery as described in clause 6.3.2.4 is performed and a source 5G ProSe End UE selects a suitable 5G ProSe Layer-2 UE-to-UE Relay for the communication with a target 5G ProSe End UE.
2. The source 5G ProSe End UE decides whether to use an existing PC5 link with the 5G ProSe UE-to-UE Relay for the required service. If an existing PC5 link is used then the Layer-2 link modification procedure as specified in clause 6.4.3.7 is used towards a 5G ProSe UE-to-UE Relay, otherwise a Layer-2 link establishment procedure is used towards a 5G ProSe UE-to-UE Relay.

This procedure is towards the selected 5G ProSe UE-to-UE Relay and for Layer-2 link establishment, the security establishment is performed before step 3 is initiated.
3. The 5G ProSe Layer-2 UE-to-UE Relay decides whether to use an existing PC5 link between the 5G ProSe UE-to-UE Relay and the target 5G ProSe End UE for the required service and initiates Layer-2 link establishment procedure or Layer-2 link modification procedure as specified in clause 6.4.3.7 with the target 5G ProSe End UE.

This procedure is performed towards the target 5G ProSe End UE using the unicast Layer-2 ID.

The 5G ProSe Layer-2 UE-to-UE Relay sends a Direct Communication Accept message or Link Modification Accept message to the the source 5G ProSe End UE after step 3 is completed.
4. The source 5G ProSe End UE establishes an end-to-end connection for unicast mode communication with the target 5G ProSe End UE as described in clause 6.4.3.7. The data and End-to-End PC5-S signalling is transferred between the source 5G ProSe End UE and the target 5G ProSe End UE via the 5G ProSe Layer-2 UE-to-UE Relay. The 5G ProSe Layer-2 UE-to-UE Relay forwards all the data traffic and End-to-End PC5-S signalling between the source 5G ProSe End UE and the target 5G ProSe End UE, as specified in TS 38.300 [12].

6.7.3 5G ProSe UE-to-UE Relay Communication with Integrated Discovery

6.7.3.1 General

5G ProSe Communication via 5G ProSe UE-to-UE Relay with integrated Discovery is supported. For 5G ProSe UE-to-UE Relay Communication with integrated Discovery, when a UE allows a UE-to-UE relay to be involved in the Direct Communication Request to the other UE, the UE indicates it by including a relay_indication in the broadcasted Direct Communication Request message.

When a UE-to-UE relay receives a Direct Communication Request including a relay_indication, it decides whether to forward the message according to e.g. Relay Service Code if there is any, Application ID, operator policy per Relay Service Code, signal strength and local policy.

6.7.3.2 Procedure for Communication Via Layer-3 UE-to-UE Relay

Figure 12:
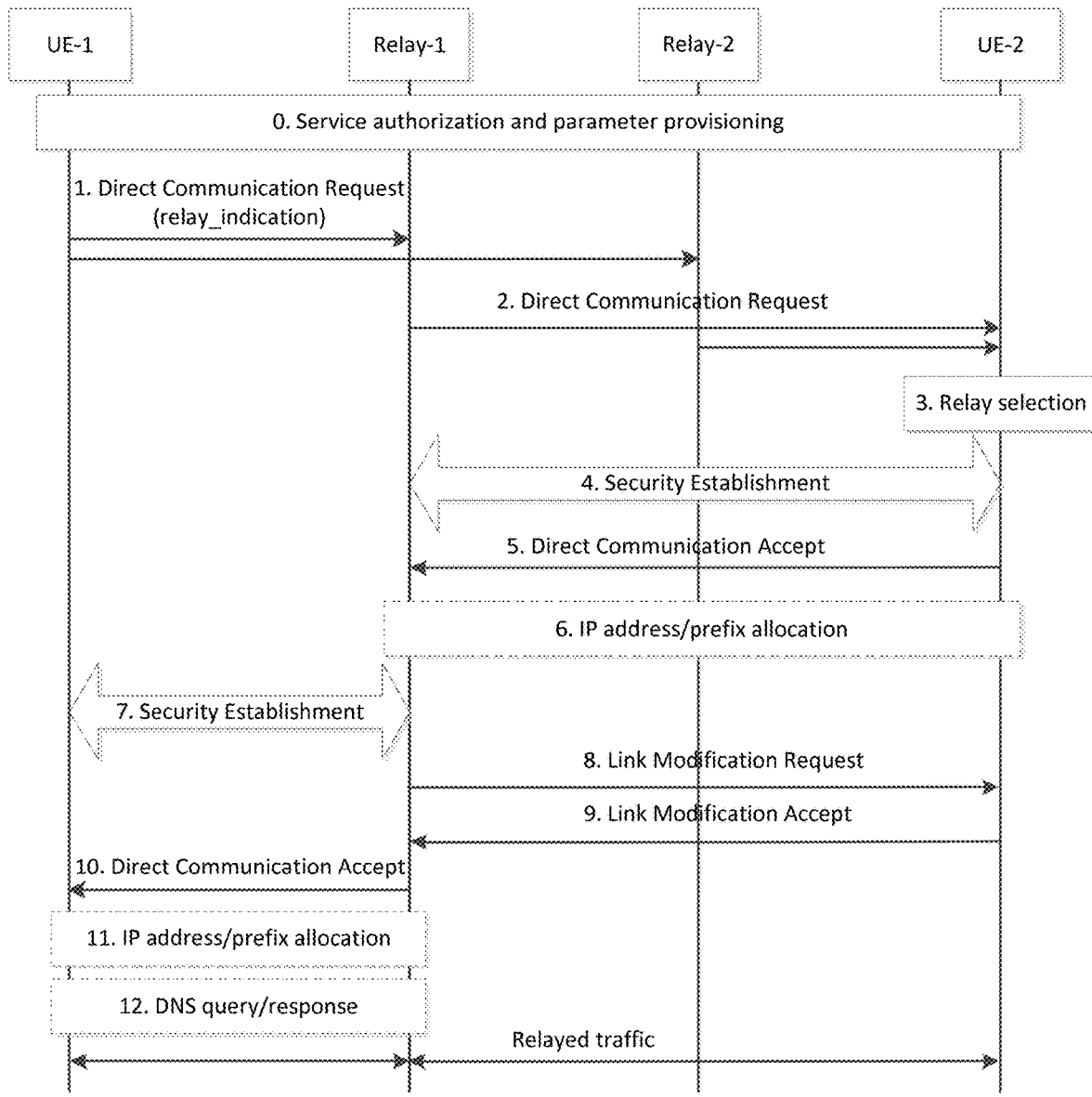
FIG. 12 is a reproduction of FIG. 6.7.3.2-1 of 3GPP TS 23.304 V18.4.0.

[FIG. 6.7.3.2-1 of 3GPP TS 23.304 V18.4.0, entitled "5G ProSe UE-to-UE Relay Communication with integrated Discovery via Layer-3 UE-to-UE Relay", is reproduced as FIG. 12]

0. 5G ProSe End UEs are authorized and provisioned with parameters to use the service provided by the 5G ProSe UE-to-UE Relays. 5G ProSe UE-to-UE Relays are authorized and provisioned with parameters to provide service of relaying traffic among 5G ProSe End UEs.
1. The source 5G ProSe End UE (i.e. UE-1) wants to establish a unicast communication with the target 5G ProSe End UE (i.e. UE-2) and broadcasts a Direct Communication Request. The parameters included in the Direct Communication Request message are described in clause 6.4.3.7.

The relay_indication in the Direct Communication Request is used to indicate whether 5G ProSe UE-to-UE Relay can forward the Direct Communication Request message or not. It is also used to limit the number of hops of 5G ProSe UE-to-UE Relay by removing relay_indication in the Direct Communication Request message from the 5G ProSe UE-to-UE Relay.

The Source Layer-2 ID and Destination Layer-2 ID used for the Direct Communication Request message are defined in clause 5.8.5.

The source 5G ProSe End UE gets application information and optional ProSe Application Requirements from ProSe application layer, and determines the end-to-end QoS parameters as described in clause 5.6.3.1.

NOTE 1: The data type of relay_indication can be determined in Stage 3.

2. When receiving Direct Communication Request with relay_indication from UE-1, the 5G ProSe UE-to-UE Relay (i.e. Relay-1 and Relay-2) may decide to participate in the procedure and broadcast a Direct Communication Request message in its proximity without relay_indication. The parameters included in the Direct Communication Request message are described in clause 6.4.3.7.

The Source Layer-2 ID and Destination Layer-2 ID used for the Direct Communication Request message are defined in clause 5.8.5.

3. When UE-2 receives a Direct Communication Request from one or multiple 5G ProSe UE-to-UE Relays, UE-2 select a 5G ProSe UE-to-UE Relay which UE-2 will respond. UE-2 may select the 5G ProSe UE-to-UE Relay according to e.g. the signal strength, local policy, operator policy per Relay Service Code if any.

4. The security establishment happens between UE-2 and the selected 5G ProSe UE-to-UE Relay (here Relay-1), if needed.

If the existing PC5 link can be reused, Link Modification Request and Link Modification Accept messages are used.

NOTE 2: The conflict between Link Modification Request and Direct Communication Request can be determined in Stage 3.

5. UE-2 replies Direct Communication Accept message to Relay-1. The parameters included in the Direct Communication Accept message are described in clause 6.4.3.7.

6. For IP traffic, IPV6 prefix or IPv4 address is allocated for the target 5G ProSe Layer-3 End UE as defined in clause 5.5.1.4.

7. Security establishment happens between UE-1 and Relay-1, if needed.

8. For 5G ProSe UE-to-UE Relay Communication with integrated Discovery, after receiving QoS Info of the end-to-end QoS from UE-1, Relay-1 provides the QoS info of the second hop QoS to UE-2 with Link Modification Request message.

9. For 5G ProSe UE-to-UE Relay Communication with integrated Discovery, UE-2 responds with a Link Modification Accept message.

10. Relay-1 responds with Direct Communication Accept to the UE-1. The parameters included in the Direct Communication Accept message are described in clause 6.4.3.7.

11. For IP traffic, IPv6 prefix or IPv4 address is allocated for the source 5G ProSe Layer-3 End UE as defined in clause 5.5.1.4.

12. For IP communication, the 5G ProSe Layer-3 UE-to-UE Relay may store an association of User Info ID and the IP address of target 5G ProSe Layer-3 End UE into its DNS entries and the 5G ProSe Layer-3 UE-to-UE Relay may act as a DNS server to other UEs. The source 5G ProSe Layer-3 End UE may send a DNS query to the 5G ProSe Layer-3 UE-to-UE Relay to request IP address of target 5G ProSe Layer-3 End UE after step 11 if the IP address of target 5G ProSe Layer-3 End UE is not received in step 10 and the 5G ProSe Layer-3 UE-to-UE Relay returns the IP address of the target 5G ProSe Layer-3 End UE to the source 5G ProSe Layer-3 End UE.

For Ethernet communication, the 5G ProSe Layer-3 UE-to-UE Relay is acting as an Ethernet switch by maintaining the association between PC5 links and Ethernet MAC addresses received from the 5G ProSe Layer-3 End UE.

For Unstructured traffic communication, for each pair of source and target 5G ProSe Layer-3 End UEs, the 5G ProSe Layer-3 UE-to-UE Relay maintains the 1:1 mapping between the PC5 link with source 5G ProSe Layer-3 End UE and the PC5 link with target 5G ProSe Layer-3 End UE.

The source 5G ProSe Layer-3 End UE communicates with the target 5G ProSe Layer-3 End UE via the 5G ProSe Layer-3 UE-to-UE Relay.

6.7.3.3 Procedure for Communication Via Layer-2 UE-to-UE Relay

Figure 13:
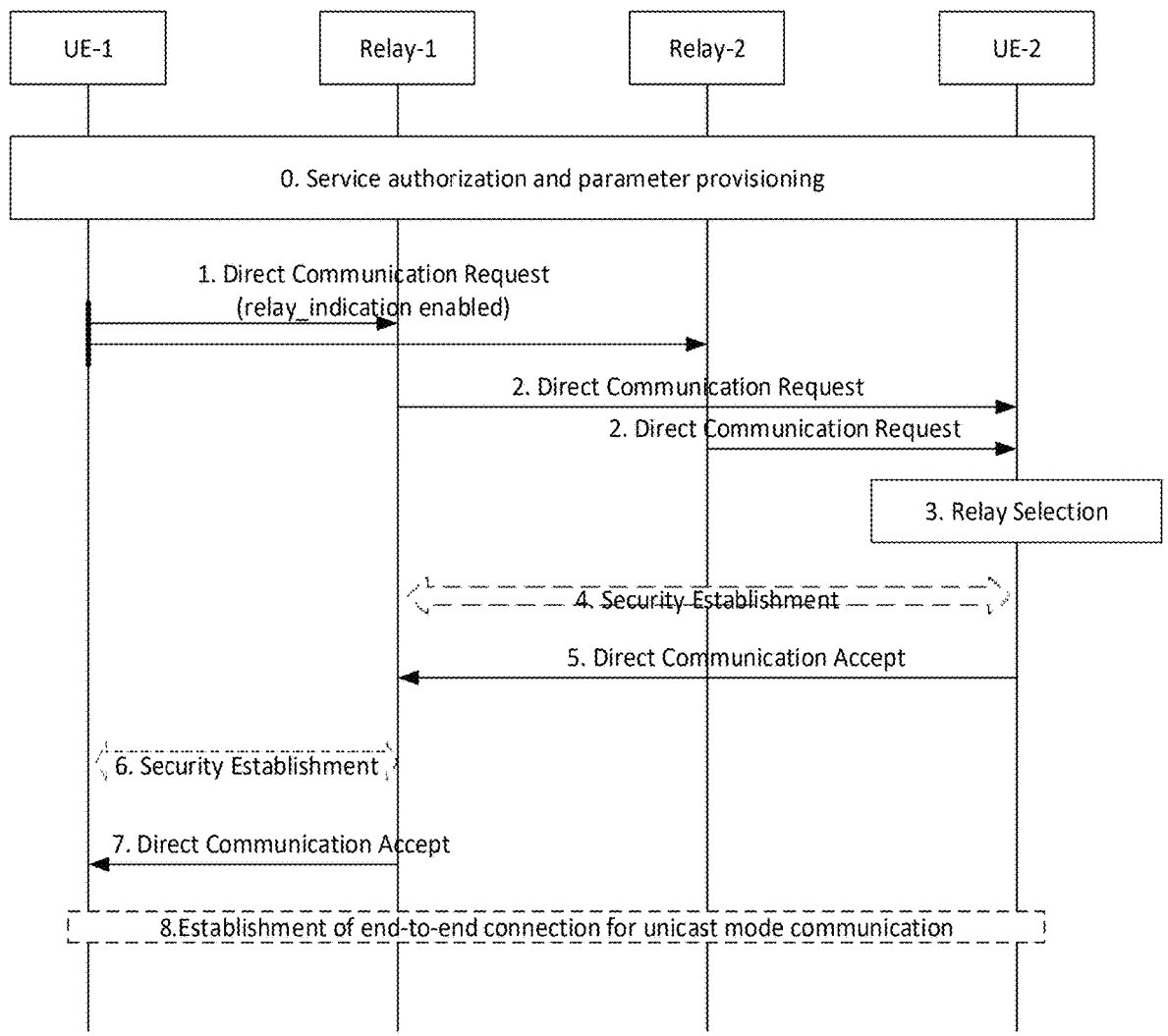
FIG. 13 is a reproduction of FIG. 6.7.3.3-1 of 3GPP TS 23.304 V18.4.0.

[FIG. 6.7.3.3-1 of 3GPP TS 23.304 V18.4.0, Entitled "5G ProSe UE-to-UE Relay Communication with Integrated Discovery Via Layer-2 UE-to-UE Relay", is Reproduced as FIG. 13]

0-5. It is the same as steps 0-5 of FIG. 6.7.3.2-1.

6. It is the same as step 7 of FIG. 6.7.3.2-1.

7. It is the same as step 10 of FIG. 6.7.3.2-1.

The parameters included in the above messages are described in clause 6.4.3.7.4.

8. For 5G ProSe UE-to-UE Relay Communication via Layer-2 UE-to-UE Relay, UE-1 establishes an end-to-end connection for unicast mode communication with UE-2.

Editor's note: Any additional update of procedure via Layer-2 UE-to-UE Relay, e.g. according to RAN's decision, will be included here.

3GPP TS 38.300 introduced U2U Relay as follows:

16.12.2.2 L2 UE-to-UE Relay

Figure 16:
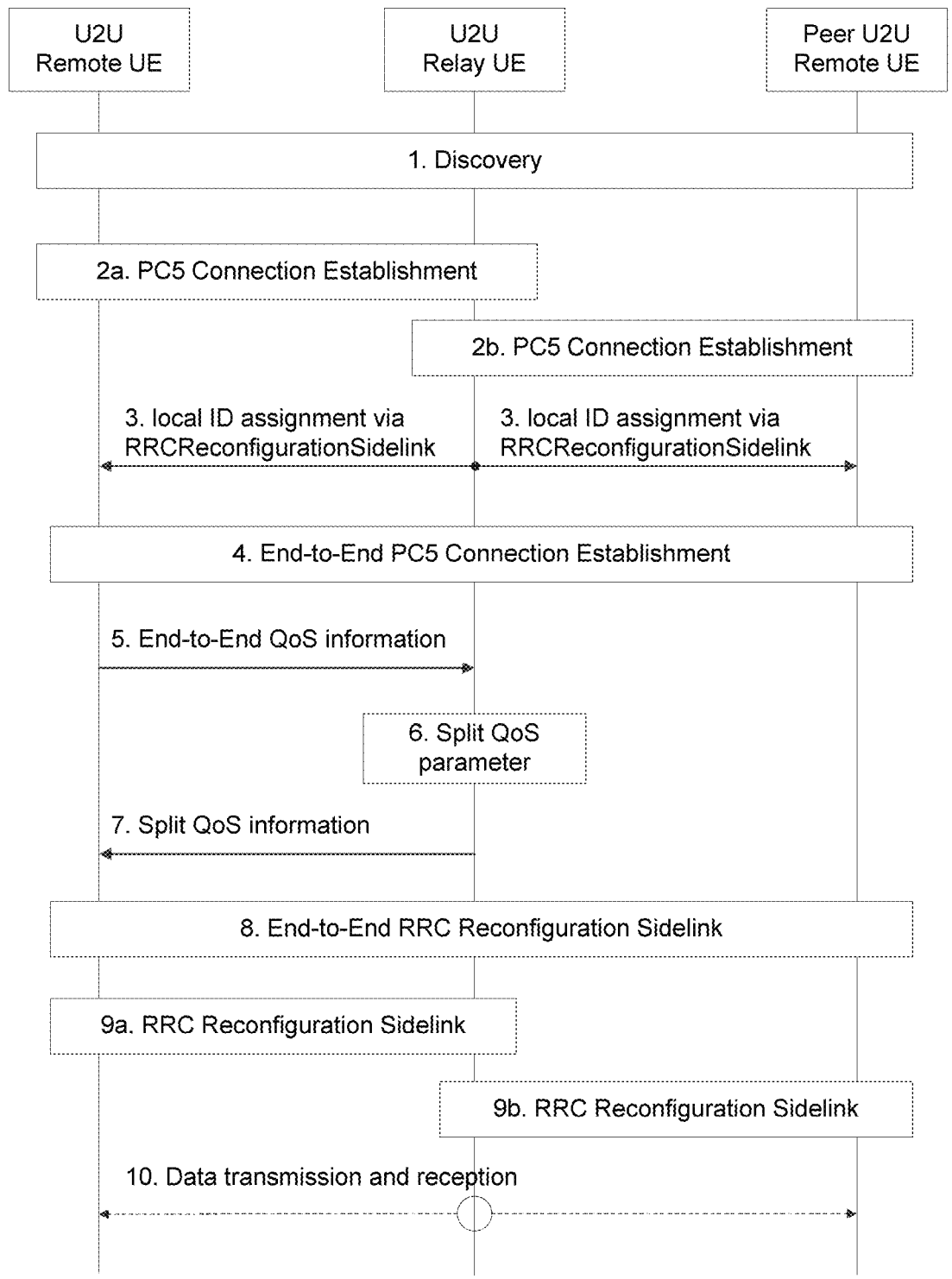
FIG. 16 is a reproduction of FIG. 16.12.7-1 of 3GPP TS 38.300 V18.0.0.

The protocol stacks for the user plane and the control plane of the L2 U2U Relay architecture are illustrated in FIG. 16.12.2.2-1 and FIG. 16.12.2.2-2. The SRAP sublayer is placed above the RLC sublayer for both CP and UP at both PC5 interfaces. The sidelink SDAP, PDCP and RRC are terminated between two L2 U2U Remote UEs (i.e., end-to-end), while SRAP, RLC, MAC and PHY are terminated in each hop of PC5 link.

Figure 14:
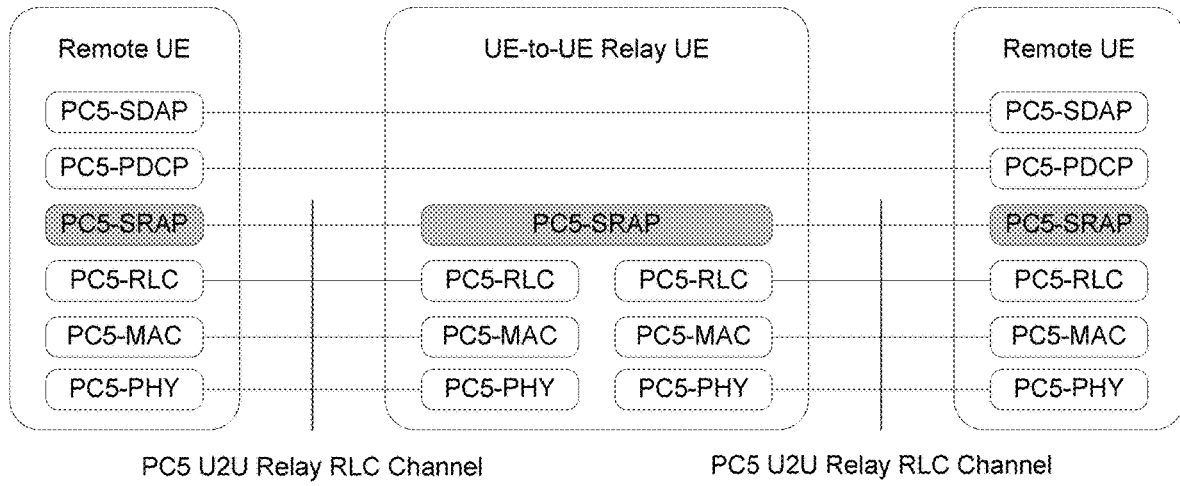
FIG. 14 is a reproduction of FIG. 16.12.2.2-1 of 3GPP TS 38.300 V18.0.0.

[FIG. 16.12.2.2-1 of 3GPP TS 38.300 V18.0.0, Entitled "User Plane Protocol Stack for L2 UE-to-UE Relay", is Reproduced as FIG. 14]

Figure 15:
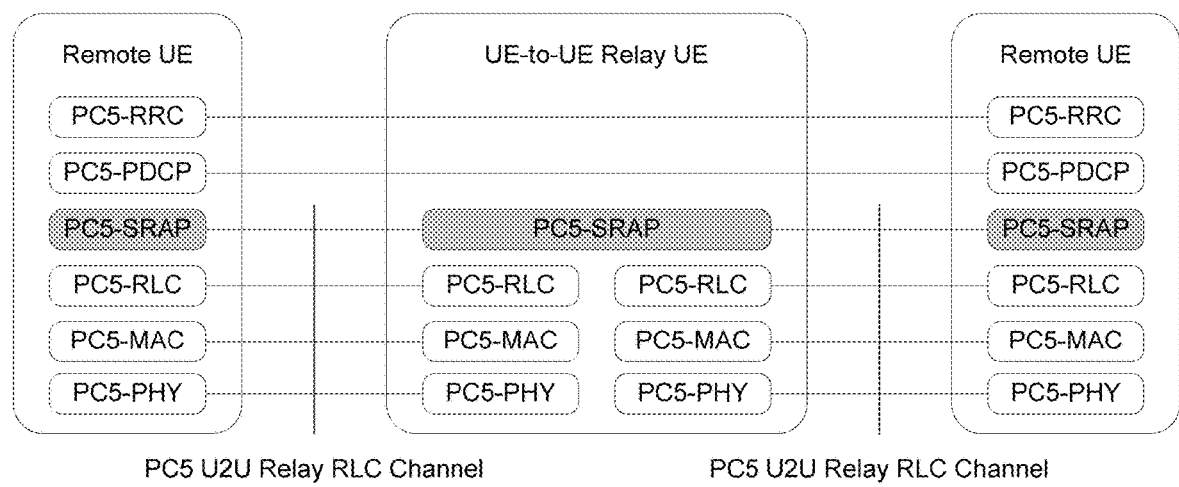
FIG. 15 is a reproduction of FIG. 16.12.2.2-2 of 3GPP TS 38.300 V18.0.0.

[FIG. 16.12.2.2-2 of 3GPP TS 38.300 V18.0.0, Entitled "Control Plane Protocol Stack for L2 UE-to-UE Relay", is Reproduced as FIG. 15]

For L2 UE-to-UE Relay, the SRAP sublayer at L2 U2U Remote UE:

The SRAP sublayer at L2 U2U Remote UE performs bearer mapping between end-to-end PC5 Radio Bearers (SL-SRBs or SL-DRBs) of the L2 U2U Remote UE and at each hop of PC5 Relay RLC Channel between the L2 U2U Remote UE and the L2 U2U Relay UE.

For the traffic transmitted from an L2 U2U Remote UE to an L2 U2U Relay UE, the different end-to-end PC5 Radio Bearers (SL-SRBs or SL-DRBs) towards the same peer L2 U2U Remote UE and/or different peer L2 U2U Remote UEs can be multiplexed to the same PC5

Relay RLC channel, which is between the L2 U2U Remote UE(s) and the L2 U2U Relay UE.

For the traffic received at L2 U2U Remote UE, the same PC5 Relay RLC channel from one L2 U2U Relay UE can be de-multiplexed to the different end-to-end PC5 Radio Bearers (SL-SRBs or SL-DRBs) of the same peer L2 U2U Remote UE and/or different peer L2 U2U Remote UEs.

The SRAP sublayer at L2 U2U Remote UE supports identification of the peer L2 U2U Remote UE and itself. The local IDs are assigned by L2 U2U Relay UE to both L2 U2U Remote UEs for identification. For the two local IDs, one of them identifies L2 U2U Remote UE and the other identifies the peer L2 U2U Remote UE. The local ID of the peer L2 U2U Remote UE and the local ID of L2 U2U Remote UE are delivered by L2 U2U Relay UE to the L2 U2U Remote UEs along with the corresponding L2 ID of the peer L2 U2U Remote UE. The identity information of the end-to-end PC5 Radio Bearer and two local IDs are included in the SRAP header in order for the peer L2 U2U Remote UE to correlate the received packets for the specific PDCP entity associated with the right end-to-end PC5 Radio Bearer of the L2 U2U Remote UEs.

For L2 UE-to-UE Relay, the SRAP sublayer at L2 U2U Relay UE:

The SRAP sublayer at L2 U2U Relay UE determines the egress PC5 Relay RLC Channel based on the mapping of the end-to-end PC5 Radio Bearer and egress PC5 Relay RLC Channel for a particular pair between the L2 U2U Remote UE and the peer L2 U2U Remote UE.

For the ingress traffic received from an/multiple L2 U2U Remote UE(s) at L2 U2U Relay UE, the different end-to-end PC5 Radio Bearers (SL-SRBs or SL-DRBs) of the same L2 U2U Remote UE and/or the same/ different end-to-end PC5 Radio Bearers (SL-SRBs or SL-DRBs) of L2 U2U Remote UEs can be multiplexed to the same egress PC5 Relay RLC channel, which is in between the L2 U2U Relay UE and the peer L2 U2U Remote UE.

[ . . . ]

16.12.7 Control Plane Procedures for L2 U2U Relay

The L2 U2U Remote UE needs to establish end-to-end SL-SRB/DRBs with the peer L2 U2U Remote UE before user plane data transmission.

The following high level connection establishment procedure in FIG. 16.12.7-1 applies to a L2 U2U Relay UE and L2 U2U Remote UE:

[FIG. 16.12.7-1 of 3GPP TS 38.300 V18.0.0, Entitled "Procedure for L2 U2U Remote UE Connection Establishment", is Reproduced as FIG. 16]

1. The L2 U2U Remote UE, L2 U2U Relay UE, and peer L2 U2U Remote UE perform discovery procedure or integrated discovery procedure.
2a. The L2 U2U Remote UE establishes/modifies a PC5-RRC connection with the selected L2 U2U Relay UE (i.e., as specified in TS 23.304 [48]).
2b. The L2 U2U Relay UE establishes/modifies a PC5-RRC connection with the peer L2 U2U Remote UE (i.e., as specified in TS 23.304 [48]).
3. The L2 U2U Relay UE allocates two local IDs and it is delivered via RRCReconfigurationSidelink message to each of the L2 U2U Remote UEs: one local ID to identify the L2 U2U Remote UE, the other local ID to identify the peer L2 U2U Remote UE. When the local ID is delivered, an L2 ID of the peer L2 U2U Remote UE is also delivered to the U2U Remote UE for making the association between the local ID and the L2 ID of the peer U2U Remote UE.
4. The L2 U2U Remote UE establishes end-to-end PC5-RRC connection with the peer L2 U2U Remote UE via the L2 U2U Relay UE. For the end-to-end connection establishment, fixed indexes (i.e., 0/1/2/3) are defined for end-to-end SL-SRB 0/1/2/3 respectively, and specified PC5 Relay RLC Channel configuration is used on each hop. The sidelink UE capability is exchanged between the L2 U2U Remote UEs via PC5-RRC (e.g., SL-SRB3) message.
5. The L2 U2U Remote UE sends to the L2 U2U Relay UE all the QoS profiles for the end-to-end QoS flows via PC5-RRC.
6. The L2 U2U Relay UE performs QoS split only for PDB.
NOTE: It is up to L2 U2U Relay UE implementation on how to split PDB.
7. The L2 U2U Relay UE sends the split QoS value (i.e., PDB) via PC5-RRC message to the L2 U2U Remote UE.8. The L2 U2U Remote UE or the serving gNB of the L2 U2U Remote UE derives the PDCP and SDAP configuration for end-to-end SL-DRB and provides the portion of the configuration related to reception to the peer L2 U2U Remote UE using end-to-end RRCReconfigurationSidelink messages. The end-to-end bearer IDs for SL-SRB and SL-DRB are used as input for the L2 U2U Relay ciphering and deciphering at PDCP.
9a. The L2 U2U Remote UE or the serving gNB of the L2 U2U Remote UE derives the first hop configuration (e.g. PC5 Relay RLC Channel configuration) for SL-DRB and provides to the L2 U2U Relay UE of the configuration related to receiving on the first hop (i.e., Rx by the relay UE), using per-hop RRCReconfigurationSidelink message.
9b. The L2 U2U Relay UE or the serving gNB of the L2 U2U Relay UE derives the second hop configuration (e.g. PC5 Relay RLC Channel configuration) for each SL-DRB and provides to the peer L2 U2U Remote UE of the configuration related to receiving data packets on the second hop (i.e., RX by the peer remote UE), using per-hop RRCReconfigurationSidelink message.
10. The L2 U2U Remote UE and the peer L2 U2U Remote UE transmit or receive data via L2 U2U Relay UE.

3GPP TS 38.331 introduced U2U Relay as follows:

5.8.9.1 Sidelink RRC Reconfiguration

5.8.9.1.1 General

Figure 17:
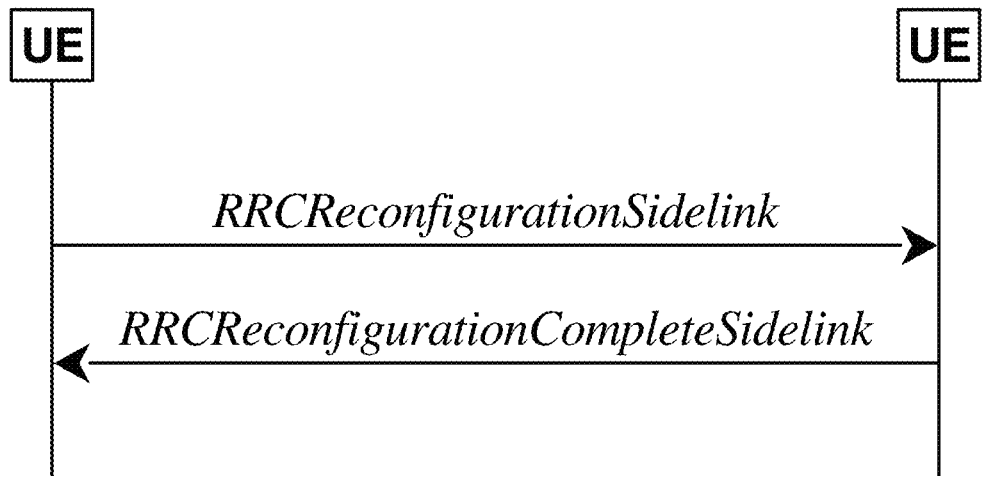
FIG. 17 is a reproduction of FIG. 5.8.9.1.1-1 of 3GPP TS 38.331 V18.0.0.
Figure 18:
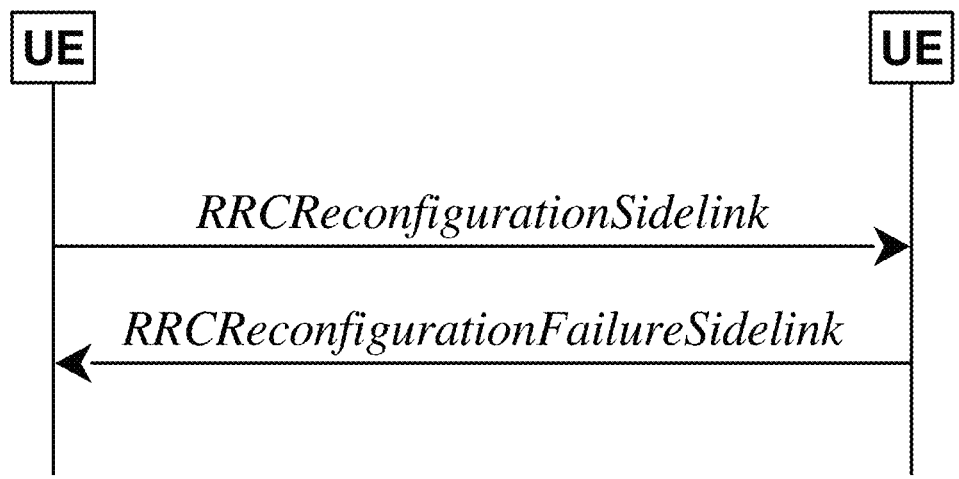
FIG. 18 is a reproduction of FIG. 5.8.9.1.1-2 of 3GPP TS 38.331 V18.0.0.

[FIG. 5.8.9.1.1-1 of 3GPP TS 38.331 V18.0.0, Entitled "Sidelink RRC Reconfiguration, Successful", is Reproduced as FIG. 17]
[FIG. 5.8.9.1.1-2 of 3GPP TS 38.331 V18.0.0, Entitled "Sidelink RRC Reconfiguration, Failure", is Reproduced as FIG. 18]

The purpose of this procedure is to modify a PC5-RRC connection, e.g. to establish/modify/release sidelink DRBs or additional sidelink RLC bearer or PC5 Relay RLC channels, to add/modify/release sidelink carrier, to (re-) configure NR sidelink measurement and reporting, to (re-) configure sidelink CSI reference signal resources, to (re) configure CSI reporting latency bound, to (re)configure sidelink DRX, to (re-)configure the latency bound of SL Inter-UE coordination report, and to indicate the SFN-DFN offset.

The UE may initiate the sidelink RRC reconfiguration procedure and perform the operation in clause 5.8.9.1.2 on the corresponding PC5-RRC connection in following cases:
- the release of sidelink DRBs associated with the peer UE, or L2 U2U Relay UE and peer L2 U2U Remote UE in case of L2 U2U Relay operation, as specified in clause 5.8.9.1a.1;
- the establishment of sidelink DRBs associated with the peer UE, or L2 U2U Relay UE and peer L2 U2U Remote UE in case of L2 U2U Relay operation, as specified in clause 5.8.9.1a.2;
- the modification for the parameters included in SLRB-Config of sidelink DRBs associated with the peer UE, as specified in clause 5.8.9.1a.2;
- the release of additional sidelink RLC bearer associated with the peer UE, as specified in clause 5.8.9.1a.5;
- the establishment of additional sidelink RLC bearer associated with the peer UE, as specified in clause 5.8.9.1a.6;
- the modification for the parameters included in SL-RLC-BearerConfig of additional sidelink RLC bearer associated with the peer UE, as specified in clause 5.8.9.1a.6;
- the release of PC5 Relay RLC channels for L2 U2N/U2U Relay UE and Remote UE, as specified in clause 5.8.9.7.1;
- the establishment of PC5 Relay RLC channels for L2 U2N/U2U Relay UE and Remote UE, as specified in clause 5.8.9.7.2;
- the modification for the parameters included in SL-RLC-ChannelConfigPC5 of PC5 Relay RLC channels for L2 U2N/U2U Relay UE and Remote UE, as specified in clause 5.8.9.7.2;
- the release of sidelink carrier associated with the peer UE, as specified in clause 5.8.9.1b.1;
- the addition of sidelink carrier associated with the peer UE, as specified in clause 5.8.9.1b.2;
- the modification of sidelink carrier associated with the peer UE, as specified in clause 5.8.9.1b.2;
- the (re-)configuration of the peer UE to perform NR sidelink measurement and report.
- the (re-)configuration of the sidelink CSI reference signal resources and CSI reporting latency bound;
- the (re-)configuration of the peer UE to perform sidelink DRX;
- the (re-)configuration of the latency bound of SL Inter-UE coordination report;
- the (re-)configuration of the local UE ID for L2 U2U Remote UEs by L2 U2U Relay UE.
- the response to the request in a RemoteUEInformationSidelink message for the SFN-DFN offset from the L2 U2N Remote UE;
- the change in the value of the SFN-DFN offset at the L2 U2N Relay UE.

NOTE: It is up to L2 U2N Relay UE implementation to determine when the SFN-DFN offset has changed in value to a degree requiring an update to be sent to the L2 U2N Remote UE.

In RRC_CONNECTED, the UE applies the NR sidelink communications parameters provided in RRCReconfiguration (if any). In RRC_IDLE or RRC_INACTIVE, the UE applies the NR sidelink communications parameters provided in system information (if any). For other cases, UEs apply the NR sidelink communications parameters provided in SidelinkPreconfigNR (if any). When UE performs state transition between above three cases, the UE applies the NR sidelink communications parameters provided in the new state, after acquisition of the new configurations. Before acquisition of the new configurations, UE continues applying the $N_R$ sidelink communications parameters provided in the old state.

5.8.9.1.2 Actions Related to Transmission of RRCReconfigurationSidelink Message

The UE shall set the contents of RRCReconfigurationSidelink message as follows:
1> for each sidelink DRB that is to be released, according to clause 5.8.9.1a.1.1, due to configuration by sl-ConfigDedicatedNR, SIB12, SidelinkPreconfigNR or by upper layers:
  2> set the entry included in the slrb-ConfigToReleaseList corresponding to the sidelink DRB;
1> for each sidelink DRB that is to be established or modified, according to clause 5.8.9.1a.2.1, due to receiving sl-ConfigDedicatedNR, SIB12 or SidelinkPreconfigNR:
  2> if the sidelink DRB is a per-hop sidelink DRB (i.e. the UE is not acting as a L2 U2U Remote UE):
    3> if a sidelink DRB is to be established:
      4> assign a new logical channel identity for the logical channel to be associated with the sidelink DRB and set sl-MAC-LogicalChannelConfigPC5 in the SLRB-Config to include the new logical channel identity;
    3> set the SLRB-Config included in the slrb-ConfigToAddModList, according to the received sl-RadioBearerConfig and sl-RLC-BearerConfig corresponding to the sidelink DRB;
  2> else if the sidelink DRB is an end-to-end sidelink DRB (i.e. the UE is acting as a L2 U2U Remote UE, and configure peer L2 U2U Remote UE with end-to-end SDAP and PDCP, or provide the L2 Relay UE with the QoS flow to end-to-end DRB mapping):
    3> if the UE is in RRC_CONNECTED:
      4> set the SLRB-Config included in the sirb-ConfigToAddModList, according to the received sl-RadioBearerConfig in sl-ConfigDedicatedNR;
    3> else if the UE is in RRC_IDLE/RRC_INACTIVE:
      4> set the SLRB-Config included in the sirb-ConfigToAddModList, which is derived by end-to-end QoS profile, according to the sl-RadioBearerConfig in SIB12;
    3> if the UE is out of coverage:
      4> set the SLRB-Config included in the slrb-ConfigToAddModList, which is derived by end-to-end QoS profile, according to the sl-RadioBearerConfig in SidelinkPreconfigNR;
1> for each additional sidelink RLC bearer that is to be released, according to clause 5.8.9.1a.5.1, due to configuration by sl-ConfigDedicatedNR, SIB12, SidelinkPreconfigNR or by upper layers:
  2> set the entry included in the sl-RLC-BearerToReleaseList corresponding to the additional sidelink RLC bearer;
1> for each additional sidelink RLC bearer that is to be established or modified, according to clause 5.8.9.1a.6.1, due to receiving sl-ConfigDedicatedNR, SIB12 or SidelinkPreconfigNR:

2> if an additional sidelink RLC bearer is to be established:
  3> assign a new logical channel identity for the logical channel to be associated with the sidelink DRB and set sl-MAC-LogicalChannelConfigPC5 in the SL-RLC-BearerConfig to include the new logical channel identity;
2> set the SL-RLC-BearerConfig included in the sl-RLC-BearerToAddModList, according to the received sl-RadioBearerConfig and sl-RLC-BearerConfig corresponding to the additional sidelink RLC bearer;
1> set the entry included in the sl-CarrierToReleaseList corresponding to the sidelink carrier(s) for which MAC entity indicates that the maximum number of consecutive HARQ DTX for a specific destination has been reached;
1> set the entry included in the sl-CarrierToAddModList corresponding to the sidelink carrier, taking into account of at least carrier(s) mapped to the sidelink QoS flow(s) configured by the upper layer, carriers configured in sl-ConfigDedicatedNR, SIB12 or SidelinkPreconfigNR, and carrier(s) supported by both UEs;
1> set the sl-MeasConfig as follows:
  2> If the frequency used for NR sidelink communication is included in sl-FreqInfoToAddModList/sl-FreqInfoToAddModListExt in sl-ConfigDedicatedNR within RRCReconfiguration message or included in sl-ConfigCommonNR within SIB12:
    3> if UE is in RRC_CONNECTED:
      4> set the sl-MeasConfig according to stored NR sidelink measurement configuration information for this destination;
    3> if UE is in RRC_IDLE or RRC_INACTIVE:
      4> set the sl-MeasConfig according to stored NR sidelink measurement configuration received from SIB12;
  2> else:
    3> set the sl-MeasConfig according to the sl-MeasPreConfig in SidelinkPreconfigNR;
1> set the sl-LatencyBoundIUC-Report;
1> start timer T400 for the destination;
1> set the sl-CSI-RS-Config;
1> set the sl-LatencyBoundCSI-Report;
1> set the sl-ResetConfig;
NOTE 1: Whether/how to set the parameters included in sl-LatencyBoundIUC-Report, sl-CSI-RS-Config, sl-LatencyBoundCSI-Report and sl-ResetConfig is up to UE implementation.
1> set the sl-DRX-ConfigUC-PC5 as follows:
  2> If the frequency used for NR sidelink communication is included in sl-FreqInfoToAddModList/sl-FreqInfoToAddModListExt in sl-ConfigDedicatedNR within RRCReconfiguration message or included in sl-ConfigCommonNR within SIB12:
    3> if UE is in RRC_CONNECTED and if sl-ScheduledConfig is included in sl-ConfigDedicatedNR within RRCReconfiguration:
      4> set the sl-DRX-ConfigUC-PC5 according to stored NR sidelink DRX configuration information for this destination;
NOTE 2: If UE is in RRC_IDLE or in RRC_INACTIVE or out of coverage, or in RRC_CONNECTED and sl-UE-SelectedConfig is included in sl-ConfigDedicatedNR within RRCReconfiguration, it is up to UE implementation to set the sl-DRX-ConfigUC-PC5.

1> for each PC5 Relay RLC channel that is to be released due to configuration by sl-ConfigDedicatedNR:
  2> set the SL-RLC-ChannelID corresponding to the PC5 Relay RLC channel in the sl-RLC-ChannelToReleaseListPC5;
1> for each PC5 Relay RLC channel that is to be established or modified due to receiving sl-ConfigDedicatedNR:
  2> if a PC5 Relay RLC channel is to be established:
    3> assign a new logical channel identity for the logical channel to be associated with the PC5 Relay RLC channel and set sl-MAC-LogicalChannelConfigPC5 in the SL-RLC-ChannelConfigPC5 to include the new logical channel identity;
  2> set the SL-RLC-ChannelConfigPC5 included in the sl-RLC-ChannelToAddModListPC5 according to the received SL-RLC-ChannelConfig corresponding to the PC5 Relay RLC channel, including setting sl-RLC-ChannelID-PC5 to the same value of sl-RLC-ChannelID received in SL-RLC-ChannelConfig;
1> if the UE is operating as a L2 U2N Relay UE:
  2> if the destination UE is a L2 U2N Remote UE that requested the SFN-DFN offset in a previous RemoteUEInformationSidelink message:
    3> if the SFN-DFN offset has changed since a previous transmission of the RRCReconfigurationSidelink message, or no previous transmission of the RRCReconfigurationSidelink message has occurred since the reception of the RemoteUEInformationSidelink message:
      4> set the sl-SFN-DFN-Offset according to the relation between the SFN timeline of the PCell and the DFN timeline;
1> if the UE is acting as L2 U2U Relay UE, and if the procedure is initiated to configure local ID to the connected L2 U2U Remote UEs:
  2> if the local ID pair is to be assigned or modified for an end-to-end PC5 connection, and if both the PC5-RRC connection with L2 U2U Remote UE and the PC5-RRC connection with peer L2 U2U Remote UE are successfully established:
    3> include an entry in sl-LocalID-PairToAddModList, and set the fields as below:
      4> according to association between User Info and L2 ID as specified in TS 23.304 [65], set sl-RemoteUE-LocalIdentity to include the new local UE ID, and set sl-RemoteUE-L2Identity to include the source L2 ID of L2 U2U Remote UE in the SL-SRAP-ConfigPC5, if needed;
      4> according to association between User Info and L2 ID as specified in TS 23.304 [65], set sl-PeerRemoteUE-LocalIdentity to include the new local UE ID, and and set sl-PeerRemoteUE-L2Identity to include the destination L2 ID of peer L2 U2U Remote UE in the SL-SRAP-ConfigPC5, if needed;
  2> else if the local ID pair is to be released for an end-to-end PC5 connection:
    3> include an entry in sl-LocalID-PairToReleaseList, with the value of SL-DestinationIdentity set to the destination L2 ID of the peer L2 U2U Remote UE;
1> if the UE is acting as L2 U2U Remote UE (i.e. Tx UE), and if the procedure is initiated to configure the first hop PC5 Relay RLC channel of an end-to-end sidelink DRB to the connected L2 U2N Relay UE (i.e. Rx UE), based on configuration in SIB12 or SidelinkPreconfigNR; or
1> if the UE is acting as L2 U2U Relay UE (i.e. Tx UE) and is in RRC_IDLE or in RRC_INACTIVE or OoC, and if the procedure is initiated to configure the second hop PC5 Relay RLC channel to the connected L2 U2N Remote UE (i.e. Rx UE) based on configuration in SIB12 or SidelinkPreconfigNR:
   2> if a PC5 Relay RLC channel is to be established:
      3> assign a new RLC channel ID and set sl-RLC-ChannelID-PC5 in the SL-RLC-ChannelConfigPC5 to include the new RLC channel ID;
      3> assign a new logical channel identity for the logical channel to be associated with the PC5 Relay RLC channel and set sl-MAC-LogicalChannelConfigPC5 in the SL-RLC-ChannelConfigPC5 to include the new logical channel identity;
      3> if the UE is in RRC_IDLE or in RRC_INACTIVE:
         4> set the SL-RLC-ChannelConfigPC5 included in the sl-RLC-ChannelToAddModListPC5 according to the SL-RLC-BearerConfig derived based on the per-hop QoS of the end-to-end SLRB according to SIB12;
      3> else if the UE is out of coverage:
         4> set the SL-RLC-ChannelConfigPC5 included in the sl-RLC-ChannelToAddModListPC5 according to the SL-RLC-BearerConfig derived based on the per-hop QoS of the SLRB according to SidelinkPreconfigNR;

NOTE 3: If UE is in RRC_IDLE or in RRC_INACTIVE or out of coverage, how to merge the split per-flow QoS on the first/second hop into a per-SLRB level QoS for RLC channel configuration derivation is up to UE implementation.

The UE shall submit the RRCReconfigurationSidelink message to lower layers for transmission.

5.8.9.1.3 Reception of an RRCReconfigurationSidelink by the UE

The UE shall perform the following actions upon reception of the RRCReconfigurationSidelink:
1> if the RRCReconfigurationSidelink includes the sl-ResetConfig:
   2> perform the sidelink reset configuration procedure as specified in 5.8.9.1.10;
1> if the RRCReconfigurationSidelink includes the slrb-ConfigToReleaseList:
   2> for each entry value included in the sirb-ConfigToReleaseList that is part of the current UE sidelink configuration;
      3> perform the sidelink DRB release procedure, according to clause 5.8.9.1a.1;
1> if the RRCReconfigurationSidelink includes the slrb-ConfigToAddModList:
   2> for each slrb-PC5-ConfigIndex value included in the slrb-ConfigToAddModList that is not part of the current UE sidelink configuration:
      3> if sl-MappedQoS-FlowsToAddList is included:
         4> apply the SL-PQFI included in sl-MappedQoS-FlowsToAddList;
      3> perform the sidelink DRB addition procedure, according to clause 5.8.9.1a.2;
   2> for each slrb-PC5-ConfigIndex value included in the slrb-ConfigToAddModList that is part of the current UE sidelink configuration:
      3> if sl-MappedQoS-FlowsToAddList is included:
         4> add the SL-PQFI included in sl-MappedQoS-FlowsToAddList to the corresponding sidelink DRB;
      3> if sl-MappedQoS-FlowsToReleaseList is included:
         4> remove the SL-PQFI included in sl-MappedQoS-FlowsToReleaseList from the corresponding sidelink DRB;
      3> if the sidelink DRB release conditions as described in clause 5.8.9.1a.1.1 are met:
         4> perform the sidelink DRB release procedure according to clause 5.8.9.1a.1.2;
      3> else if the sidelink DRB modification conditions as described in clause 5.8.9.1a.2.1 are met:
         4> perform the sidelink DRB modification procedure according to clause 5.8.9.1a.2.2;
1> if the RRCReconfigurationSidelink includes the sl-RLC-BearerToReleaseList:
   2> for each entry value included in the sl-RLC-BearerToReleaseList that is part of the current UE sidelink configuration;
      3> perform the additional sidelink RLC bearer release procedure, according to clause 5.8.9.1a.5;
1> if the RRCReconfigurationSidelink includes the sl-RLC-BearerToAddModList:
   2> for each SL-RLC-BearerConfigIndex value included in the sl-RLC-BearerToAddModList that is not part of the current UE sidelink configuration:
      3> perform the additional sidelink RLC bearer addition procedure, according to clause 5.8.9.1a.6;
   2> for each SL-RLC-BearerConfigIndex value included in the sl-RLC-BearerToAddModList that is part of the current UE sidelink configuration:
      3> perform the additional sidelink RLC bearer modification procedure, according to clause 5.8.9.1a.6;
1> if the RRCReconfigurationSidelink includes the sl-CarrierToReleaseList:
   2> for each entry value included in the sl-CarrierToReleaseList that is part of the current UE sidelink configuration;
      3> perform the sidelink carrier release procedure, according to clause 5.8.9.1b.1;
1> if the RRCReconfigurationSidelink includes the sl-CarrierToAddModList:
   2> for each sl-Carrier-Id value included in the sl-CarrierToAddModList that is not part of the current UE sidelink configuration:
      3> perform the sidelink carrier addition procedure, according to clause 5.8.9.1b.2;
   2> for each sl-Carrier-Id value included in the sl-CarrierToAddModList that is part of the current UE sidelink configuration:
      3> perform the carrier modification procedure, according to clause 5.8.9.1b.2;
1> if the RRCReconfigurationSidelink message includes the sl-MeasConfig:
   2> perform the sidelink measurement configuration procedure as specified in 5.8.10;
1> if the RRCReconfigurationSidelink message includes the sl-CSI-RS-Config:
   2> apply the sidelink CSI-RS configuration;
1> if the RRCReconfigurationSidelink message includes the sl-LatencyBoundCSI-Report:

2> apply the configured sidelink CSI report latency bound;
1> if the RRCReconfigurationSidelink includes the sl-RLC-ChannelToReleaseListPC5:
   2> for each SL-RLC-ChannelID value included in the sl-RLC-ChannelToReleaseListPC5 that is part of the current UE sidelink configuration:
      3> perform the PC5 Relay RLC channel release procedure, according to clause 5.8.9.7.1;
1> if the RRCReconfigurationSidelink includes the sl-RLC-ChannelToAddModListPC5:
   2> for each sl-RLC-ChannelID-PC5 value included in the sl-RLC-ChannelToAddModListPC5 that is not part of the current UE sidelink configuration:
      3> perform the PC5 Relay RLC channel addition procedure, according to clause 5.8.9.7.2;
   2> for each sl-RLC-ChannelID-PC5 value included in the sl-RLC-ChannelToAddModListPC5 that is part of the current UE sidelink configuration:
      3> perform the PC5 Relay RLC channel modification procedure according to clause 5.8.9.7.2;
1> if the RRCReconfigurationSidelink message includes the sl-DRX-ConfigUC-PC5; and
1> if the UE accepts the sl-DRX-ConfigUC-PC5:
   2> configure lower layers to perform sidelink DRX operation according to sl-DRX-ConfigUC-PC5 for the associated destination as defined in TS 38.321 [3];
1> if the RRCReconfigurationSidelink message includes the sl-LatencyBoundIUC-Report:
   2> apply the configured sidelink IUC report latency bound;
1> if the RRCReconfigurationSidelink message includes the sl-LocalID-PairToReleaseList or sl-LocalID-PairToAddModList:
   2> configure SRAP entity to perform NR sidelink L2 U2U relay operation accordingly for the end-to-end PC5 connection peer L2 U2U Remote UE as defined in TS 38.351 [65];
1> if the RRCReconfigurationSidelink message includes the sl-MappingToAddModListPC5 or sl-MappingToReleaseListPC5:
   2> configure lower layers to perform NR sidelink L2 U2U relay operation according to mapping between end-to-end sidelink bearer of L2 U2U Remote UE and egress PC5 Relay RLC channel as defined in TS 38.351 [65];
1> if the UE is unable to comply with (part of) the configuration included in the RRCReconfigurationSidelink (i.e. sidelink RRC reconfiguration failure):
   2> continue using the configuration used prior to the reception of the RRCReconfigurationSidelink message;
   2> set the content of the RRCReconfigurationFailureSidelink message;
      3> submit the RRCReconfigurationFailureSidelink message to lower layers for transmission;
1> if the RRCReconfigurationSidelink message includes the sl-SFN-DFN-Offset:
   2> if the sl-SFN-DFN-Offset is set to setup:
      3> apply the configured SFN-DFN time offset;
   2> if the sl-SFN-DFN-Offset is set to release:
      3> release the received sl-SFN-DFN-Offset;
1> else:
   2> set the content of the RRCReconfigurationCompleteSidelink message;
      3> if the UE rejects the sidelink DRX configuration sl-DRX-ConfigUC-PC5 received from the peer UE:
         4> include the sl-DRX-ConfigReject in the RRCReconfigurationCompleteSidelink message;
         4> consider no sidelink DRX to be applied for the corresponding sidelink unicast communication;
      3> submit the RRCReconfigurationCompleteSidelink message to lower layers for transmission;
NOTE 1: When the same logical channel is configured with different RLC mode by another UE, the UE handles the case as sidelink RRC reconfiguration failure.
NOTE 2: It is up to the UE implementation whether or not to indicate the rejection to the peer UE for a received sidelink DRX configuration.
[ . . . ]

5.8.9.1a Sidelink Radio Bearer Management

5.8.9.1a.1 Sidelink DRB Release

5.8.9.1a.1.1 Sidelink DRB Release Conditions

For NR sidelink communication, a sidelink DRB release is initiated in the following cases:
1> for groupcast, broadcast and unicast, if slrb-Uu-ConfigIndex (if any) of the sidelink DRB is included in sl-RadioBearerToReleaseList in sl-ConfigDedicatedNR; or
1> for groupcast and broadcast, if no sidelink QoS flow with data indicated by upper layers is mapped to the sidelink DRB for transmission, which is (re)configured by receiving SIB12 or SidelinkPreconfigNR; or
1> for groupcast, broadcast and unicast, if SL-RLC-BearerConfigIndex (if any) of the associated RLC entity (ies) (i.e., including the additional sidelink RLC bearer if applicable) for the sidelink DRB is included in sl-RLC-BearerToReleaseList/sl-RLC-BearerToReleaseListSizeExt in sl-ConfigDedicatedNR; or
1> for unicast, if no sidelink QoS flow with data indicated by upper layers is mapped to the sidelink DRB for transmission, which is (re)configured by receiving SIB12 or SidelinkPreconfigNR, and if no sidelink QoS flow mapped to the sidelink DRB, which is (re)configured by receiving RRCReconfigurationSidelink, has data; or
1> for unicast, if SLRB-PC5-ConfigIndex (if any) of the sidelink DRB is included in slrb-ConfigToReleaseList in RRCReconfigurationSidelink or if sl-ResetConfig is included in RRCReconfigurationSidelink; or
1> for unicast, when the corresponding PC5-RRC connection is released due to sidelink RLF being detected, according to clause 5.8.9.3; or
1> for unicast, when the corresponding PC5-RRC connection is released due to upper layer request according to clause 5.8.9.5.

5.8.9.1a.1.2 Sidelink DRB Release Operations

For each sidelink DRB, whose sidelink DRB release conditions are met as in clause 5.8.9.1a.1.1, the UE capable of NR sidelink communication that is configured by upper layers to perform $N_R$ sidelink communication shall:
- 1> for groupcast and broadcast; or
- 1> for unicast, if the sidelink DRB release was triggered after the reception of the RRCReconfigurationSidelink message; or
- 1> for unicast, after receiving the RRCReconfigurationCompleteSidelink message, if the sidelink DRB release was triggered due to the configuration received within the sl-ConfigDedicatedNR, SIB12, SidelinkPreconfigNR or indicated by upper layers:
  - 2> release the PDCP entity for NR sidelink communication associated with the sidelink DRB;
  - 2> if SDAP entity for NR sidelink communication associated with this sidelink DRB is configured:
    - 3> indicate the release of the sidelink DRB to the SDAP entity associated with this sidelink DRB (TS 37.324 [24], clause 5.3.3);
  - 2> release SDAP entities for NR sidelink communication, if any, that have no associated sidelink DRB as specified in TS 37.324 clause 5.1.2;
- 1> for groupcast and broadcast; or
- 1> for unicast, after receiving the RRCReconfigurationCompleteSidelink message, if the sidelink DRB release was triggered due to the configuration received within the sl-ConfigDedicatedNR:
  - 2> for each sl-RLC-BearerConfigIndex included in the received sl-RLC-BearerToReleaseList/sl-RLC-BearerToReleaseListSizeExt that is part of the current UE sidelink configuration:
    - 3> release the RLC entity and the corresponding logical channel for NR sidelink communication, associated with the sl-RLC-BearerConfigIndex.
- 1> for unicast, if the sidelink DRB release was triggered due to the reception of the RRCReconfigurationSidelink message; or
- 1> for unicast, after receiving the RRCReconfigurationCompleteSidelink message, if the sidelink DRB release was triggered due to the configuration received within the SIB12, SidelinkPreconfigNR or indicated by upper layers:
  - 2> release the RLC entity and the corresponding logical channel for NR sidelink communication associated with the sidelink DRB;
  - 2> perform the sidelink UE information procedure in clause 5.8.3 for unicast if needed.
- 1> if the sidelink radio link failure is detected for a specific destination:
  - 2> release the PDCP entity, RLC entity and the logical channel of the sidelink DRB for the specific destination.

Editor's Note: FFS on how to release SL DRB on E2E and hop configuration for U2U relay.

5.8.9.1a.2 Sidelink DRB Addition/Modification

5.8.9.1a.2.1 Sidelink DRB Addition/Modification Conditions

For NR sidelink communication, a sidelink DRB addition is initiated only in the following cases:
- 1> if any sidelink QoS flow is (re)configured by sl-ConfigDedicatedNR, SIB12, SidelinkPreconfigNR and is to be mapped to one sidelink DRB, which is not established; or
- 1> if any sidelink QoS flow is (re)configured by RRCReconfigurationSidelink and is to be mapped to a sidelink DRB, which is not established;

For NR sidelink communication, a sidelink DRB modification is initiated only in the following cases:
- 1> if any of the sidelink DRB related parameters is changed by sl-ConfigDedicatedNR, SIB12, SidelinkPreconfigNR or RRCReconfigurationSidelink for one sidelink DRB, which is established;

5.8.9.1a.2.2 Sidelink DRB Addition/Modification Operations

For the sidelink DRB, whose sidelink DRB addition conditions are met as in clause 5.8.9.1a.2.1, the UE capable of NR sidelink communication that is configured by upper layers to perform $N_R$ sidelink communication shall:
- 1> for groupcast and broadcast; or
- 1> for unicast, if the sidelink DRB addition was triggered due to the reception of the RRCReconfigurationSidelink message; or
- 1> for unicast, after receiving the RRCReconfigurationCompleteSidelink message, if the sidelink DRB addition was triggered due to the configuration received within the sl-ConfigDedicatedNR, SIB12, SidelinkPreconfigNR or indicated by upper layers:
  - 2> if an SDAP entity for NR sidelink communication associated with the destination and the cast type of the sidelink DRB does not exist:
    - 3> establish an SDAP entity for NR sidelink communication as specified in TS 37.324 clause 5.1.1;
  - 2> (re)configure the SDAP entity in accordance with the sl-SDAP-ConfigPC5 received in the RRCReconfigurationSidelink or sl-SDAP-Config received in sl-ConfigDedicatedNR, SIB12, SidelinkPreconfigNR, associated with the sidelink DRB;
  - 2> establish a PDCP entity for NR sidelink communication and configure it in accordance with the sl-PDCP-ConfigPC5 received in the RRCReconfigurationSidelink or sl-PDCP-Config received in sl-ConfigDedicatedNR, SIB12, SidelinkPreconfigNR, associated with the sidelink DRB;
  - 2> for a per-hop sidelink DRB (i.e. the UE is not acting as L2 U2U Remote UE):
    - 3> establish a RLC entity for NR sidelink communication and configure it in accordance with the sl-RLC-ConfigPC5 received in the RRCReconfigurationSidelink or sl-RLC-Config received in sl-ConfigDedicatedNR, SIB12, SidelinkPreconfigNR, associated with sidelink DRB;
    - 3> if this procedure was due to the reception of a RRCReconfigurationSidelink message:
      - 4> configure the MAC entity with a logical channel in accordance with the sl-MAC-LogicalChannelConfigPC5 received in the RRCReconfigurationSidelink associated with the sidelink DRB, and perform the sidelink UE information procedure in clause 5.8.3 for unicast if need;
    - 3> else if this procedure was due to the reception of a RRCReconfigurationCompleteSidelink message:
      - 4> configure the MAC entity with a logical channel associated with the sidelink DRB, in accordance with the sl-MAC-LogicalChannelConfig received in the sl-ConfigDedicatedNR, SIB12, SidelinkPreconfigNR;

3> else (i.e. for groupcast/broadcast):
   4> configure the MAC entity with a logical channel associated with the sidelink DRB, in accordance with the sl-MAC-LogicalChannelConfig received in the sl-ConfigDedicatedNR, SIB12, SidelinkPreconfigNR and assign a new LCID to this logical channel.
2> for an end-to-end sidelink DRB (i.e. the UE is acting as L2 U2U Remote UE):
   3> if the UE is in RRC_CONNECTED:
      4> associate this end-to-end sidelink DRB with the PC5 RLC channel indicated by sl-EgressRLC-ChannelPC5 included in sl-ConfigDedicatedNR, received from RRCReconfiguration;
   3> else if the UE is in RRC_IDLE or RRC_INACTIVE:
      4> associate this end-to-end sidelink DRB with the PC5 RLC channel derived by per-SLRB QoS profile of this end-to-end sidelink DRB based on the configuration in SIB12;
   3> else if the UE is out of coverage:
      4> associate this end-to-end sidelink DRB with the PC5 RLC channel derived by per-SLRB QoS profile of this end-to-end sidelink DRB based on the configuration in SidelinkPreconfigNR;
NOTE 1: When a sidelink DRB addition is due to the configuration by RRCReconfigurationSidelink, it is up to UE implementation to select the sidelink DRB configuration as necessary transmitting parameters for the sidelink DRB, from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

For the sidelink DRB, whose sidelink DRB modification conditions are met as in clause 5.8.9.1a.2.1, the UE capable of NR sidelink communication that is configured by upper layers to perform NR sidelink communication shall:
   1> for groupcast and broadcast; or
   1> for unicast, if the sidelink DRB modification was triggered due to the reception of the RRCReconfigurationSidelink message; or
   1> for unicast, after receiving the RRCReconfigurationCompleteSidelink message, if the sidelink DRB modification was triggered due to the configuration received within the sl-ConfigDedicatedNR, SIB12 or SidelinkPreconfigNR:
      2> reconfigure the SDAP entity of the sidelink DRB, in accordance with the sl-SDAP-ConfigPC5 received in the RRCReconfigurationSidelink or sl-SDAP-Config received in sl-ConfigDedicatedNR, SIB12, SidelinkPreconfigNR, if included;
      2> reconfigure the PDCP entity of the sidelink DRB, in accordance with the sl-PDCP-ConfigPC5 received in the RRCReconfigurationSidelink or sl-PDCP-Config received in sl-ConfigDedicatedNR, SIB12, SidelinkPreconfigNR, if included;
      2> reconfigure the RLC entity of the sidelink DRB, in accordance with the sl-RLC-ConfigPC5 received in the RRCReconfigurationSidelink or sl-RLC-Config received in sl-ConfigDedicatedNR, SIB12, SidelinkPreconfigNR, if included;
      2> reconfigure the logical channel of the sidelink DRB, in accordance with the sl-MAC-LogicalChannelConfigPC5 received in the RRCReconfigurationSidelink or sl-MAC-LogicalChannelConfig received in sl-ConfigDedicatedNR, SIB12, SidelinkPreconfigNR, if included.
[ . . . ]

5.8.9.7.1 PC5 Relay RLC Channel Release

The UE shall:
1> if the PC5 Relay RLC channel release was triggered after the reception of the RRCReconfigurationSidelink message; or
1> after receiving the RRCReconfigurationCompleteSidelink message, if the PC5 Relay RLC channel release was triggered due to the configuration received within the sl-ConfigDedicatedNR; or
1> for unicast in L2 U2U relay operation, if there is no end-to-end sidelink DRB(s) associated with this RLC channel:
   2> for each SL-RLC-ChannelID in sl-RLC-ChannelToReleaseList received in sl-ConfigDedicatedNR within RRCReconfiguration, or for each SL-RLC-ChannelID included in the received sl-RLC-ChannelToReleaseListPC5 that is part of the current UE sidelink configuration, or for the RLC channel to be released:
      3> release the RLC entity and the corresponding logical channel associated with the SL-RLC-ChannelID;
1> if the PC5 Relay RLC channel release was triggered for a specific destination by upper layers as specified in 5.8.9.5, or for a specific destination corresponding to the received sl-DestinationIdentityRemoteUE by upper layers as specified in 5.8.9.10.4, or due to sidelink RLF as specified in 5.8.9.3:
   2> release the RLC entity and the corresponding logical channel associated with the SL-RLC-ChannelID of the specific destination;
[ . . . ]

5.8.9.11 Sidelink UE Information

5.8.9.11.1 General

Figure 19:
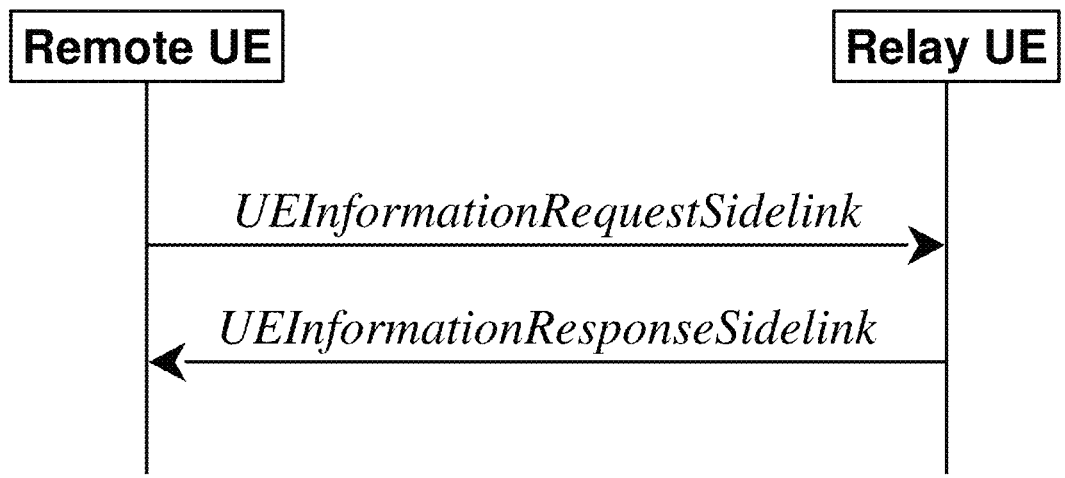
FIG. 19 is a reproduction of FIG. 5.8.9.11.1-1 of 3GPP TS 38.331 V18.0.0.

[FIG. 5.8.9.11.1-1 of 3GPP TS 38.331 V18.0.0, entitled "Sidelink UE information procedure", is reproduced as FIG. 19]

This purpose of this procedure is to transfer the UE information in sidelink. The L2 U2U Remote UE informs its end-to-end QoS information to its connected L2 U2U Relay UE in the UEInformationRequestSidelink message, and the L2 U2U Relay UE delivers the split Qos information of the first-hop to the Remote UE in the UEInformationResponseSidelink message.

Editor's Note: Whether this message arrangement is optimal can be discussed in maintenance. Whether to cover the case the Relay UE updates the QoS split can be discussed in maintenance.

5.8.9.11.2 Actions Related to Transmission of the UEInformationRequestSidelink by the UE For initial information transfer (e.g. for QoS split) or upon change in any of the information in the UEInformationRequestSidelink, the UE shall set the contents of UEInformationRequestSidelink message as follows:
1> if the UE is acting as L2 U2U Remote UE:
   2> set sl-E2E-QoS-ConnectionListPC5 to include the end-to-end QoS profile(s) of the sidelink QoS flow(s)

of peer L2 U2U Remote UE if configured by the upper layer, and for each entry:

3> set sl-DestinationIdentityRemoteUE to include the associated destination identity for peer L2 U2U Remote UE if configured by the upper layer;

2> submit the UEInformationRequestSidelink message to lower layers for transmission;

5.8.9.11.3 Actions Related to Reception of the UEInformationRequestSidelink by the UE The UE shall perform the following actions upon reception of the UEInformationRequestSidelink:

1> if the UE is acting as L2 U2U Relay UE:

2> if the UEInformationRequestSidelink includes the sl-E2E-QoS-ConnectionListPC5:

3> perform QoS split based on the sl-QoS-InfoList for each QoS flow to decide the split PDB value for each PC5 hop;

3> set the contents of UEInformationResponseSidelink message as follows:

4> set sl-SplitQoS-InfoListPC5 to include the split PDB value for each QoS flow on the first PC5 hop between L2 U2U Relay UE and L2 U2U Remote UE;

4> set sl-DestinationIdentityRemoteUE to include the associated destination identity for peer L2 U2U Remote UE if configured by the upper layer;

3> submit the UEInformationResponseSidelink message to lower layers for transmission;

NOTE: It is left to Relay UE implementation on how to split the PDB.

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE

| RRCReconfiguration message |
| --- |
| -- ASN1START |
| -- TAG-RRCRECONFIGURATION-START |
| ... |
| RRCReconfiguration-v1700-IEs ::=  SEQUENCE { |
|     otherConfig-v1700                                            OtherConfig-v1700 |
|     OPTIONAL, -- Need M |
|     sl-L2RelayUE-Config-r17                                   SetupRelease { SL-L2RelayUE-Config-r17 } |
|     OPTIONAL, -- Need M |
|     sl-L2RemoteUE-Config-r17                               SetupRelease { SL-L2RemoteUE-Config-r17 } |
|     OPTIONAL, -- Need M |
|     dedicatedPagingDelivery-r17                           OCTET STRING (CONTAINING Paging) |
|     OPTIONAL, -- Cond PagingRelay |
|     needForGapNCSG-ConfigNR-r17                      SetupRelease {Need ForGapNCSG-ConfigNR-r17} |
|     OPTIONAL, -- Need M |
|     needForGapNCSG-ConfigEUTRA-r17                SetupRelease {NeedForGapNCSG-ConfigEUTRA-r17} |
|     OPTIONAL, -- Need M |
|     musim-GapConfig-r17                                       SetupRelease {MUSIM-GapConfig-r17} |
|     OPTIONAL, -- Need M |
|     ul-GapFR2-Config-r17                                        SetupRelease { UL-GapFR2-Config-r17 } |
|     OPTIONAL, -- Need M |
|     scg-State-r17                                                    ENUMERATED { deactivated } |
|     OPTIONAL, -- Need N |
|     appLayerMeasConfig-r17                                  AppLayerMeasConfig-r17 |
|     OPTIONAL, -- Need M |
|     ue-TxTEG-RequestUL-TDOA-Config-r17         SetupRelease {UE-TxTEG-RequestUL-TDOA-Config-r17} |
|     OPTIONAL, -- Need M |
|     nonCriticalExtension                                          RRCReconfiguration-v1800-IEs |
|     OPTIONAL |
| } |
| ... |

SL-L2RelayUE-Config

The IE SL-L2RelayUE-Config is used to configure L2 U2N relay operation related configurations used by L2 U2N Relay UE, or L2 U2U relay operation related configurations used by L2 U2U Relay UE.

| SL-L2RelayUE-Config information element |
| --- |
| -- ASN1START |
| -- TAG-SL-L2RELAYUE-CONFIG-START |
| SL-L2RelayUE-Config-r17 ::=        SEQUENCE { |
|   sl-RemoteUE-ToAddModList-r17        SEQUENCE (SIZE (1..maxNrofRemoteUE-r17)) OF SL-RemoteUE-ToAddMod-r17   OPTIONAL,   -- Need N |

| SL-L2RelayUE-Config information element |
|---|
| sl-RemoteUE-ToReleaseList-r17    SEQUENCE (SIZE (1..maxNrofRemoteUE-r17)) OF SL-DestinationIdentity-r16   OPTIONAL,    -- Need N<br>...,<br>[[<br>  sl-U2U-RemoteUE-ToAddModList-r18   SEQUENCE (SIZE (1..maxNrofSL-Dest-r16)) OF SL-U2U-RemoteUE-ToAddMod-r18 OPTIONAL,   -- Need N<br>  sl-U2U-RemoteUE-ToReleaseList-r18    SEQUENCE (SIZE (1..maxNrofSL-Dest-r16)) OF SL-DestinationIdentity-r16   OPTIONAL       -- Need N<br>]]<br>}<br>...<br>SL-U2U-RemoteUE-ToAddMod-r18 ::=  SEQUENCE {<br>  sl-L2IdentityRemote-r18                SL-DestinationIdentity-r16,<br>  sl-SourceRemoteUE-ToAddModList-r18   SEQUENCE (SIZE (1..maxNrofSL-Dest-r16)) OF SL-SourceRemoteUE-ToAddMod-r18 OPTIONAL,   -- Need N<br>  sl-SourceRemoteUE-ToReleaseList-r18 SEQUENCE (SIZE (1..maxNrofSL-Dest-r16)) OF SL-SourceIdentity-r17                OPTIONAL,   -- Need N<br>...<br>}<br>SL-SourceRemoteUE-ToAddMod-r18 ::= SEQUENCE {<br>  sl-SourceUE-Identity-r18         SL-SourceIdentity-r17,<br>  sl-SRAP-ConfigU2U-r18            SL-SRAP-ConfigU2U-r18,<br>...<br>}<br>-- TAG-SL-L2RELAYUE-CONFIG-STOP<br>-- ASN1STOP |

| SL-L2RelayUE-Config field descriptions |
|---|
| sl-RemoteUE-ToAddModList |
| List of L2 U2N Remote UEs to be added and modified to the L2 U2N Relay UE. |
| sl-RemoteUE-ToReleaseList |
| List of L2 U2N Remote UEs to be released by the L2 U2N Relay UE. |
| sl-U2U-RemoteUE-ToAddModList |
| List of L2 U2U Remote UEs for which the related configuration is to be added and modified to the L2 U2U Relay UE. |
| sl-U2U-RemoteUE-ToReleaseList |
| List of L2 U2U Remote UEs for which the related configuration is to be released by the L2 U2U Relay UE. |

| SL-L2RelayUE-Config field descriptions |
|---|
| sl-U2U-SourceRemoteUE-ToAddModList |
| List of Source L2 U2U Remote UEs for which the related configuration is to be added and modified. |
| sl-U2U-SourceRemoteUE-ToReleaseList |
| List of Source L2 U2U Remote UEs for which the related configuration is to be released. |

SL-L2RemoteUE-Config

The IE SL-L2RemoteUE-Config is used to configure L2 U2N relay operation related configurations used by L2 U2N Remote UE, or L2 U2U relay operation related configurations used by L2 U2U Remote UE.

| SL-L2RemoteUE-Config information element |
|---|
| -- ASN1START<br>-- TAG-SL-L2REMOTEUE-CONFIG-START<br>SL-L2RemoteUE-Config-r17 ::=    SEQUENCE {<br>  sl-SRAP-ConfigRemote-r17         SL-SRAP-Config-r17 OPTIONAL,   -- Need M<br>  sl-UEIdentityRemote-r17             RNTI-Value OPTIONAL, -- Cond FirstRRCReconfig<br>  ...,<br>  [[<br>  sl-U2U-RelayUE-ToAddModList-r18      SEQUENCE (SIZE (1..maxNrofSL-Dest-r16)) OF SL-U2U-RelayUE-ToAddMod-r18     OPTIONAL,  -- Need N<br>  sl-U2U-RelayUE-ToReleaseList-r18        SEQUENCE (SIZE (1..maxNrofSL-Dest-r16)) OF SL-DestinationIdentity-r16             OPTIONAL   -- Need N<br>  ]]<br>}<br>SL-U2U-RelayUE-ToAddMod-r18 ::=     SEQUENCE {<br>  sl-L2IdentityRelay-r18            SL-DestinationIdentity-r16,<br>  sl-PeerRemoteUE-ToAddModList-r18    SEQUENCE (SIZE (1..maxNrofSL-Dest-r16)) OF SL-PeerRemoteUE-ToAddMod-r18 OPTIONAL,  -- Need N<br>  sl-PeerRemoteUE-ToReleaseList-r18       SEQUENCE (SIZE (1..maxNrofSL-Dest-r16)) OF SL-DestinationIdentity-r16           OPTIONAL,  -- Need N<br>  ...<br>} |

-continued

| SL-L2RemoteUE-Config information element |
|---|

```
SL-PeerRemoteUE-ToAddMod-r18 ::=        SEQUENCE {
    sl-TargetUE-Identity-r18                SL-DestinationIdentity-r16,
    sl-SRAP-ConfigU2U-r18                   SL-SRAP-ConfigU2U-r18,
    ...
}
-- TAG-SL-L2REMOTEUE-CONFIG-STOP
-- ASN1 STOP
```

| SL-L2RemoteUE-Config field descriptions |
|---|
| sl-SRAP-ConfigRemote |
| Indicates SRAP configuration used for L2 U2N Remote UE. |
| sl-UEIdentityRemote |
| Indicates the C-RNTI to the L2 U2N Remote UE. |
| sl-U2U-RelayUE-ToAddModList |
| List of L2 U2U Relay UEs for which the related configuration is to be added and modified to the L2 U2U Remote UE. |
| sl-U2U-RelayUE-ToReleaseList |
| List of L2 U2U Relay UEs for which the related configuration is to be released by the L2 U2U Remote UE. |
| sl-U2U-PeerRemoteUE-ToAddModList |
| List of Peer L2 U2U Remote UEs for which the related configuration is to be added and modified. |
| sl-U2U-PeerRemoteUE-ToReleaseList |
| List of Peer L2 U2U Remote UEs for which the related configuration is to be released. |

[ . . . ]

- SL-SRAP-ConfigU2U
The IE SL-SRAP-ConfigU2U is used to set the configurable SRAP parameters used by L2 U2U
Relay UE and L2 U2U Remote UE as specified in TS 38.351 [66].

| SL-SRAP-ConfigU2U information element |
|---|

```
-- ASN1START
-- TAG-SL-SRAP-CONFIGU2U-START
SL-SRAP-ConfigU2U-r18 ::=               SEQUENCE {
    sl-MappingToAddMod-U2U-List-r18         SEQUENCE (SIZE (1..maxSL-LCID-r16)) OF SL-
MappingToAddMod-U2U-r18    OPTIONAL,    -- Need N
    sl-MappingToRelease-U2U-List-r18        SEQUENCE (SIZE (1..maxSL-LCID-r16)) OF SLRB-Uu-
ConfigIndex-r16            OPTIONAL     -- Need N
}
SL-MappingToAddMod-U2U-r18 ::=          SEQUENCE {
    sl-RemoteUE-SLRB-Identity-r18           SLRB-Uu-ConfigIndex-r16,
    sl-EgressRLC-ChannelPC5-r18             SL-RLC-ChannelID-r17,
    ...
}
-- TAG-SL-SRAP-CONFIGU2U-STOP
-- ASN1 STOP
```

| SL-SRAP-ConfigU2U field descriptions |
|---|
| sl-MappingToAddMod-U2U-List |
| Indicates the list of mappings between the end-to-end sidelink bearer of a given L2 U2U Remote UE and the egress PC5 Relay RLC channel used by L2 U2U Remote UE and L2 U2U Relay UE when acting as Tx UE, as specified in TS 38.351 [66] to be added or modified. |
| sl-MappingToRelease-U2U-List |
| Indicates the list of mappings the end-to-end sidelink bearer of a given L2 U2U Remote UE and the egress PC5 Relay RLC channel as specified in TS 38.351 [66] to be released, |
| sl-EgressRLC-ChannelPC5 |
| Indicates the egress PC5 Relay RLC channel for sidelink transmissions at the L2 U2U Relay UE and at the L2 U2U Remote UE. |
| sl-RemoteUE-SLRB-Identity |
| Identity of the end-to-end sidelink bearer identity of the L2 U2U Remote UE. |

[ . . . ]

SidelinkUEInformationNR

The SidelinkUEinformationNR message is used for the indication of NR sidelink UE information to the network.

Signalling radio bearer: SRB1

RLC-SAP: AM

Logical channel: DCCH

Direction: UE to Network

| SidelinkUEInformationNR message |
|---|
| ```
-- ASN1START
-- TAG-SIDELINKUEINFORMATIONNR-START
...
SidelinkUEInformationNR-v1800-IEs ::=   SEQUENCE {
    sl-CarrierFailureList-r18           SL-CarrierFailureList-r18
OPTIONAL,
    sl-TxResourceReqL2-U2U-r18          SL-TxResourceReqL2-U2U-r18
OPTIONAL,
    sl-PosRxInterestedFreqList-r18      SL-InterestedFreqList-r16
OPTIONAL,
    sl-PosTxResourceReqList-r18         SL-TxResourceReqList-r16
OPTIONAL,
    nonCriticalExtension                SEQUENCE { }
OPTIONAL
}
...
SL-TxResourceReqL2-U2U-r18 ::=          SEQUENCE {
    sl-DestinationIdentityL2-U2U-r18    SL-DestinationIdentity-r16
OPTIONAL,
    sl-TxInterestedFreqListL2-U2U-r18     SL-TxInterestedFreqList-r16,
    sl-TypeTxSyncListL2-U2U-r18         SEQUENCE (SIZE (1..maxNrofFreqSL-r16)) OF SL-
TypeTxSync-r16,
    sl-CapabilityInformationSidelink-r18  OCTET STRING
OPTIONAL,
    sl-U2U-InfoList-r18                 SEQUENCE (SIZE (1.. maxNrofRemoteUE-r17)) OF SL-U2U-
Info-r18                OPTIONAL,
    ...
}
SL-U2U-Info-r18 ::=                     SEQUENCE {
    sl-U2U-Identity-r18                    CHOICE {
        sl-TargetUE-Identity-r18                SL-DestinationIdentity-r16,
        sl-SourceUE-Identity-r18                SL-SourceIdentity-r17
    },
    sl-E2E-QoS-InfoList-r18             SEQUENCE (SIZE (1.. maxNrofSL-QFIsPerDest-r16)) OF SL-
QoS-Info-r16        OPTIONAL,
    sl-PerHop-QoS-InfoList-r18          SEQUENCE (SIZE (1.. maxNrofSL-QFIsPerDest-r16)) OF SL-
SplitQoS-Info-r18   OPTIONAL,
    sl-PerSLRB-QoS-InfoList-r18         SEQUENCE (SIZE (1.. maxNrofSLRB-r16)) OF SL-PerSLRB-
QoS-Info-r18        OPTIONAL
}
...
SL-QoS-Info-r16 ::=                     SEQUENCE {
    sl-QoS-FlowIdentity-r16                SL-QoS-FlowIdentity-r16,
    sl-QoS-Profile-r16                     SL-QoS-Profile-r16
OPTIONAL
}
...
SL-SplitQoS-Info-r18 ::=                SEQUENCE {
    sl-QoS-FlowIdentity-r18                SL-QoS-FlowIdentity-r16,
    sl-SplitPacketDelayBudget-r18          INTEGER (0..1023)
OPTIONAL,
    ...
}
SL-PerSLRB-QoS-Info-r18 ::=             SEQUENCE {
    sl-RemoteUE-SLRB-Identity-r18          SLRB-Uu-ConfigIndex-r16,
    sl-QoS-ProfilePerSLRB-r18              SL-QoS-Profile-r16
OPTIONAL
}
-- TAG-SIDELINKUEINFORMATIONNR-STOP
-- ASN1 STOP
``` |

Editor's Note: Whether the per-SLRB QOS is reported in a list of E2E connections or all in one big list can be further checked in maintenance.

Editor's Note: Whether to differentiate U2U discovery and U2N discovery can be checked in maintenance.

[ . . . ]

| SL-TxResourceReqL2-U2U field descriptions |
|---|
| sl-DestinationIdentityL2-U2U |
| This field is used to indicate the destination L2 ID for which the TX resource request and allocation from the network are concerned for the established per-hop PC5 link between the L2 U2U Remote UE and L2 U2U Relay UE. |
| sl-TxInterestedFreqListL2-U2U |
| Each entry of this field indicates the index of frequency on which the UE is interested to transmit NR sidelink communication for established per-hop PC5 link. The value 1 corresponds to the frequency of first entry in sl-FreqInfoList broadcast in SIB12, the value 2 corresponds to the frequency of second entry in sl-FreqInfoList |

| SL-TxResourceReqL2-U2U field descriptions |
| --- |
| broadcast in SIB12 and so on. In this release, only value 1 can be included in the interested frequency list. In this release, only one entry can be included in the list. |

| SL-TxResourceReqL2-U2U field descriptions |
| --- |
| sl-U2U-InfoList |
| This field indicates the information related to a list of end-to-end PC5 links. |

| SL-U2U-Info field descriptions |
| --- |
| sl-U2U-Identity |
| This field is to identify a the end-to-end PC5 link. When a L2 U2U Remote UE reports info for the first hop, it includes sl-TargetUE-Identity to indicate the peer L2 Remote UE on the second hop, and when a L2 U2U Relay UE reports info for the second hop, it includes sl-SourceUE-Identity to indicate the source L2 U2U Remote UE on the first hop. |
| sl-E2E-QoS-InfoList |
| This field is used by L2 U2U Remote UE to indicate a list of end-to-end QoS info. |
| sl-PerHop-QoS-InfoList |
| This field is used by L2 U2U Remote UE to indicate a list of split QoS info for the first hop. |
| sl-PerSLRB-QoS-InfoList |
| This field is used by L2 U2U Relay UE to indicate a list of split QoS info for the second hop in per-SLRB level, with each entry in accordance with a end-to-end SLRB. |

[ . . . ]

RRCReconfigurationSidelink

The RRCReconfigurationSidelink message is the command to AS configuration of the PC5 RRC connection. It is only applied to unicast of NR sidelink communication.

Signalling radio bearer: SL-SRB3
RLC-SAP: AM
Logical channel: SCCH
Direction: UE to UE

| RRCReconfigurationSidelink message |
| --- |
| ```
-- ASN1START
--TAG-RRCRECONFIGURATIONSIDELINK-START
RRCReconfigurationSidelink  : :=                   SEQUENCE {
    rrc-TransactionIdentifier-r16                      RRC-TransactionIdentifier,
    criticalExtensions                                 CHOICE {
       rrcReconfigurationSidelink-r16                     RRCReconfigurationSidelink-r16-IEs,
       criticalExtensionsFuture                           SEQUENCE { }
    }
}
RRCReconfigurationSidelink-r16-IEs  : :=            SEQUENCE {
    slrb-ConfigToAddModList-r16                         SEQUENCE (SIZE (1..maxNrofSLRB-r16)) OF SLRB-Config-r16             OPTIONAL, -- Need N
    slrb-ConfigToReleaseList-r16                        SEQUENCE (SIZE (1..maxNrofSLRB-r16)) OF SLRB-PC5-ConfigIndex-r16       OPTIONAL, -- Need N
    sl-MeasConfig-r16                                   SetupRelease {SL-MeasConfig-r16}
OPTIONAL, -- Need M
    sl-CSI-RS-Config-r16                                SetupRelease {SL-CSI-RS-Config-r16}
OPTIONAL, -- Need M
    sl-ResetConfig-r16                                  ENUMERATED {true}
OPTIONAL, -- Need N
    sl-LatencyBoundCSI-Report-r16                       INTEGER (3..160)
OPTIONAL, -- Need M
    lateNonCriticalExtension                            OCTET STRING
OPTIONAL,
    nonCriticalExtension                                RRCReconfigurationSidelink-v1700-IEs
OPTIONAL
}
RRCReconfigurationSidelink-v1700-IEs  : := SEQUENCE {
    sl-DRX-ConfigUC-PC5-r17                             SetupRelease { SL-DRX-ConfigUC-r17 }
OPTIONAL, -- Need M
    sl-LatencyBoundIUC-Report-r17                       SetupRelease { SL-LatencyBoundIUC-Report-r17 }
OPTIONAL, -- Need M
    sl-RLC-ChannelToReleaseListPC5-r17                  SEQUENCE (SIZE (1..maxSL-LCID-r16)) OF SL-RLC-
ChannelID-r17 OPTIONAL, -- Need N
``` |

| RRCReconfigurationSidelink message |
|---|
| ```
    sl-RLC-ChannelToAddModListPC5-r17         SEQUENCE (SIZE (1 .. maxSL-LCID-r16) ) OF SL-RLC-
ChannelConfigPC5-r17 OPTIONAL, -- Need N
    nonCriticalExtension                       RRCReconfigurationSidelink-v1800-IEs
OPTIONAL
}
RRCReconfigurationSidelink-v1800-IEs : := SEQUENCE {
    sl-SFN-DFN-Offset-r18                      SetupRelease { SL-SFN-DFN-Offset-r18 }
OPTIONAL, -- Need M
    sl-CarrierToAddModList-r18                 SEQUENCE (SIZE (1 .. maxNrofFreqSL-1-r18) ) OF SL-
CarrierConfig-r18        OPTIONAL, -- Need N
    sl-CarrierToReleaseList-r18                SEQUENCE (SIZE (1 .. maxNrofFreqSL-1-r18) ) OF SL-
CarrierId-r18            OPTIONAL, -- Need N
    sl-RLC-BearerToReleaseList-r18             SEQUENCE (SIZE (1 .. maxNrofSLRB-r16) ) OF SL-RLC
BearerConfigIndex-r18        OPTIONAL, -- Need N
    sl-RLC-BearerToReleaseList-r18             SEQUENCE (SIZE (1 .. maxNrofSLRB-r16) ) OF SL-RLC
BearerConfigIndex-r18        OPTIONAL, -- Need N
    sl-LocalID-PairToReleaseList-r18           SEQUENCE (SIZE (1 .. maxNrofSL-Dest-r16) ) OF SL-
DestinationIdentity-r16          OPTIONAL, -- Need N
    sl-LocalID-PairToAddModList-r18            SEQUENCE (SIZE (1.. maxNrofSL-Dest-r16) ) OF SL-SRAP-
ConfigPC5-r18           OPTIONAL, -- Need N
    nonCriticalExtension                       SEQUENCE { }
OPTIONAL
}
SL-CarrierConfig-r18 : : = SEQUENCE {
    sl-Carrier-Id-r18                          SL-CarrierId-r18,
    sl-OffsetToCarrier-r18                     INTEGER (0 .. 2199),
    sl-AbsoluteFrequencyPointA-r18             ARFCN-ValueNR
OPTIONAL -- Need R
}
SL-CarrierConfig-r18 : : =                     INTEGER (0 .. maxNrofFreqSL-1-r18)
SL-RLC-BearerConfig-r18 : : =                  CHOICE {
    srb                                        SEQUENCE {
        sl-SRB-IdentityWithDuplication             INTEGER (1 .. 3),
        sL-RLC-BearerConfigIndex-r18               SLL-RLC-BearerConfigIndex-r18,
        ...
    },
    drb                                        SEQUENCE {
        slrb-PC5-ConfigIndex-r18                   SLRB-PC5-ConfigIndex-r16,
        sL-RLC-BearerConfigIndex-r18               SL-RIC-BearerConfigIndex-r18,
        sl-RLC-ConfigPC5-r18                       SL-RIC-ConfigPC5-r16
OPTIONAL, -- Need M
        s1-MAC-LogicalChannelConfigPC5-r18         SL-LogicalChannelConfigPC5-r16
OPTIONAL, -- Need M
        ...
    }
}
SL-RLC-BearerConfigIndex-r18 : :=              INTEGER (1.. maxSL-LCID-r16)
SL-LatencyBoundIUC-Report-r17: :=              INTEGER (3.. 160)
SLRB-Config-r16: :=                            SEQUENCE {
    slrb-PC5-ConfigIndex-r16                   SLRB-PC5-ConfigIndex-r16,
    sl-SDAP-ConfigPC5-r16                      SL-SDAP-ConfigPC5-r16
OPTIONAL, -- Need M
    sl-PDCP-ConfigPC5-r16                      SL-PDCP-ConfigPC5-r16
OPTIONAL, -- Need M
    sl-RLC-ConfigPC5-r16                       SL-RIC-ConfigPC5-r16
OPTIONAL, -- Need M
    sl-MAC-LogicalChannelConfigPC5-r16         SL-LogicalChannelConfigPC5-r16
OPTIONAL, -- Need M
    ...
}
SLRB-PC5-ConfigIndex-r16 : :=                  INTEGER (1.. maxNrofSLRB-r16)
SL-SDAP-ConfigPC5-r16 : :=                     SEQUENCE {
    sl-MappedQoS-FlowsToAddList-r16                SEQUENCE (SIZE (1 .. maxNrofSL-QFIsPerDest-r16) ) OF
SL-PQFI-r16 OPTIONAL, -- Need N
    sl-MappedQoS-FlowsToReleaseList-r16            SEQUENCE (SIZE (1.. maxNrofSL-QFIsPerDest-r16) ) OF
SL-PQFI-r16 OPTIONAL, -- Need N
    sl-SDAP-Header-r16                         ENUMERATED {present, absent},
    ...
}
SL-PDCP-ConfigPC5-r16 : :=                     SEQUENCE {
    sl-PDCP-SN-Size-r16                            ENUMERATED {len12bits, len18bits}
OPTIONAL, -- Need M
    sl-OutOfOrderDelivery-r16                  ENUMERATED {true }
OPTIONAL, -- Need R
    ...
}
``` |

| RRCReconfigurationSidelink message |
| --- |
| ```
SL-RLC-ConfigPC5-r16 : :=                CHOICE {
    sl-AM-RLC-r16                          SEQUENCE {
        sl-SN-FieldLengthAM-r16                SN-FieldLengthAM
OPTIONAL, -- Need M
        . . .
    },
    sl-UM-Bi-Directional-RLC-r16           SEQUENCE {
        sl-SN-FieldLengthUM-r16                SN-FieldLengthUM
OPTIONAL, -- Need M
        . . .
    },
    sl-UM-Uni-Directional-RLC-r16          SEQUENCE {
        sl-SN-FieldLengthUM-r16                SN-FieldLengthUM
OPTIONAL, -- Need M
        . . .
    }
}
SL-LogicalChannelConfigPC5-r16 : :=       SEQUENCE {
    sl-LogicalChannelIdentity-r16              LogicalChannelIdentity
    . . . ,
    [[
    sl-LogicalChannelIdentity-v1800            INTEGER (33..38)
    ]]
}
SL-PQFI-r16 : :=                          INTEGER (1..64)
SL-CSI-RS-Config-r16 : :=                 SEQUENCE {
    sl-CSI-RS-FreqAllocation-r16               CHOICE {
        sl-OneAntennaPort-r16                      BIT STRING (SIZE (12) ),
        sl-TwoAntennaPort-r16                      BIT STRING (SIZE (6) )
    }
OPTIONAL, -- Need M
    sl-CSI-RS-FirstSymbol-r16                  INTEGER (3..12)
OPTIONAL, -- Need M
    . . .
}
SL-RLC-ChannelConfigPC5-r17: :=           SEQUENCE {
    sl-RLC-ChannelID-PC5-r17                   SL-RLC-ChannelID-r17,
    sl-RLC-ConfigPC5-r17                       SL-RLC-ConfigPC5-r16
OPTIONAL, -- Need M
    sl-MAC-LogicalChannelConfigPC5-r17         SL-LogicalChannelConfigPC5-r16
OPTIONAL, -- Need M
    . . .
}
SL-SFN-DFN-Offset-r18 ::=                 SEQUENCE {
    sl-FrameOffset-r18                         INTEGER (0..1023),
    sl-SubframeOffset-r18                      INTEGER (0..9),
    sl-SlotOffset-r19                          INTEGER (0..31)
}
SL-SRAP-ConfigPC5-r18 ::=                 SEQUENCE {
    sl-PeerRemoteUE-L2Identity-r18             SL-DestinationIdentity-r16
OPTIONAL, -- Need M
    sl-PeerRemoteUE-LocalIdentity-r18          INTEGER (0..255)
OPTIONAL, -- Need M
    sl-PeerRemoteUE-L2Identity-r18             SL-SourceIdentity-r17
OPTIONAL, -- Need M
    sl-PeerRemoteUE-LocalIdentity-r18          INTEGER (0..255)
OPTIONAL, -- Need M
    . . .
}
-- TAG-RRCRECONFIGURATIONSIDELINK-STOP
-- ASN1STOP
``` |

Editor's note: Whether the field sl-AbsoluteFrequency-PointA, together with sl-OffsetToCarrier, is sufficient for Rx UE to understand the carrier to add/modify/release from Rx UE perspective.

| RRCReconfigurationSidelink field descriptions |
| --- |
| sl-AbsoluteFrequencyPointA |
| Absolute frequency of the reference resource block (Common RB 0). Its lowest subcarrier is also known as Point A. |

-continued

| RRCReconfigurationSidelink field descriptions |
| --- | sl-CarrierToAddModList

Indicate the carrier(s) to be added/modified for transmission by UE transmitting RRCReconfigurationSidelink message sl-CarrierToReleaseList Indicate the carrier(s) to be released for the transmission by UE transmitting RRCReconfigurationSidelink message.

sl-CSI-RS-FreqAllocation

Indicates the frequency domain position for sidelink CSI-RS.

sl-CSI-RS-FirstSymbol

Indicates the position of first symbol of sidelink CSI-RS.

sl-DRX-ConfigUC-PC5

Indicates the NR sidelink DRX configuration for unicast communication, as specified in TS 38.321 [3]

sl-LatencyBoundCSI-Report

Indicates the latency bound of SL CSI report from the associated SL CSI triggering in terms of number of slots.

sl-LatencyBoundIUC-Report

Indicates the latency bound of SL Inter-UE coordination report from the associated SL Inter-UE coordination explicit request triggering in terms of number of slots.

sl-LogicalChannelIdentity

Indicates the identity of the sidelink logical channel.

sl-MappedQoS-FlowsToAddList

Indicate the QoS flows to be mapped to the configured sidelink DRB. Each entry is indicated by the SL-PQFI, which is used between UEs, as defined in TS 23.287 [55].

sl-MappedQoS-FlowsToReleaseList

Indicate the QoS flows to be released from the configured sidelink DRB. Each entry is indicated by the SL-PQFI, which is used between UEs, as defined in TS 23.287 [55].

sl-MeasConfig

Indicates the sidelink measurement configuration for the unicast destination.

sl-OffsetToCarrier

Offset in frequency domain between Point A (lowest subcarrier of common RB 0) and the lowest usable subcarrier on this carrier in number of PRBs (using the subcarrierSpacing defined for this carrier). The maximum value corresponds to 275*8-1. See TS 38.211 [16], clause 4.4.2.

sl-OutOfOrderDelivery

Indicates whether or not outOfOrderDelivery specified in TS 38.323 [5] is configured. This field should be either always present or always absent, after the sidelink radio bearer is established.

sl-PDCP-SN-Size

Indicates the PDCP SN size of the configured sidelink DRB.

sl-Resetconfig

Indicates that the full configuration should be applicable for the RRCreconfigurationSidelink message.

sl-RLC-BearerToAddModList

Indicate the additional Sidelink RLC bearer to be added / modified for the configured sidelink DRB.

sl-RLC-BearerToReleaseList

Indicate the additional Sidelink RLC bearer to be released for the configured sidelink DRB.

sl-SDAP-Header

Indicates whether or not a SDAP header is present on this sidelink DRB.

sl-SFN-DFN-Offset

Indicates the SFN-DFN offset to be used for determining the SFN timeline based on the DFN timeline.

sl-SRB-IdentityWithDuplication

Indicate the sidelink SRB for which duplication is configured.

| RRCReconfigurationSidelink field descriptions |
| --- |
| slrb-PC5-ConfigIndex |
| Indicates the identity of the configuration of a sidelink DRB. In case of L2 U2U relay, only value 4-31 can be signaled for end-to-end sidelink DRB, and all other values are reserved. |

| SL-SRAP-ConfigPC5 field descriptions |
| --- |
| sl-RemoteUE-LocalIdentity |
| Indicates the local UE ID of the L2 U2U Remote UE used in SRAP as specified in TS 38.351 [66]. |
| sl-RemoteUE-L2Identity |
| Indicates the Source L2 ID of the L2 U2U Remote UE as specified in TS 23.304 [65]. |
| sl-PeerRemoteUE-LocalIdentity |
| Indicates the local UE ID of the peer L2 U2U Remote UE used in SRAP as specified in TS 38.351 [66]. |
| sl-PeerRemoteUE-L2Identity |
| Indicates the Source L2 ID of the peer L2 U2U Remote UE as specified in TS 23.304 [65]. |

[ . . . ]

UEInformationRequestSidelink

The UEInformationRequestSidelink message is used to transfer UE information in sidelink, e.g. the end-to-end Qos information for L2 U2U Relay operation.

Signalling radio bearer: SL-SRB3
    RLC-SAP: AM
    Logical channel: SCCH
    Direction: L2 U2U Remote UE to L2 U2U Relay UE

| UEInformationRequestSidelink field descriptions |
| --- |
| SL-E2E-QoS-ConnectionListPC5 |
| Indicates the QoS info for a list of end-to-end PC5 connections with each connection indicated by the destination L2 ID of the peer L2 U2U Remote UE. |

| UEInformationRequestSidelink message |
| --- |

```
-- ASN1START
-- TAG-UEINFORMATIONREQUESTSIDELINK-START
UEInformationRequestSidelink-r18 ::=          SEQUENCE {
    rrc-TransactionIdentifier-r18                 RRC-TransactionIdentifier,
    criticalExtensions                            CHOICE {
        ueInformationRequestSidelink-r18              UEInformationRequestSidelink-r18-IEs,
        criticalExtensionsFuture                      SEQUENCE { }
    }
}
UEInformationRequestSidelink-r18-IEs ::= SEQUENCE {
    sl-E2E-QOS-ConnectionListPC5-r18          SEQUENCE (SIZE (1 . . maxNrofSL-Dest-r16) ) OF SL-E2E-QoS-ConnectionPC5-r18 OPTIONAL, -- Need N
    lateNonCriticalExtension                  OCTET STRING OPTIONAL,
    nonCriticalExtension                      SEQUENCE { } OPTIONAL
}
SL-E2E-QOS-ConnectionPC5-r18 ::=          SEQUENCE {
    sl-DestinationIdentityRemoteUE-r18            SL-DestinationIdentity-r16,
    sl-QOS-InfoList-r18                           SEQUENCE (SIZE (1 . . maxNrofSL-QFIsPerDest-r16) ) OF SL-QOS-Info-r16
}
-- TAG-UEINFORMATIONREQUESTSIDELINK-STOP
-- ASN1STOP
```

UEInformationResponseSidelink

The UEInformationResponseSidelink message is used to deliver UE information in sidelink, e.g. the split Qos information for L2 U2U Relay operation.

Signalling radio bearer: SL-SRB3
RLC-SAP: AM
Logical channel: SCCH
Direction: L2 U2U Relay UE to L2 U2U Remote UE

| UEInformationResponseSidelink message |
|---|
| -- ASN1START<br>-- TAG-UEINFORMATIONRESPONSESIDELINK-START<br>UEInformationResponseSidelink-r18 ::=    SEQUENCE {<br>    rrc-TransactionIdentifier-r18    RRC-TransactionIdentifier,<br>    criticalExtensions    CHOICE {<br>      ueInformationResponseSidelink-r18    UEInformationResponseSidelink-r18-IEs,<br>      criticalExtensionsFuture    SEQUENCE { }<br>    }<br>}<br>UEInformationResponseSidelink-r18-IEs ::=    SEQUENCE {<br>    sl-SplitQoS-ConnectionListPC5-r18    SEQUENCE (SIZE (1 .. maxNrofSL-Dest-r16) ) OF SL-SplitQoS-ConnectionPC5-r18 OPTIONAL, -- Need N<br>    lateNonCriticalExtension    OCTET STRING OPTIONAL,<br>    nonCriticalExtension    SEQUENCE { } OPTIONAL<br>}<br>SL-SplitQoS-ConnectionPC5-r18 ::=    SEQUENCE {<br>    sl-DestinationIdentityRemoteUE-r18    SL-DestinationIdentity-r16,<br>    sl-SplitQoS-InfoList-r18    SEQUENCE (SIZE (1 .. maxNrofSL-QFIsPerDest-r16) ) OF SL-SplitQoS-Info-r18<br>}<br>SL-SplitQoS-Info-r18 ::=    SEQUENCE {<br>    sl-QoS-FlowIdentity-r18    SL-QOS-FlowIdentity-r16,<br>    sl-SplitPacketDelayBudget-r18    INTEGER (0 .. 1023) OPTIONAL -- Need M<br>}<br>-- TAG-UEINFORMATIONRESPONSESIDELINK-STOP<br>-- ASN1STOP |

| UEInformationResponseSidelink field description |
|---|
| sl-SplitQos-ConnectionListPC5 |
| Indicates the split PDB on the first PC5 hop between L2 U2U Relay Ue and the L2 U2U Remote UE for a list of end-to-end connection. |

[ . . . ]

SL-PreconfigurationNR

The IE SL-PreconfigurationNR includes the sidelink pre-configured parameters used for $N_R$ sidelink communication. Need codes or conditions specified for subfields in SL-PreconfigurationNR do not apply.

```
-- ASN1START
-- TAG-SL-PRECONFIGURATIONNR-START
SL-PreconfigurationNR-r16 ::=        SEQUENCE{
    sidelinkPreconfigNR-r16              SidelinkePreconfigNR-r16,
    ...
}
SidelinkPreconfigNR-r16 ::=          SEQUENCE {
    sl-PreconfigFreqInfoList-r16             SEQUENCE (SIZE (1. .maxNrofFreqSL-r16) ) OF SL-FreqConfigCommon-r16    OPTIONAL,
    sl-PreconfigNR-AnchorCarrierFreqList-r16     SL-NR-AnchorCarrierFreqList-r16 OPTIONAL,
    sl-PreconfigEUTRA-AnchorCarrierFreqList-r16  SL-EUTRA-AnchorCarrierFreqList-r16
    sl-RadioBearerPreConfigList-r16          SEQUENCE (SIZE (1. . maxNrofSLRB-r16) ) OF SL-RadioBearerConfig-r16   OPTIONAL,
    sl-RLC-BearerPreConfigList-r16           SEQUENCE (SIZE (1..maxSL-LCID-r16)) OF SL-RLC-BearerConfig-r16    OPTIONAL,
```

```
    sl-MeasPreConfig-r16                    SL-MeasConfigCommon-r16
OPTIONAL,
    sl-OffsetDFN-r16                        INTEGER (1..1000)
OPTIONAL,
    t400-r16                                ENUMERATED{ms100, ms200, ms300, ms400, ms600,
ms1000, ms1500, ms2000} OPTIONAL,
    sl-MaxNumConsecutiveDTX-r16             ENUMERATED {n1, n2, n3, n4, n6, n8, n16, n32}
OPTIONAL,
    sl-SSB-PriorityNR-r16                   INTEGER (1..8)
OPTIONAL,
    sl-PreconfigGeneral-r16                 SL-PreconfigGeneral-r16
OPTIONAL,
    sl-UE-SelectedPreConfig-r16             SL-UE-SelectedConfig-r16
OPTIONAL,
    sl-CSI-Acquisition-r16                  ENUMERATED {enabled}
OPTIONAL,
    sl-RoHC-Profiles-r16                    SL-RoHC-Profiles-r16
OPTIONAL,
    sl-MaxCID-r16                           INTEGER (1..16383)
DEFAULT 15,
    ...,
    [[
    sl-DRX-PreConfigGC-BC-r17               SL-DRX-ConfigGC-BC-r17
OPTIONAL,
    sl-TxProfileList-r17                    SL-TxProfileList-r17
OPTIONAL,
    sl-PreconfigDiscConfig-r17              SL-RemoteUE-Config-r17
OPTIONAL
    ]],
    [[
    sl-PreconfigFreqInfoListSizeExt-v1800   SEQUENCE (SIZE (1.. maxNrofFreqSL-1-r18) ) OF SL-
FreqConfigCommon-r16 OPTIONAL,
    sl-RLC-BearerConfigListSizeExt-v1800    SEQUENCE (SIZE (1.. maxSL-LCID-r16) ) OF SL-RLC-
BearerConfig-r16 OPTIONAL,
    sl-SyncFreqList-r18                     SEQUENCE (SIZE (1.. maxNrofFreqSL-r16) ) OF SL-
Freq-Id-r16 OPTIONAL,
    sl-SyncTxMultiFreq-r18                  ENUMERATED { true}
OPTIONAL,
    sl-PreconfigDiscConfig-v1800            SL-PreconfigDiscConfig-v1800
OPTIONAL
    ]]
}
SL-TxProfileList-r17 ::=                    SEQUENCE (SIZE (1.. 256) ) OF SL-TxProfile-r17
SL-TxProfile-r17 ::=                        ENUMERATED {drx-Compatible, drx-Incompatible, spare6,
spare5, spare4, spare3, spare2, spare1 }
SL-PreconfigGeneral-r16 : :=                SEQUENCE {
    sl-TDD-Configuration-r16                TDD-UL-DL-ConfigCommon
OPTIONAL,
    reservedBits-r16                        BIT STRING (SIZE (2) )
OPTIONAL,
    ...
}
SL-RoHC-Profiles-r16 : :=                   SEQUENCE {
    profile0x0001-r16                       BOOLEAN ,
    profile0x0002-r16                       BOOLEAN ,
    profile0x0003-r16                       BOOLEAN ,
    profile0x0004-r16                       BOOLEAN ,
    profile0x0006-r16                       BOOLEAN ,
    profile0x0101-r16                       BOOLEAN ,
    profile0x0102-r16                       BOOLEAN ,
    profile0x0103-r16                       BOOLEAN ,
    profile0x0104-r16                       BOOLEAN
}
SL-PreconfigDiscConfig-v1800 ::=            SEQUENCE {
    sl-RelayUE-PreconfigU2U-r18             SL-RelayUE-ConfigU2U-r18
    sl-RemoteUE-PreconfigU2U-r18            SL-RemoteUE-ConfigU2U-r18
}
-- TAG-SL-PRECONFIGURATIONNR-STOP
-- ASN1STOP
```

3GPP email discussion [Post125][402][Relay] 38.331 Rel-18 relay CR [4] introduced the following:

5.8.9.1.2 Actions Related to Transmission of RRCReconfigurationSidelink Message

The UE shall set the contents of RRCReconfiguration-Sidelink message as follows:

1> for each sidelink DRB that is to be released, according to clause 5.8.9.1a.1.1, due to configuration by sl-ConfigDedicatedNR, SIB12, SidelinkPreconfigNR or by upper layers:

2> set the entry included in the sirb-ConfigToReleaseList corresponding to the sidelink DRB;

1> for each sidelink DRB that is to be established or modified, according to clause 5.8.9.1a.2.1, due to receiving sl-ConfigDedicatedNR, SIB12 or SidelinkPreconfigNR:
  2> if the sidelink DRB is a per-hop sidelink DRB (i.e. the UE is performing non-relay $N_R$ sidelink communication with a peer UE):
    3> if a sidelink DRB is to be established:
      4> assign a new logical channel identity for the logical channel to be associated with the sidelink DRB and set sl-MAC-LogicalChannelConfigPC5 in the SLRB-Config to include the new logical channel identity;
    3> set the SLRB-Config included in the slrb-ConfigToAddModList, according to the received sl-RadioBearerConfig and sl-RLC-BearerConfig corresponding to the sidelink DRB;
  2> else if the sidelink DRB is an end-to-end sidelink DRB (i.e. the UE is acting as a L2 U2U Remote UE, and configure peer L2 U2U Remote UE with end-to-end SDAP and PDCP, or provide the L2 Relay UE with the QoS flow to end-to-end DRB mapping):
    3> if the UE is in RRC_CONNECTED:
      4> set the SLRB-Config included in the slrb-ConfigToAddModList, according to the received sl-RadioBearerConfig in sl-ConfigDedicatedNR;
    3> else if the UE is in RRC_IDLE/RRC_INACTIVE:
      4> set the SLRB-Config included in the slrb-ConfigToAddModList, which is derived by end-to-end QoS profile, according to the sl-RadioBearerConfig in SIB12;
    3> if the UE is out of coverage:
      4> set the SLRB-Config included in the slrb-ConfigToAddModList, which is derived by end-to-end QoS profile, according to the sl-RadioBearerConfig in SidelinkPreconfigNR;
1> for each additional sidelink RLC bearer that is to be released, according to clause 5.8.9.1a.5.1, due to configuration by sl-ConfigDedicatedNR, SIB12, SidelinkPreconfigNR or by upper layers:
  2> set the entry included in the sl-RLC-BearerToReleaseList corresponding to the additional sidelink RLC bearer;
1> for each additional sidelink RLC bearer that is to be established or modified, according to clause 5.8.9.1a.6.1, due to receiving sl-ConfigDedicatedNR, SIB12 or SidelinkPreconfigNR:
  2> if an additional sidelink RLC bearer is to be established:
    3> assign a new logical channel identity for the logical channel to be associated with the sidelink DRB and set sl-MAC-LogicalChannelConfigPC5 in the SL-RLC-BearerConfig to include the new logical channel identity;
  2> set the SL-RLC-BearerConfig included in the sl-RLC-BearerToAddModList, according to the received sl-RadioBearerConfig and sl-RLC-BearerConfig corresponding to the additional sidelink RLC bearer;
1> set the entry included in the sl-CarrierToReleaseList corresponding to the sidelink carrier(s) for which MAC entity indicates that the maximum number of consecutive HARQ DTX for a specific destination has been reached;
1> set the entry included in the sl-CarrierToAddModList corresponding to the sidelink carrier, taking into account of at least carrier(s) mapped to the sidelink QoS flow(s) configured by the upper layer, carriers configured in sl-ConfigDedicatedNR, SIB12 or SidelinkPreconfigNR, and carrier(s) supported by both UEs;
1> set the sl-MeasConfig as follows:
  2> If the frequency used for NR sidelink communication is included in sl-FreqInfoToAddModList/sl-FreqInfoToAddModListExt in sl-ConfigDedicatedNR within RRCReconfiguration message or included in sl-ConfigCommonNR within SIB12:
    3> if UE is in RRC_CONNECTED:
      4> set the sl-MeasConfig according to stored NR sidelink measurement configuration information for this destination;
    3> if UE is in RRC_IDLE or RRC_INACTIVE:
      4> set the sl-MeasConfig according to stored NR sidelink measurement configuration received from SIB12;
  2> else:
    3> set the sl-MeasConfig according to the sl-MeasPreConfig in SidelinkPreconfigNR;
1> set the sl-LatencyBoundIUC-Report;
1> start timer T400 for the destination;
1> set the sl-CSI-RS-Config;
1> set the sl-LatencyBoundCSI-Report; 1> set the sl-ResetConfig;
NOTE 1: Whether/how to set the parameters included in sl-LatencyBoundIUC-Report, sl-CSI-RS-Config, sl-LatencyBoundCSI-Report and sl-ResetConfig is up to UE implementation.
1> set the sl-DRX-ConfigUC-PC5 as follows:
  2> If the frequency used for NR sidelink communication is included in sl-FreqInfoToAddModList/sl-FreqInfoToAddModListExt in sl-ConfigDedicatedNR within RRCReconfiguration message or included in sl-ConfigCommonNR within SIB12:
    3> if UE is in RRC_CONNECTED and if sl-ScheduledConfig is included in sl-ConfigDedicatedNR within RRCReconfiguration:
      4> set the sl-DRX-ConfigUC-PC5 according to stored NR sidelink DRX configuration information for this destination;
NOTE 2: If UE is in RRC_IDLE or in RRC_INACTIVE or out of coverage, or in RRC_CONNECTED and sl-UE-SelectedConfig is included in sl-ConfigDedicatedNR within RRCReconfiguration, it is up to UE implementation to set the sl-DRX-ConfigUC-PC5.
1> for each PC5 Relay RLC channel that is to be released due to configuration by sl-ConfigDedicatedNR:
  2> set the SL-RLC-ChannelID corresponding to the PC5 Relay RLC channel in the sl-RLC-ChannelToReleaseListPC5;
1> for each PC5 Relay RLC channel that is to be established or modified due to receiving sl-ConfigDedicatedNR:
  2> if a PC5 Relay RLC channel is to be established:
    3> assign a new logical channel identity for the logical channel to be associated with the PC5 Relay RLC channel and set sl-MAC-LogicalChannelConfigPC5 in the SL-RLC-ChannelConfigPC5 to include the new logical channel identity;
  2> set the SL-RLC-ChannelConfigPC5 included in the sl-RLC-ChannelToAddModListPC5 according to the received SL-RLC-ChannelConfig corresponding to the PC5 Relay RLC channel, including setting sl-RLC-ChannelID-PC5 to the same value of sl-RLC-ChannelID received in SL-RLC-ChannelConfig;

1> if the UE is operating as a L2 U2N Relay UE:
  2> if the destination UE is a L2 U2N Remote UE that requested the SFN-DFN offset in a previous RemoteUEInformationSidelink message:
    3> if the SFN-DFN offset has changed since a previous transmission of the RRCReconfigurationSidelink message, or no previous transmission of the RRCReconfigurationSidelink message has occurred since the reception of the RemoteUEInformationSidelink message:
      4> set the sl-SFN-DFN-Offset according to the relation between the SFN timeline of the PCell and the DFN timeline;

1> if the UE is acting as L2 U2U Relay UE, and if the procedure is initiated to configure local ID pair to a connected L2 U2U Remote UE:
  2> if the local ID pair is to be assigned or modified for an end-to-end PC5 connection, and if the per-hop PC5-RRC connection with this L2 U2U Remote UE and the per-hop PC5-RRC connection with its peer L2 U2U Remote UE are successfully established:
    3> include an entry in sl-LocalID-PairToAddModList, and set the fields as below:
      4> according to association between User Info and L2 ID as specified in TS 23.304 [65], set sl-RemoteUE-L2Identity to the source L2 ID of this L2 U2U Remote UE, and set sl-RemoteUE-LocalIdentity to include the new local UE ID assigned to this L2 U2U Remote UE, in the SL-SRAP-ConfigPC5, if needed;
      4> according to association between User Info and L2 ID as specified in TS 23.304 [65], set sl-PeerRemoteUE-L2Identity to the destination L2 ID of the peer L2 U2U Remote UE, and set sl-PeerRemoteUE-LocalIdentity to include the new local UE ID assigned to the peer L2 U2U Remote UE, in the SL-SRAP-ConfigPC5, if needed;
  2> else if the local ID pair is to be released for an end-to-end PC5 connection:
    3> include an entry in sl-LocalID-PairToReleaseList, with the value of SL-Destinationidentity set to the destination L2 ID of the peer L2 U2U Remote UE;

1> if the UE is acting as L2 U2U Remote UE (i.e. Tx UE and is in RRC_IDLE or in RRC_INACTIVE or out of coverage), and if the procedure is initiated to add/modify the first hop PC5 Relay RLC channel of an end-to-end sidelink DRB to the connected L2 U2N Relay UE (i.e. Rx UE), based on configuration in SIB12 or SidelinkPreconfigNR; or 1> if the UE is acting as L2 U2U Relay UE (i.e. Tx UE) and is in RRC_IDLE or in RRC_INACTIVE or out of coverage, and if the procedure is initiated to add/modify the second hop PC5 Relay RLC channel to the connected L2 U2N Remote UE (i.e. Rx UE) based on configuration in SIB12 or SidelinkPreconfigNR:
  2> if a PC5 Relay RLC channel is to be established:
    3> assign a new RLC channel ID and set sl-RLC-ChannelID-PC5 in the SL-RLC-ChannelConfigPC5 to include the new RLC channel ID;
    3> assign a new logical channel identity for the logical channel to be associated with the PC5 Relay RLC channel and set sl-MAC-LogicalChannelConfigPC5 in the SL-RLC-ChannelConfigPC5 to include the new logical channel identity;
  2> if the UE is in RRC_IDLE or in RRC_INACTIVE:
    3> set the SL-RLC-ChannelConfigPC5 included in the sl-RLC-ChannelToAddModListPC5 according to the SL-RLC-BearerConfig derived based on the per-hop QoS of the end-to-end SLRB according to SIB12; 2> else if the UE is out of coverage:
    3> set the SL-RLC-ChannelConfigPC5 included in the sl-RLC-ChannelToAddModListPC5 according to the SL-RLC-BearerConfig derived based on the per-hop QoS of the SLRB according to SidelinkPreconfigNR;

1> if the UE is acting as L2 U2U Remote UE (i.e. Tx UE) and is in RRC_IDLE or in RRC_INACTIVE or out of coverage, and the procedure is initiated to release the first hop PC5 Relay RLC channel of an end-to-end sidelink DRB to the connected L2 U2N Relay UE (i.e. Rx UE) according to clause 5.8.9.7.1; or 1> if the UE is acting as L2 U2U Relay UE (i.e. Tx UE) and is in RRC_IDLE or in RRC_INACTIVE or out of coverage, and the procedure is initiated to release the second hop PC5 Relay RLC channel of an end-to-end sidelink DRB to the connected L2 U2N Remote UE (i.e. Rx UE) according to clause 5.8.9.7.1:
  2> set the SL-RLC-ChannelID corresponding to the PC5 Relay RLC channel in the sl-RLC-ChannelToReleaseListPC5;

NOTE 3: If UE is in RRC_IDLE or in RRC_INACTIVE or out of coverage, how to merge the split per-flow QoS on the first/second hop into a per-SLRB level QoS for RLC channel configuration derivation is up to UE implementation.

The UE shall submit the RRCReconfigurationSidelink message to lower layers for transmission.

[ . . . ]

5.8.9.1a Sidelink Radio Bearer Management 5.8.9.1a.1 Sidelink DRB Release 5.8.9.1a.1.1 Sidelink DRB Release Conditions For NR sidelink communication, a sidelink DRB release is initiated in the following cases:

1> for groupcast, broadcast and unicast, if srb-Uu-ConfigIndex (if any) of the sidelink DRB is included in sl-RadioBearerToReleaseList in sl-ConfigDedicatedNR; or 1> for groupcast and broadcast, if no sidelink QoS flow with data indicated by upper layers is mapped to the sidelink DRB for transmission, which is (re)configured by receiving SIB12 or SidelinkPreconfigNR; or 1> for groupcast, broadcast and unicast, if SL-RLC-BearerConfigIndex (if any) of the associated RLC entity (ies) (i.e., including the additional sidelink RLC bearer if applicable) for the sidelink DRB is included in sl-RLC-BearerToReleaseList/sl-RLC-BearerToReleaseListSizeExt in sl-ConfigDedicatedNR; or 1> for unicast, if no sidelink QoS flow with data indicated by upper layers is mapped to the sidelink DRB for transmission, which is (re)configured by receiving SIB12 or SidelinkPreconfigNR, and if no sidelink QoS flow mapped to the sidelink DRB, which is (re)configured by receiving RRCReconfigurationSidelink, has data; or 1> for unicast, if SLRB-PC5-ConfigIndex (if any) of the sidelink DRB is included in slrb-ConfigToReleaseList in RRCReconfigurationSidelink or if sl-ResetConfig is included in RRCReconfigurationSidelink; or
1> for unicast, when the corresponding PC5-RRC connection is released due to sidelink RLF being detected, according to clause 5.8.9.3; or
1> for unicast, when the corresponding PC5-RRC connection is released due to upper layer request according to clause 5.8.9.5; or
1> for L2 U2U relay operation, when the corresponding end-to-end PC5 connection failure/release is detected according to clause 5.8.9.3a, or 5.8.9.3b; or
1> for L2 U2U relay operation, if no sidelink QoS flow indicated by source L2 U2U Remote UE is mapped to the end-to-end sidelink DRB for transmission when the UE is acting as L2 U2N Relay UE.

5.8.9.1a.1.2 Sidelink DRB Release Operations

For each sidelink DRB, whose sidelink DRB release conditions are met as in clause 5.8.9.1a.1.1, the UE capable of NR sidelink communication that is configured by upper layers to perform $N_R$ sidelink communication shall:
1> for groupcast and broadcast; or
1> for unicast, if the sidelink DRB release was triggered after the reception of the RRCReconfigurationSidelink message; or
1> for unicast, after receiving the RRCReconfigurationCompleteSidelink message, if the sidelink DRB release was triggered due to the configuration received within the sl-ConfigDedicatedNR, SIB12, SidelinkPreconfigNR or indicated by upper layers:
  2> release the PDCP entity for NR sidelink communication associated with the sidelink DRB;
  2> if SDAP entity for NR sidelink communication associated with this sidelink DRB is configured:
    3> indicate the release of the sidelink DRB to the SDAP entity associated with this sidelink DRB (TS 37.324 [24], clause 5.3.3);
  2> release SDAP entities for NR sidelink communication, if any, that have no associated sidelink DRB as specified in TS 37.324 clause 5.1.2;
1> for groupcast and broadcast; or
1> for unicast, after receiving the RRCReconfigurationCompleteSidelink message, if the sidelink DRB release was triggered due to the configuration received within the sl-ConfigDedicatedNR:
  2> for each sl-RLC-BearerConfigIndex included in the received sl-RLC-BearerToReleaseList/sl-RLC-BearerToReleaseListSizeExt that is part of the current UE sidelink configuration:
    3> release the RLC entity and the corresponding logical channel for NR sidelink communication, associated with the sl-RLC-BearerConfigIndex.
1> for unicast, if the sidelink DRB release was triggered due to the reception of the RRCReconfigurationSidelink message; or
1> for unicast, after receiving the RRCReconfigurationCompleteSidelink message, if the sidelink DRB release was triggered due to the configuration received within the SIB12, SidelinkPreconfigNR or indicated by upper layers:
  2> release the RLC entity and the corresponding logical channel for NR sidelink communication associated with the sidelink DRB;
  2> perform the sidelink UE information procedure in clause 5.8.3 for unicast if needed.
1> if the sidelink radio link failure is detected for a specific destination:
  2> release the PDCP entity, RLC entity and the logical channel of the sidelink DRB for the specific destination.
1> if the sidelink DRB is an end-to-end sidelink DRB in L2 U2U relay operation:
  2> perform the PC5 Relay RLC channel release according to 5.8.9.7.1, if there is no other end-to-end sidelink DRB(s) associated with this RLC channel;
  2> if the UE is acting as a source L2 U2U Remote/Relay UE and is in RRC_CONNECTED:
    3> reconfigure the SRAP entity for the sidelink DRB, in accordance with the sl-SRAP-ConfigU2U received in sl-ConfigDedicatedNR, if included;
  2> else if the UE is acting as a source L2 U2U Remote UE/Relay and is in RRC_IDLE or RRC_INACTIVE:
    3> reconfigure the SRAP entity for the sidelink DRB derived based on configuration received in SIB12;
  2> else if the UE is acting as a source L2 U2U Remote/Relay UE and is out of coverage:
    3> reconfigure the SRAP entity for the sidelink DRB derived based on configuration received in SidelinkPreconfigNR;

5.8.9.1a.2 Sidelink DRB Addition/Modification

5.8.9.1a.2.1 Sidelink DRB Addition/Modification Conditions

For NR sidelink communication, a sidelink DRB addition is initiated only in the following cases:
1> if any sidelink QoS flow is (re)configured by sl-ConfigDedicatedNR, SIB12, SidelinkPreconfigNR and is to be mapped to one sidelink DRB, which is not established; or
1> if any sidelink QoS flow is (re)configured by RRCReconfigurationSidelink and is to be mapped to a sidelink DRB, which is not established;
1> if any sidelink QoS flow is (re)configured by source L2 U2U Remote UE and is mapped to a end-to-end sidelink DRB for transmission when the UE is acting as L2 U2N Relay UE; For NR sidelink communication, a sidelink DRB modification is initiated only in the following cases:
1> if any of the sidelink DRB related parameters is changed by sl-ConfigDedicatedNR, SIB12, SidelinkPreconfigNR or RRCReconfigurationSidelink for one sidelink DRB, which is established;

5.8.9.1a.2.2 Sidelink DRB Addition/Modification Operations

For the sidelink DRB, whose sidelink DRB addition conditions are met as in clause 5.8.9.1a.2.1, the UE capable of NR sidelink communication that is configured by upper layers to perform $N_R$ sidelink communication shall:
1> for groupcast and broadcast; or
1> for unicast, if the sidelink DRB addition was triggered due to the reception of the RRCReconfigurationSidelink message; or
1> for unicast, after receiving the RRCReconfigurationCompleteSidelink message, if the sidelink DRB addition was triggered due to the configuration received within the sl-ConfigDedicatedNR, SIB12, SidelinkPreconfigNR or indicated by upper layers:
2> if an SDAP entity for NR sidelink communication associated with the destination and the cast type of the sidelink DRB does not exist:
3> establish an SDAP entity for NR sidelink communication as specified in TS 37.324 clause 5.1.1;
2> (re)configure the SDAP entity in accordance with the sl-SDAP-ConfigPC5 received in the RRCReconfigurationSidelink or sl-SDAP-Config received in sl-ConfigDedicatedNR, SIB12, SidelinkPreconfigNR, associated with the sidelink DRB;
2> establish a PDCP entity for NR sidelink communication and configure it in accordance with the sl-PDCP-ConfigPC5 received in the RRCReconfigurationSidelink or sl-PDCP-Config received in sl-ConfigDedicatedNR, SIB12, SidelinkPreconfigNR, associated with the sidelink DRB;
2> for a per-hop sidelink DRB (i.e. the UE is performing NR sidelink communication with a peer UE):
3> establish a RLC entity for NR sidelink communication and configure it in accordance with the sl-RLC-ConfigPC5 received in the RRCReconfigurationSidelink or sl-RLC-Config received in sl-ConfigDedicatedNR, SIB12, SidelinkPreconfigNR, associated with sidelink DRB;
3> if this procedure was due to the reception of a RRCReconfigurationSidelink message:
4> configure the MAC entity with a logical channel in accordance with the sl-MAC-LogicalChannelConfigPC5 received in the RRCReconfigurationSidelink associated with the sidelink DRB, and perform the sidelink UE information procedure in clause 5.8.3 for unicast if need;
3> else if this procedure was due to the reception of a RRCReconfigurationCompleteSidelink message:
4> configure the MAC entity with a logical channel associated with the sidelink DRB, in accordance with the sl-MAC-LogicalChannelConfig received in the sl-ConfigDedicatedNR, SIB12, SidelinkPreconfigNR;
3> else (i.e. for groupcast/broadcast):
4> configure the MAC entity with a logical channel associated with the sidelink DRB, in accordance with the sl-MAC-LogicalChannelConfig received in the sl-ConfigDedicatedNR, SIB12, SidelinkPreconfigNR and assign a new LCID to this logical channel.
2> for an end-to-end sidelink DRB (i.e. the UE is acting as L2 U2U Remote UE):
3> if the UE is in RRC_CONNECTED:
4> associate this end-to-end sidelink DRB with the PC5 RLC channel indicated by sl-EgressRLC-ChannelPC5 included in sl-ConfigDedicatedNR, received from RRCReconfiguration;
3> else if the UE is in RRC_IDLE or RRC_INACTIVE:
4> consider the PC5 RLC channel derived by per-SLRB QoS profile of this end-to-end sidelink DRB based on the configuration in SIB12 as the egress PC5 relay RLC channel;
4> associate this end-to-end sidelink DRB with the PC5 RLC channel and configure the mapping to SRAP;
3> else if the UE is out of coverage:
4> consider the PC5 RLC channel derived by per-SLRB QoS profile of this end-to-end sidelink DRB based on the configuration in SidelinkPreconfigNR as the egress PC5 relay RLC channel;
4> associate this end-to-end sidelink DRB with the PC5 RLC channel and configure the mapping to SRAP;
NOTE 1: When a sidelink DRB addition is due to the configuration by RRCReconfigurationSidelink, it is up to UE implementation to select the sidelink DRB configuration as necessary transmitting parameters for the sidelink DRB, from the received sl-ConfigDedicatedNR (if in RRC_CONNECTED), SIB12 (if in RRC_IDLE/INACTIVE), SidelinkPreconfigNR (if out of coverage) with the same RLC mode as the one configured in RRCReconfigurationSidelink.

For the sidelink DRB, whose sidelink DRB modification conditions are met as in clause 5.8.9.1a.2.1, the UE capable of NR sidelink communication that is configured by upper layers to perform NR sidelink communication shall:
1> for groupcast and broadcast; or
1> for unicast, if the sidelink DRB modification was triggered due to the reception of the RRCReconfigurationSidelink message; or
1> for unicast, after receiving the RRCReconfigurationCompleteSidelink message, if the sidelink DRB modification was triggered due to the configuration received within the sl-ConfigDedicatedNR, SIB12 or SidelinkPreconfigNR:
2> reconfigure the SDAP entity of the sidelink DRB, in accordance with the sl-SDAP-ConfigPC5 received in the RRCReconfigurationSidelink or sl-SDAP-Config received in sl-ConfigDedicatedNR, SIB12, SidelinkPreconfigNR, if included;
2> reconfigure the PDCP entity of the sidelink DRB, in accordance with the sl-PDCP-ConfigPC5 received in the RRCReconfigurationSidelink or sl-PDCP-Config received in sl-ConfigDedicatedNR, SIB12, SidelinkPreconfigNR, if included;
2> reconfigure the RLC entity of the sidelink DRB, in accordance with the sl-RLC-ConfigPC5 received in the RRCReconfigurationSidelink or sl-RLC-Config received in sl-ConfigDedicatedNR, SIB12, SidelinkPreconfigNR, if included;
2> reconfigure the logical channel of the sidelink DRB, in accordance with the sl-MAC-LogicalChannelConfigPC5 received in the RRCReconfigurationSidelink or sl-MAC-LogicalChannelConfig received in sl-ConfigDedicatedNR, SIB12, SidelinkPreconfigNR, if included.
2> if the UE is in RRC_CONNECTED:
3> reconfigure the SRAP entity for the sidelink DRB, in accordance with the sl-SRAP-ConfigU2U received in sl-ConfigDedicatedNR, if included;
2> else if the UE is in RRC_IDLE or RRC_INACTIVE:
3> reconfigure the SRAP entity for the sidelink DRB derived based on configuration received in SIB12;
2> else if the UE is out of coverage:
3> reconfigure the SRAP entity for the sidelink DRB derived based on configuration received in SidelinkPreconfigNR.

[ . . . ]

5.8.9.7 PC5 Relay RLC Channel Management for L2 U2N or U2U Relay

5.8.9.7.1 PC5 Relay RLC Channel Release

The UE shall:
1> if the PC5 Relay RLC channel release was triggered after the reception of the RRCReconfigurationSidelink message; or
1> after receiving the RRCReconfigurationCompleteSidelink message, if the PC5 Relay RLC channel release was triggered due to the configuration received within the sl-ConfigDedicatedNR:
  2> for each SL-RLC-ChannelID in sl-RLC-ChannelToReleaseList received in sl-ConfigDedicatedNR within RRCReconfiguration, or for each SL-RLC-ChannelID included in the received sl-RLC-ChannelToReleaseListPC5 that is part of the current UE sidelink configuration:
    3> release the RLC entity and the corresponding logical channel associated with the SL-RLC-ChannelID;
1> if the PC5 Relay RLC channel release was triggered by end-to-end DRB release as specified in 5.8.9.1a.1.2:
  2> release the RLC entity and the corresponding logical channel;
1> if the PC5 Relay RLC channel release was triggered for a specific destination by upper layers as specified in 5.8.9.5, or due to sidelink RLF as specified in 5.8.9.3:
  2> release the RLC entity and the corresponding logical channel associated with the SL-RLC-ChannelID of the specific destination;

5.8.9.7.2 PC5 Relay RLC Channel Addition/Modification

Upon PC5-RRC connection establishment between the L2 U2N Relay UE and L2 U2N Remote UE, the L2 U2N Relay UE shall:
  1> establish a SRAP entity as specified in TS 38.351 [66], if no SRAP entity has been established;
  1> apply RLC specified configuration of SL-RLC0 as specified in clause 9.1.1.4:
  1> apply RLC default configuration of SL-RLC1 as defined in clause 9.2.4 if the L2 U2N Relay UE is in RRC_IDLE/INACTIVE state;
Upon PC5-RRC connection establishment between two UEs for L2 U2U relay operation the UE shall:
  1> establish a SRAP entity as specified in TS 38.351 [66], if no SRAP entity has been established;
  1> apply RLC specified configuration of SL-U2U-RLC as specified in clause 9.1.1.4; For L2 U2U Relay operation in RRC_IDLE/RRC_INACTVE or out of coverage, the PC5 Relay RLC channel addition/modification can be triggered due to the addition/modification/release of the end-to-end SL DRB(s). The source L2 U2U Remote UE and L2 U2N Relay UE derive the corresponding PC5 Relay RLC channel based on SIB12/Preconfiguraas follows:
    The source L2 U2U Remote UE derives the configuration for the PC5 Relay RLC channel(s) between L2 U2U Source Remote UE and L2 U2U relay UE (i.e. the first hop PC5 Relay RLC channel), by aggregating the split QoS profiles of the first hop into a per-SLRB level QoS profile for each end-to-end SL DRB, and considering the SL-RLC-Config (linked to the SL-RadioBearerConfig which matches the per-SLRB level QoS profile) as the first hop RLC channel configuration.
    The L2 U2U Relay UE derives the configuration for the PC5 Relay RLC channel(s) between L2 U2U relay UE and the target L2 U2U Source Remote UE (i.e. the second hop PC5 Relay RLC channel), by aggregating the split QoS profiles of the second hop into a per-SLRB level QoS profile for each end-to-end SL DRB, and considering the SL-RLC-Config (linked to the SL-RadioBearerConfig which matches the per-SLRB level Qos profile) as the second hop RLC channel configuration.

The UE shall:
1> if the PC5 Relay RLC channel addition/modification was triggered due to the reception of the RRCReconfigurationSidelink message; or
1> after receiving the RRCReconfigurationCompleteSidelink message, if the PC5 Relay RLC channel addition/modification was triggered due to the configuration received within the sl-ConfigDedicatedNR; or
1> after receiving the RRCReconfigurationCompleteSidelink message, if the PC5 Relay RLC channel addition/modification was triggered for an end-to-end sidelink DRB based on the configuration in SIB12 or SidelinkPreconfigNR:
  2> if the current configuration contains a PC5 Relay RLC channel with the received sl-RLC-ChannelID or sl-RLC-ChannelID-PC5; or
  2> if the configuration in SIB12 or SidelinkPreconfigNR has updated, based on which the PC5 Relay RLC channel is derived:
    3> reconfigure the sidelink RLC entity in accordance with the received sl-RLC-Config or sl-RLC-ConfigPC5;
    3> reconfigure the sidelink MAC entity with a logical channel in accordance with the received sl-MAC-LogicalChannelConfig or sl-MAC-LogicalChannelConfigPC5;
  2> else (a PC5 Relay RLC channel with the received sl-RLC-ChannelID or sl-RLC-ChannelID-PC5 was not configured before):
    3> establish a sidelink RLC entity in accordance with the received sl-RLC-Config (in sl-ConfigDedicatedNR, or SIB12, or SidelinkPreconfigNR) or sl-RLC-ConfigPC5;
    3> configure the sidelink MAC entity with a logical channel in accordance with the received sl-MAC-LogicalChannelConfig or sl-MAC-LogicalChannelConfigPC5.

[ . . . ]

SIB12

SIB12 contains NR sidelink communication/discovery configuration.

| SIB12 information element |
|---|

```
-- ASN1START
-- TAG-SIB12-START
SIB12-r16 : :=                      SEQUENCE {
    segmentNumber-r16               INTEGER (0 .. 63) ,
    segmentType-r16                 ENUMERATED {notLastSegment, lastSegment},
    segmentContainer-r16            OCTET STRING
}
SIB12-IEs-r16 : :=                  SEQUENCE {
    sl-ConfigCommonNR-r16           SL-ConfigCommonNR-r16,
    lateNonCriticalExtension        OCTET STRING                    OPTIONAL,
    ...,
    [[
    sl-DRX-ConfigCommonGC-BC-r17    SL-DRX-ConfigGC-BC-r17
OPTIONAL,      -- Need R
    sl-DiscConfigCommon-r17         SL-DiscConfigCommon-r17
OPTIONAL,      -- Need R
    sl-L2U2N-Relay-r17              ENUMERATED {enabled}
OPTIONAL,      -- Need R
    sl-NonRelayDiscovery-r17        ENUMERATED {enabled}
OPTIONAL,      -- Need R
    sl-L3U2N-RelayDiscovery-r17     ENUMERATED {enabled}
OPTIONAL,      -- Need R
    sl-TimersAndConstantsRemoteUE-r17 UE-TimersAndConstantsRemoteUE-r17
OPTIONAL       -- Need R
    ]],
    [[
    sl-FreqInfoListSizeExt-v1800          SEQUENCE (SIZE (1. . maxNrofFreqSL-1-r18) ) OF SL-
FreqConfigCommon-r16      OPTIONAL, -- Need R
    sl-RLC-BearerConfigListSizeExt-v1800  SEQUENCE (SIZE (1. . maxSL-LCID-r16) ) OF SL-RLC-
BearerConfig-r16          OPTIONAL, -- Need R
    sl-SyncFreqList-r18             SEQUENCE (SIZE (1. . maxNrofFreqSL-r16) ) OF SL-Freq-Id-r16
OPTIONAL,         -- Need R
    sl-SyncTxMultiFreq-r18          ENUMERATED { true}
OPTIONAL,      -- Need R
    sl-MaxTransPowerCA-r18          P-Max
OPTIONAL, -     - Need R
    sl-DiscConfigCommon-v1800       SL-DiscConfigCommon-v1800
OPTIONAL,      -- Need R
    sl-L2U2U-Relay-r18              ENUMERATED {enabled}
OPTIONAL       -- Need R
    ]]
}
SL-ConfigCommonNR-r16 : :=      SEQUENCE {
    sl-FreqInfoList-r16             SEQUENCE (SIZE (1. . maxNrofFreqSL-r16) ) OF SL-
FreqConfigCommon-r16      OPTIONAL,      -- Need R
    sl-UE-SelectedConfig-r16        SL-UE-SelectedConfig-r16
OPTIONAL,      -- Need R
    sl-NR-AnchorCarrierFreqList-r16 SL-NR-AnchorCarrierFreqList-r16
OPTIONAL, -- Need R
    sl-EUTRA-AnchorCarrierFreqList-r16  SL-EUTRA-AnchorCarrierFreqList-r16
OPTIONAL, -- Need R
    sl-RadioBearerConfigList-r16    SEQUENCE (SIZE (1. . maxNrofSLRB-r16) ) OF SL-
RadioBearerConfig-r16 OPTIONAL,     -- Need R
    sl-RLC-BearerConfigList-r16     SEQUENCE (SIZE (1. . maxSL-LCID-r16) ) OF SL-RLC-
BearerConfig-r16 OPTIONAL,      -- Need R
    sl-MeasConfigCommon-r16         SL-MeasConfigCommon-r16
OPTIONAL,      -- Need R
    sl-CSI-Acquisition-r16          ENUMERATED {enabled}
OPTIONAL,      -- Need R
    sl-OffsetDFN-r16                INTEGER (1..1000)
OPTIONAL,      -- Need R
    t400-r16                        ENUMERATED {ms100, ms200, ms300, ms400, ms600, ms1000,
ms1500, ms2000}    OPTIONAL,    -- Need R
    sl-MaxNumConsecutiveDTX-r16     ENUMERATED {n1, n2, n3, n4, n6, n8, n16, n32}
OPTIONAL,      -- Need R
    sl-SSB-PriorityNR-r16           INTEGER (1..8)
OPTIONAL -- Need R
}
SL-NR-AnchorCarrierFreqList-r16 : :=    SEQUENCE   (SIZE (1. . maxFreqSL-NR-r16) ) OF ARFCN-ValueNR
SL-EUTRA-AnchorCarrierFreqList-r16 : :=    SEQUENCE   (SIZE (1. . maxFreqSL-EUTRA-r16) ) OF ARFCN-
ValueEUTRA
```

| SIB12 information element |
|---|
| SL-DiscConfigCommon-r17 : :=       SEQUENCE {<br>sl-RelayUE-ConfigCommon-r17     SL-RelayUE-Config-r17,<br>sl-RemoteUE-ConfigCommon-r17   SL-RemoteUE-Config-r17<br>}<br>SL-DiscConfigCommon-v1800 : := SEQUENCE {<br>sl-RelayUE-ConfigCommonU2U-r18 SL-RelayUE-ConfigU2U-r18,<br>sl-RemoteUE-ConfigCommonU2U-r18 SL-RemoteUE-ConfigU2U-r18<br>}<br>-- TAG-SIB12-STOP<br>-- ASN1STOP |

Editor's Note: FFS whether a new L3 U2U Relay-specific indication is needed.

Editor's Note: The mapping configuration (from e2e SLRB to RLC channel) is needed in pre-configuration. The existing table format is used as a baseline, subject to discussion during maintenance.

| SIB12 field descriptions |
|---|
| [. . .]<br>sl-L2U2N-Relay |
| This field indicates the support of NR sidelink Layer-2 U2N relay operation.<br>sl-L2U2U-Relay |
| This field indicates the support of NR sidelink Layer-2 U2U relay operation.<br>sl-L3U2N-RelayDiscovery |
| This field indicates the support of L3 U2N relay AS-layer capability, i.e. NR sidelink relay discovery.<br>. . .<br>sl-RadioBearerConfigList |
| This field indicates one or multiple sidelink radio bearer configurations.<br>sl-RLC-BearerConfigList, sl-RLC-BearerConfigListSizeExt |
| This field indicates one or multiple sidelink RLC bearer configurations. For L2 U2U operation, sl-RLC-BearerConfigList also indicates the PC5 Relay RLC Channel configurations.<br>. . . |

[ . . . ]
SL-RLC-ChannelConfig

The IE SL-RLC-ChannelConfig specifies the configuration information for PC5 Relay RLC channel between L2 U2N Relay UE and L2 U2N Remote UE, or between L2 U2U Remote UE and L2 U2U Relay UE.

| SL-RLC-ChannelConfig information element |
|---|
| -- ASN1START<br>-- TAG-SL-RLC-RLC-CHANNEL-CONFIG-START<br>SL-RLC-ChannelConfig-r17 : :=     SEQUENCE {<br>  sl-RLC-ChannelID-r17         SL-RLC-ChannelID-r17,<br>  sl-RLC-Config-r17            SL-RLC-Config-r16<br>OPTIONAL,   -- Need M<br>sl-MAC-LogicalChannelConfig-r17     SL-LogicalChannelConfig-r16<br>OPTIONAL,   -- Need M<br>  sl-PacketDelayBudget-r17         INTEGER (0 .. 1023)<br>OPTIONAL,   -- Need M<br>. . . }<br>-- TAG-SL-RLC-CHANNEL-CONFIG-STOP<br>-- ASN1STOP |

| SL-RLC-ChannelConfig field descriptions |
|---|
| sl-MAC-LogicalChannelConfig |
| The field is used to configure MAC SL logical channel parameters.<br>sl-RLC-ChannelID |
| Indicates the PC5 Relay RLC channel in the link between L2 U2N Relay UE and L2 U2N Remote UE, or between L2 U2U Remote UE and L2 U2U Relay UE. |

| SL-RLC-ChannelConfig field descriptions |
| --- |
| sl-RLC-Config |
| Determines the RLC mode (UM, AM) and provides corresponding parameters. |
| sl-PacketDelayBudget |
| Indicates the Packet Delay Budget for a PC5 Relay RLC channel used in L2 U2N relay operation. Upper bound value for the delay that a packet may experience expressed in unit of 0.5 ms. |

3GPP TS 23.304 describes support of Rel-18 single hop UE-to-UE Relay. That is, a relay User Equipment (UE) may be used to support communication between two (Layer-2 or Layer-3) Proximity-based services (ProSe) End UEs in case these two UEs cannot communicate with each other directly. A UE-to-UE Relay UE establishes one PC5 link with each of the two ProSe End UEs containing a source ProSe end UE (e.g. on first PC5 hop) and a target ProSe end UE (e.g. on second PC5 hop) for forwarding traffic of the concerned ProSe service(s) between the two ProSe End UEs.

For establishing the PC5 links, the layer-2 link establishment procedure not integrated discovery as specified in clause 6.7.1 in 3GPP TS 23.304 or the layer-2 link establishment procedure integrated discovery as specified in clause 6.7.3 in 3GPP TS 23.304 may be used. A PC5 link may be associated with a relay service code and can support one or more services/applications identified by one or more ProSe identifiers.

According to 3GPP TS 38.300, the relay UE may allocate/assign a local UE Identity/Identifier (ID) for each end UE (i.e. a source end UE or a target end UE) after the UE-to-UE (U2U) relay communication is established. According to 3GPP TS 38.331, local UE ID and Layer-2 ID of an end UE are sent to a peer end UE along with local UE ID and Layer-2 ID of the peer end UE by using PC5 RRC message (i.e. RRCReconfigurationSidelink). It is noted that the source end UE may establish one or more end-to-end (E2E) Sidelink (SL) Data Radio Bearers (DRBs) with the target end UE for supporting the U2U relay communication via the relay UE.

The configuration for establishing the one or more end-to-end SL DRBs can be derived from SIB12 if this UE is in RRC_IDLE or RRC_INACTIVE. In addition, each of the one or more end-to-end SL DRBs could be mapped to a PC5 Relay Radio Link Control (RLC) channel. Thus, the source end UE and the relay UE may establish one or more PC5 Relay RLC channels on the first hop for supporting transmission from the source end UE to the relay UE. The configuration for establishing the one or more PC5 Relay RLC channels can be derived from the SIB12. It is noted that the source end UE may send end-to-end QoS info for each PC5 QoS flow to the relay UE for PC5 QoS split (by using e.g. UEInformationRequestSidelink), and then the relay UE may respond the split QoS info to the source end UE (by using e.g. UEInformationResponseSidelink). Based on the split QoS info, the source end UE can then establish a PC5 Relay RLC channel derived by the split QoS info of an end-to-end SL DRB based on the configuration in SIB12 (for example, the source end UE may select a PC5 Relay RLC Channel configuration in which the sidelink packet delay budget can satisfy the split PDB in the split QoS info), and then associate this end-to-end SL DRB with this PC5 Relay RLC channel.

Possibly, SIB12 in a serving cell may be updated, UE could move to another cell (and thus applying SIB12 of this cell), UE could move out of cell coverage (and thus applying SidelinkPreconfigNR rather than SIB12) or UE could come back to cell coverage (and thus applying SIB12 rather than SidelinkPreconfigNR). In such scenario(s), an End-to-End (E2E) SL DRB may be mapped from a PC5 Relay RLC channel to another PC5 Relay RLC channel and thus there is no E2E SL DRB mapped to the PC5 Relay RLC channel. For example, the source end UE in the beginning may establish a first E2E SL DRB, a second E2E SL DRB, a first PC5 Relay RLC channel (on first hop) and a second PC5 Relay RLC channel (on first hop). When one of above scenarios occurs, the source end UE may need to apply a new PC5 Relay RLC channel configuration which can satisfy the QoS requirement of both the first E2E SL DRB and the second E2E SL DRB. In this situation, the source end UE may just need one PC5 Relay RLC channel. Thus, the source end UE may reconfigure one PC5 Relay RLC channel (e.g. the second PC5 Relay RLC channel) for serving the first E2E SL DRB and the second E2E SL DRB and thus the useless PC5 Relay RLC channel (e.g. the first PC5 Relay RLC channel) should be released. However, this scenario is not covered in the 3GPP email discussion [Post125][402][Relay] 38.331 Rel-18 relay CR (Huawei) since there is no condition for triggering PC5 Relay RLC channel release in case of sidelink DRB modification. If the source end UE is implemented based on the 3GPP email discussion [Post125][402][Relay] 38.331 Rel-18 relay CR (Huawei), it would not release the useless PC5 Relay RLC channel and thus would cause UE memory consumption.

To address the issue, an example of text proposal for Source End UE on top of the 3GPP email discussion [Post125][402][Relay] 38.331 Rel-18 relay CR (Huawei) could be illustrated below. That is, in response to end-to-end DRB modification (for e.g. remapping the first E2E SL DRB from the first PC5 Relay RLC channel to the second PC5 Relay RLC channel), the source end UE may perform the PC5 Relay RLC channel release for releasing the first PC5 Relay RLC channel if there is no other end-to-end sidelink DRB(s) associated with the first PC5 Relay RLC channel.

5.8.9.7.1 PC5 Relay RLC Channel Release

The UE shall:
1> if the PC5 Relay RLC channel release was triggered after the reception of the RRCReconfigurationSidelink message; or
1> after receiving the RRCReconfigurationCompleteSidelink message, if the PC5 Relay RLC channel release was triggered due to the configuration received within the sl-ConfigDedicatedNR:
2> for each SL-RLC-ChannelID in sl-RLC-Channel-ToReleaseList received in sl-ConfigDedicatedNR within RRCReconfiguration, or for each SL-RLC-ChannelID included in the received sl-RLC-ChannelToReleaseListPC5 that is part of the current UE sidelink configuration:
3> release the RLC entity and the corresponding logical channel associated with the SL-RLC-ChannelID;
1> if the PC5 Relay RLC channel release was triggered by end-to-end DRB release as specified in 5.8.9.1a.1.2 or end-to-end DRB modification as specified in 5.8.9.1a.2.2:
2> release the RLC entity and the corresponding logical channel;
1> if the PC5 Relay RLC channel release was triggered for a specific destinatyion by upper layers as specified in 5.8.9.5, or due to sidelink RLF as specified in 5.8.9.3:
2> release the RLC entity and the corresponding logical channel associated with the SL-RLC-ChannelID of the specific destination;
[ . . . ]

5.8.9.1a.2.2 Sidelink DRB Addition/Modification Operations

<omitted>
For the sidelink DRB, whose sidelink DRB modification conditions are met as in clause 5.8.9.1a.2.1, the UE capable of NR sidelink communication that is configured by upper layers to perform NR sidelink communication shall:
1> for groupcast and broadcast; or
1> for unicast, if the sidelink DRB modification was triggered due to the reception of the RRCReconfigurationSidelink message; or
1> for unicast, after receiving the RRCReconfigurationCompleteSidelink message, if the sidelink DRB modification was triggered due to the configuration received within the sl-ConfigDedicatedNR, SIB12 or SidelinkPreconfigNR:
2> reconfigure the SDAP entity of the sidelink DRB, in accordance with the sl-SDAP-ConfigPC5 received in the RRCReconfigurationSidelink or sl-SDAP-Config received in sl-ConfigDedicatedNR, SIB12, SidelinkPreconfigNR, if included;
2> reconfigure the PDCP entity of the sidelink DRB, in accordance with the sl-PDCP-ConfigPC5 received in the RRCReconfigurationSidelink or sl-PDCP-Config received in sl-ConfigDedicatedNR, SIB12, SidelinkPreconfigNR, if included;
2> reconfigure the RLC entity of the sidelink DRB, in accordance with the sl-RLC-ConfigPC5 received in the RRCReconfigurationSidelink or sl-RLC-Config received in sl-ConfigDedicatedNR, SIB12, SidelinkPreconfigNR, if included;
2> reconfigure the logical channel of the sidelink DRB, in accordance with the sl-MAC-LogicalChannelConfigPC5 received in the RRCReconfigurationSidelink or sl-MAC-LogicalChannelConfig received in sl-ConfigDedicatedNR, SIB12, SidelinkPreconfigNR, if included.
1> if the sidelink DRB is an end-to-end sidelink DRB in L2 U2U relay operation:
2> if the UE is in RRC_CONNECTED:
3> reconfigure the SRAP entity for the sidelink DRB, in accordance with the sl-SRAP-ConfigU2U received in sl-ConfigDedicatedNR, if included;
2> else if the UE is in RRC_IDLE or RRC_INACTIVE:
3> reconfigure the SRAP entity for the sidelink DRB derived based on configuration received in SIB12;
2> else if the UE is out of coverage:
3> reconfigure the SRAP entity for the sidelink DRB derived based on configuration received in SidelinkPreconfigNR.
2> perform the PC5 Relay RLC channel release according to 5.8.9.7.1, if there is no other end-to-end sidelink DRB(s) associated with a PC5 Relay RLC channel;
. . .

Figure 20:
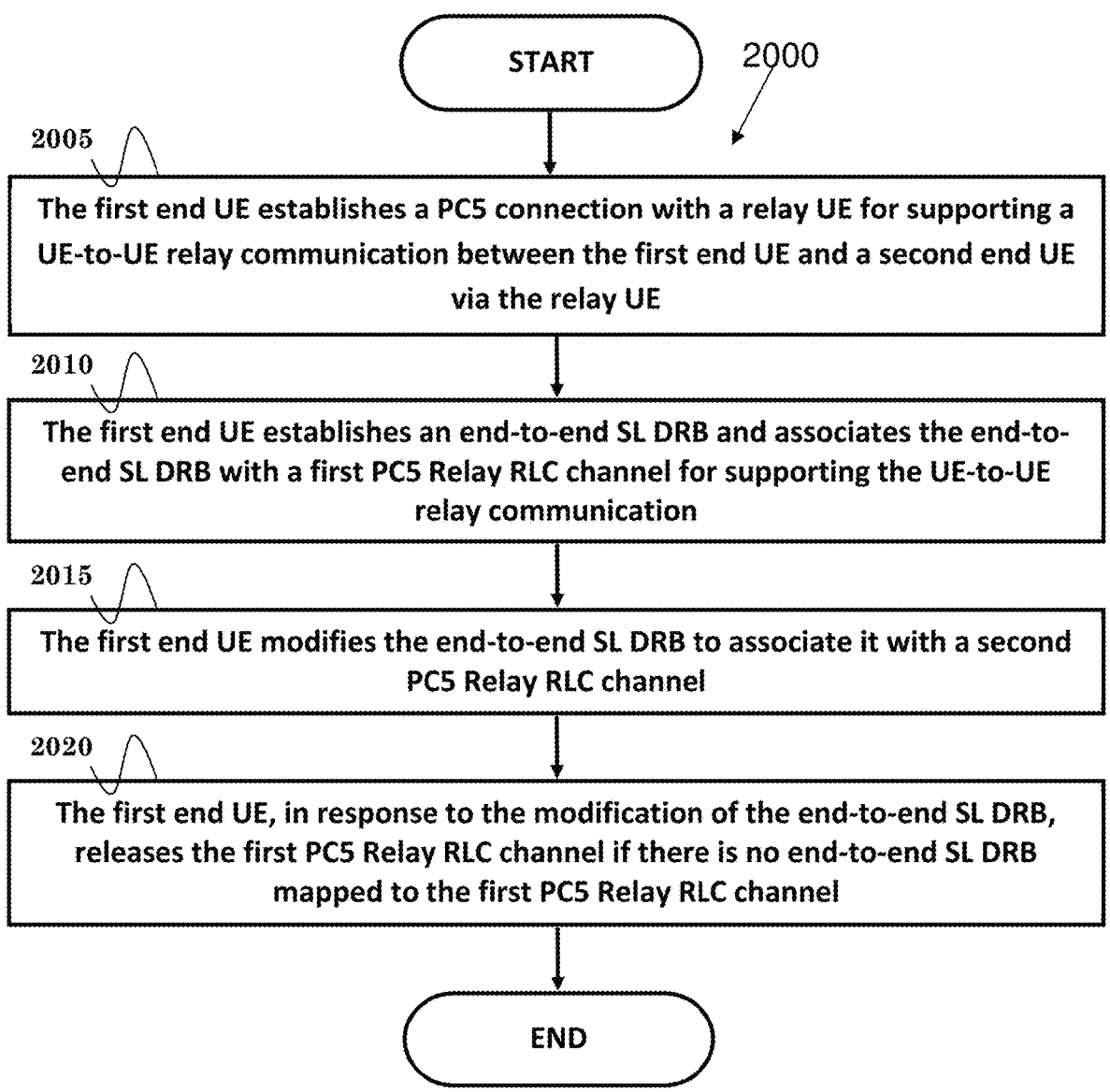
FIG. 20 is a flow chart according to one exemplary embodiment.

FIG. 20 is a flow chart 2000 for a first end User Equipment (UE). In step 2005, the first end UE establishes a PC5 connection with a relay UE for supporting a UE-to-UE relay communication between the first end UE and a second end UE via the relay UE. In step 2010, the first end UE establishes an end-to-end SL DRB and associates the end-to-end SL DRB with a first PC5 Relay RLC channel for supporting the UE-to-UE relay communication. In step 2015, the first end UE modifies the end-to-end SL DRB to associate it with a second PC5 Relay RLC channel. In step 2020, the first end UE, in response to the modification of the end-to-end SL DRB, releases the first PC5 Relay RLC channel if there is no end-to-end SL DRB mapped to the first PC5 Relay RLC channel.

In one embodiment, the first end UE could receive a first system information in a first cell, wherein the first system information includes information used for deriving a configuration of the first PC5 Relay RLC channel. The first end UE could receive a second system information in the first cell or a second cell, wherein the second system information includes information used for deriving a configuration of the second PC5 Relay RLC channel. The first end UE could send a first PC5-RRC message to the relay UE for establishing the first PC5 Relay RLC channel in response to reception of the first system information. The first end UE could send a second PC5-RRC message to the relay UE for modifying the first PC5 Relay RLC channel in response to reception of the second system information.

In one embodiment, the first/second system information could be SIB12. The first end UE could be in RRC_IDLE or RRC_INACTIVE. The first/second PC5-RRC message could be a RRCReconfigurationSidelink message.

Referring back to FIGS. 3 and 4, in one exemplary embodiment from the perspective of a first end UE. The first end UE 300 includes a program code 312 stored in the memory 310. The CPU 308 could execute program code 312 to enable the first end UE (i) to establish a PC5 connection with a relay UE for supporting a UE-to-UE relay communication between the first end UE and a second end UE via the relay UE, (ii) to establish an end-to-end SL DRB and associates the end-to-end SL DRB with a first PC5 Relay RLC channel for supporting the UE-to-UE relay communication, (iii) to modify the end-to-end SL DRB to associate it with a second PC5 Relay RLC channel, and (iv) to release, in response to the modification of the end-to-end SL DRB, the first PC5 Relay RLC channel if there is no end-to-end SL DRB mapped to the first PC5 Relay RLC channel. Furthermore, the CPU 308 can execute the program code 312 to perform all of the above-described actions and steps or others described herein.

On the other hand, the relay UE may establish a third PC5 Relay RLC channel (on second hop) for serving the first E2E SL DRB and establish a fourth PC5 Relay RLC channel (on second hop) for serving the second E2E SL DRB for transmission from the relay UE to the target end UE. If one of above scenarios occurs, the relay UE may reconfigure one PC5 Relay RLC channel (e.g. the fourth PC5 Relay RLC channel) for serving the first E2E SL DRB and the second E2E SL DRB and thus the useless PC5 Relay RLC channel (e.g. the third PC5 Relay RLC channel) should be released. This scenario is not covered in in the 3GPP email discussion [Post125][402][Relay] 38.331 Rel-18 relay CR (Huawei) since there is no condition for triggering PC5 Relay RLC channel release in case of SIB12 change. Similarly, if the relay UE is implemented based on in the 3GPP email discussion [Post125][402][Relay] 38.331 Rel-18 relay CR (Huawei), it would not release the useless PC5 Relay RLC channel and thus would cause UE memory consumption.

To address the issue, an example of text proposal for L2 U2U Relay UE on top of in the 3GPP email discussion [Post125][402][Relay] 38.331 Rel-18 relay CR (Huawei) could be illustrated below. That is, in response to remapping the first E2E SL DRB from the third PC5 Relay RLC channel to the fourth PC5 Relay RLC channel (due to e.g. SIB12 or SidelinkPreconfigNR), the relay UE may perform the PC5 Relay RLC channel release for releasing the third PC5 Relay RLC channel if there is no other end-to-end sidelink DRB(s) associated with the third PC5 Relay RLC channel.

5.8.9.7.1 PC5 Relay RLC Channel Release

The UE shall:
1> if the PC5 Relay RLC channel release was triggered after the reception of the RRCReconfigurationSidelink message; or
1> after receiving the RRCReconfigurationCompleteSidelink message, if the PC5 Relay RLC channel release was triggered due to the configuration received within the sl-ConfigDedicatedNR or derived from SIB12 or SidelinkPreconfigNR:
   2> for each SL-RLC-ChannelID in sl-RLC-ChannelToReleaseList received in sl-ConfigDedicatedNR within RRCReconfiguration, or for each SL-RLC-ChannelID included in the received sl-RLC-ChannelToReleaseListPC5 that is part of the current UE sidelink configuration:
      3> release the RLC entity and the corresponding logical channel associated with the SL-RLC-ChannelID;
1> if the PC5 Relay RLC channel release was triggered by end-to-end DRB release as specified in 5.8.9.1a.1.2:
   2> release the RLC entity and the corresponding logical channel;
1> if the PC5 Relay RLC channel release was triggered for a specific destination by upper layers as specified in 5.8.9.5, or due to sidelink RLF as specified in 5.8.9.3:
   2> release the RLC entity and the corresponding logical channel associated with the SL-RLC-ChannelID of the specific destination;
[ . . . ]

Figure 21:
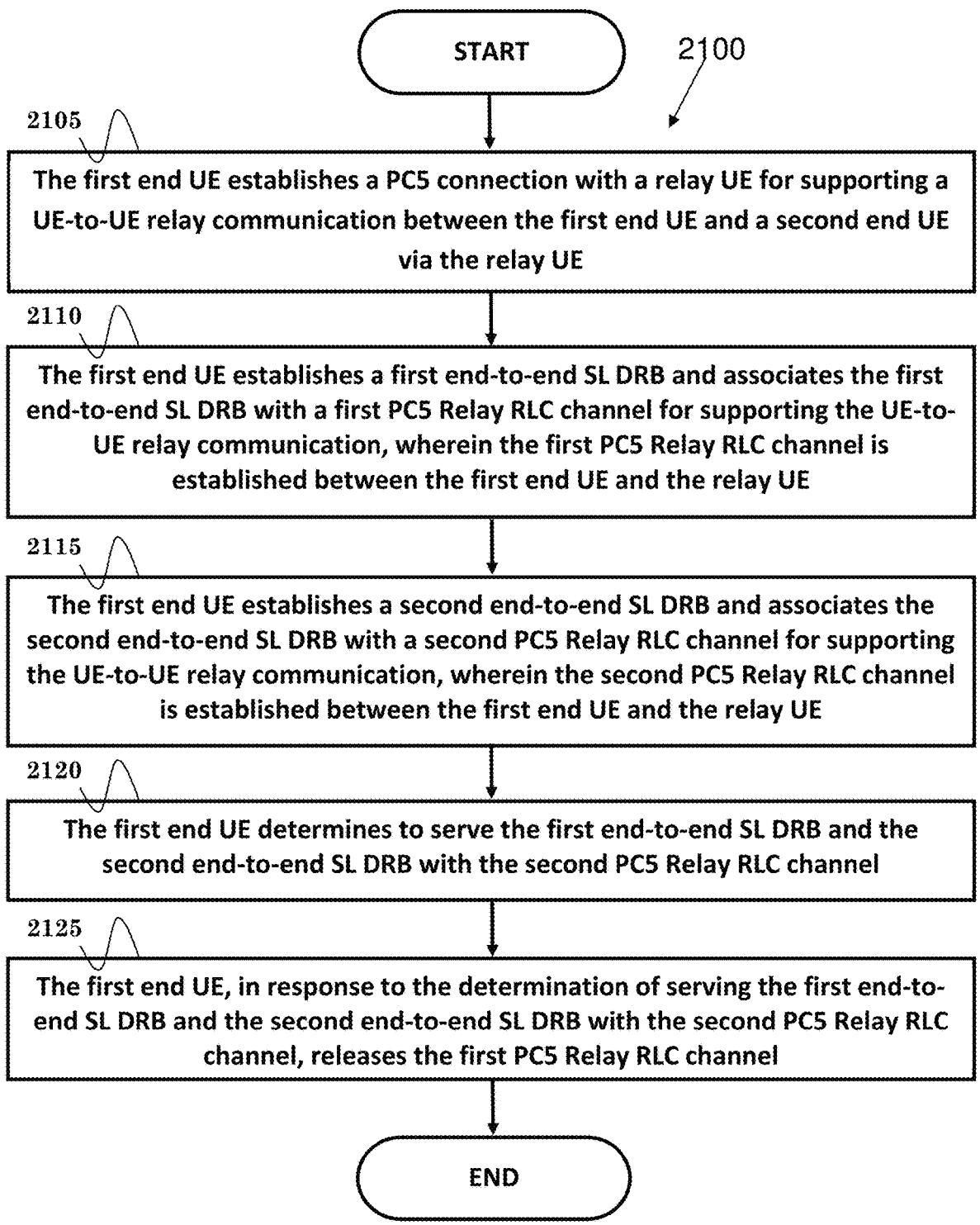
FIG. 21 is a flow chart according to one exemplary embodiment.

5.8.9.1.2 Actions Related to Transmission of RRCReconfigurationSidelink Message The UE shall set the contents of RRCReconfigurationSidelink message as follows:
<omitted>
1> for each PC5 Relay RLC channel that is to be released due to configuration by sl-ConfigDedicatedNR:
   2> set the SL-RLC-ChannelID corresponding to the PC5 Relay RLC channel in the sl-RLC-ChannelToReleaseListPC5;
<omitted>
1> if the UE is acting as L2 U2U Remote UE (i.e. Tx UE) and is in RRC_IDLE or in RRC_INACTIVE or out of coverage, and the procedure is initiated to release the first hop PC5 Relay RLC channel of an end-to-end sidelink DRB to the connected L2 U2N Relay UE (i.e. Rx UE) according to clause 5.8.9.7.1; or
1> if the UE is acting as L2 U2U Relay UE (i.e. Tx UE) and is in RRC_IDLE or in RRC_INACTIVE or out of coverage, and the procedure is initiated to release the second hop PC5 Relay RLC channel of an end-to-end sidelink DRB to the connected L2 U2N Remote UE (i.e. Rx UE) according to clause 5.8.9.7.1:
   2> set the SL-RLC-ChannelID corresponding to the PC5 Relay RLC channel in the sl-RLC-ChannelToReleaseListPC5, if there is no other end-to-end sidelink DRB(s) associated with this PC5 Relay RLC channel;

FIG. 21 is a flow chart 2100 for a first end User Equipment (UE). In step 2105, the first end UE establishes a PC5 connection with a relay UE for supporting a UE-to-UE relay communication between the first end UE and a second end UE via the relay UE. In step 2110, the first end UE establishes a first end-to-end Sidelink (SL) Data Radio Bearer (DRB) and associates the first end-to-end SL DRB with a first PC5 Relay Radio Link Control (RLC) channel for supporting the UE-to-UE relay communication, wherein the first PC5 Relay RLC channel is established between the first end UE and the relay UE. In step 2115, the first end UE establishes a second end-to-end SL DRB and associates the second end-to-end SL DRB with a second PC5 Relay RLC channel for supporting the UE-to-UE relay communication, wherein the second PC5 Relay RLC channel is established between the first end UE and the relay UE. In step 2120, the first end UE determines to serve the first end-to-end SL DRB and the second end-to-end SL DRB with the second PC5 Relay RLC channel. In step 2125, the first end UE, in response to the determination of serving the first end-to-end SL DRB and the second end-to-end SL DRB with the second PC5 Relay RLC channel, releases the first PC5 Relay RLC channel.

In one embodiment, the first end-to-end SL DRB and the second end-to-end SL DRB could be established between the first end UE and the second end UE. The second PC5 Relay RLC channel could still be associated with the second end-to-end SL DRB after the determination of serving the first end-to-end SL DRB and the second end-to-end SL DRB with the second PC5 Relay RLC channel.

In one embodiment, the second PC5 Relay RLC channel could be established for serving the second end-to-end SL DRB based on a first system information, and could be determined for serving the first end-to-end SL DRB and the second end-to-end SL DRB based on a second system information or a pre-configuration or could be derived from the second system information or the pre-configuration to serve the first end-to-end SL DRB and the second end-to-end SL DRB. The second PC5 Relay RLC channel could be established for serving the second end-to-end SL DRB based on a pre-configuration, and could be determined for serving the first end-to-end SL DRB and the second end-to-end SL DRB based on a system information or could be derived from the system information to serve the first end-to-end SL DRB and the second end-to-end SL DRB.

In one embodiment, the PC5 connection could be a layer-2 link, a unicast link or a PC5 Radio Resource Control (RRC) connection. The (first/second) system information could be a SIB12.

Referring back to FIGS. 3 and 4, in one exemplary embodiment from the perspective of a first end UE. The first end UE 300 includes a program code 312 stored in the memory 310. The CPU 308 could execute program code 312 to enable the first end UE (i) to establish a PC5 connection with a relay UE for supporting a UE-to-UE relay communication between the first end UE and a second end UE via the relay UE, (ii) to establish a first end-to-end SL DRB and associate the first end-to-end SL DRB with a first PC5 Relay RLC channel for supporting the UE-to-UE relay communication, wherein the first PC5 Relay RLC channel is established between the first end UE and the relay UE, (iii) to establish a second end-to-end SL DRB and associate the second end-to-end SL DRB with a second PC5 Relay RLC channel for supporting the UE-to-UE relay communication, wherein the second PC5 Relay RLC channel is established between the first end UE and the relay UE, (iv) to determine to serve the first end-to-end SL DRB and the second end-to-end SL DRB with the second PC5 Relay RLC channel, and (v) to release, in response to the determination of serving the first end-to-end SL DRB and the second end-to-end SL DRB with the second PC5 Relay RLC channel, the first PC5 Relay RLC channel. Furthermore, the CPU 308 can execute the program code 312 to perform all of the above-described actions and steps or others described herein.

Figure 22:
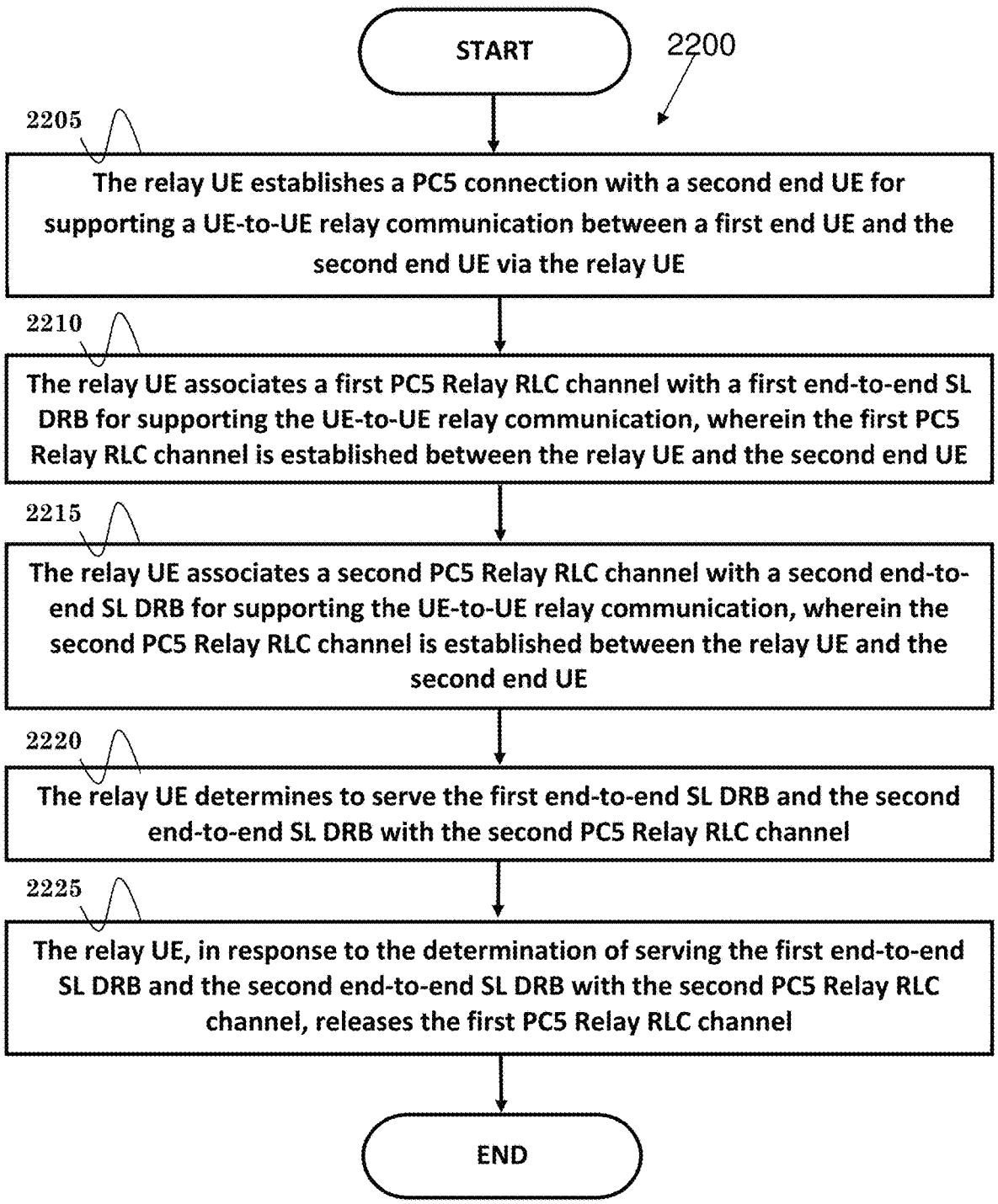
FIG. 22 is a flow chart according to one exemplary embodiment.

FIG. 22 is a flow chart 2200 for a relay User Equipment (UE). In step 2205, the relay UE establishes a PC5 connection with a second end UE for supporting a UE-to-UE relay communication between a first end UE and the second end UE via the relay UE. In step 2210, the relay UE associates a first PC5 Relay Radio Link Control (RLC) channel with a first end-to-end Sidelink (SL) Data Radio Bearer (DRB) for supporting the UE-to-UE relay communication, wherein the first PC5 Relay RLC channel is established between the relay UE and the second end UE. In step 2215, the relay UE associates a second PC5 Relay RLC channel with a second end-to-end SL DRB for supporting the UE-to-UE relay communication, wherein the second PC5 Relay RLC channel is established between the relay UE and the second end UE. In step 2220, the relay UE determines to serve the first end-to-end SL DRB and the second end-to-end SL DRB with the second PC5 Relay RLC channel. In step 2225, the relay UE, in response to the determination of serving the first end-to-end SL DRB and the second end-to-end SL DRB with the second PC5 Relay RLC channel, releases the first PC5 Relay RLC channel.

In one embodiment, the second PC5 Relay RLC channel could still be associated with the second end-to-end SL DRB after the modification of the second PC5 Relay RLC channel. The second PC5 Relay RLC channel could be established for serving the second end-to-end SL DRB based on a first system information and is determined for serving the first end-to-end SL DRB and the second end-to-end SL DRB based on a second system information or a pre-configuration or could be derived from the second system information or the pre-configuration to serve the first end-to-end SL DRB and the second end-to-end SL DRB. The second PC5 Relay RLC channel could be established for serving the second end-to-end SL DRB based on a pre-configuration and is determined for serving the first end-to-end SL DRB and the second end-to-end SL DRB based on a system information or could be derived from the system information to serve the first end-to-end SL DRB and the second end-to-end SL DRB.

In one embodiment, the PC5 connection could be a layer-2 link, a unicast link or a PC5 Radio Resource Control (RRC) connection. The (first/second) system information could be a SIB12.

Referring back to FIGS. 3 and 4, in one exemplary embodiment from the perspective of a first end UE. The first end UE 300 includes a program code 312 stored in the memory 310. The CPU 308 could execute program code 312 to enable the first end UE (i) to establish a PC5 connection with a second end UE for supporting a UE-to-UE relay communication between a first end UE and the second end UE via the relay UE, (ii) to associate a first PC5 RLC channel with a first end-to-end SL DRB for supporting the UE-to-UE relay communication, wherein the first PC5 Relay RLC channel is established between the relay UE and the second end UE, (iii) to associate a second PC5 Relay RLC channel with a second end-to-end SL DRB for supporting the UE-to-UE relay communication, wherein the second PC5 Relay RLC channel is established between the relay UE and the second end UE, (iv) to determine to serve the first end-to-end SL DRB and the second end-to-end SL DRB with the second PC5 Relay RLC channel, and (v) to release, in response to the determination of serving the first end-to-end SL DRB and the second end-to-end SL DRB with the second PC5 Relay RLC channel, the first PC5 Relay RLC channel. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first end User Equipment (UE), comprising:
    the first end UE establishes a PC5 connection with a relay UE for supporting a UE-to-UE relay communication between the first end UE and a second end UE via the relay UE;
    the first end UE establishes a first end-to-end Sidelink (SL) Data Radio Bearer (DRB) and associates the first end-to-end SL DRB with a first PC5 Relay Radio Link Control (RLC) channel for supporting the UE-to-UE relay communication, wherein the first PC5 Relay RLC channel is established between the first end UE and the relay UE;
    the first end UE establishes a second end-to-end SL DRB and associates the second end-to-end SL DRB with a second PC5 Relay RLC channel for supporting the UE-to-UE relay communication, wherein the second PC5 Relay RLC channel is established between the first end UE and the relay UE;
    the first end UE determines to serve the first end-to-end SL DRB and the second end-to-end SL DRB with the second PC5 Relay RLC channel; and
    the first end UE, in response to the determination of serving the first end-to-end SL DRB and the second end-to-end SL DRB with the second PC5 Relay RLC channel, releases the first PC5 Relay RLC channel.

2. The method of claim 1, wherein the first end-to-end SL DRB and the second end-to-end SL DRB are established between the first end UE and the second end UE.

3. The method of claim 1, wherein the second PC5 Relay RLC channel is still associated with the second end-to-end SL DRB after the determination of serving the first end-to-end SL DRB and the second end-to-end SL DRB with the second PC5 Relay RLC channel.

4. The method of claim 1, wherein the second PC5 Relay RLC channel is established for serving the second end-to-end SL DRB based on a first system information and is determined for serving the first end-to-end SL DRB and the second end-to-end SL DRB based on a second system information or a pre-configuration or is derived from the second system information or the pre-configuration to serve the first end-to-end SL DRB and the second end-to-end SL DRB, and/or wherein the first/second system information is a SIB12.

5. The method of claim 1, wherein the second PC5 Relay RLC channel is established for serving the second end-to-end SL DRB based on a pre-configuration and is determined for serving the first end-to-end SL DRB and the second end-to-end SL DRB based on a system information or is derived from the system information to serve the first end-to-end SL DRB and the second end-to-end SL DRB.

6. The method of claim 5, wherein the system information is a SIB12.

7. The method of claim 1, wherein the PC5 connection is a layer-2 link, a unicast link or a PC5 Radio Resource Control (RRC) connection.

8. A first end User Equipment (UE), comprising:
a control circuit;
a processor installed in the control circuit; and
a memory installed in the control circuit and operatively coupled to the processor;
wherein the processor is configured to execute a program code stored in the memory to:
establish a PC5 connection with a relay UE for supporting a UE-to-UE relay communication between the first end UE and a second end UE via the relay UE;
establish a first end-to-end Sidelink (SL) Data Radio Bearer (DRB) and associate the first end-to-end SL DRB with a first PC5 Relay Radio Link Control (RLC) channel for supporting the UE-to-UE relay communication, wherein the first PC5 Relay RLC channel is established between the first end UE and the relay UE;
establish a second end-to-end SL DRB and associate the second end-to-end SL DRB with a second PC5 Relay RLC channel for supporting the UE-to-UE relay communication, wherein the second PC5 Relay RLC channel is established between the first end UE and the relay UE;
determine to serve the first end-to-end SL DRB and the second end-to-end SL DRB with the second PC5 Relay RLC channel; and
release, in response to the determination of serving the first end-to-end SL DRB and the second end-to-end SL DRB with the second PC5 Relay RLC channel, the first PC5 Relay RLC channel.

9. The first end UE of claim 8, wherein the first end-to-end SL DRB and the second end-to-end SL DRB are established between the first end UE and the second end UE.

10. The first end UE of claim 8, wherein the second PC5 Relay RLC channel is still associated with the second end-to-end SL DRB after the determination of serving the first end-to-end SL DRB and the second end-to-end SL DRB with the second PC5 Relay RLC channel.

11. The first end UE of claim 8, wherein the second PC5 Relay RLC channel is established for serving the second end-to-end SL DRB based on a first system information and is determined for serving the first end-to-end SL DRB and the second end-to-end SL DRB based on a second system information or a pre-configuration or is derived from the second system information or the pre-configuration to serve the first end-to-end SL DRB and the second end-to-end SL DRB, and/or wherein the first/second system information is a SIB12.

12. The first end UE of claim 8, wherein the second PC5 Relay RLC channel is established for serving the second end-to-end SL DRB based on a pre-configuration and is determined for serving the first end-to-end SL DRB and the second end-to-end SL DRB based on a system information or is derived from the system information to serve the first end-to-end SL DRB and the second end-to-end SL DRB.

13. The first end UE of claim 12, wherein the system information is a SIB12.

14. The first end UE of claim 8, wherein the PC5 connection is a layer-2 link, a unicast link or a PC5 Radio Resource Control (RRC) connection.

15. A method for a relay User Equipment UE, comprising:
the relay UE establishes a PC5 connection with a second end UE for supporting a UE-to-UE relay communication between a first end UE and the second end UE via the relay UE;
the relay UE associates a first PC5 Relay Radio Link Control (RLC) channel with a first end-to-end Sidelink (SL) Data Radio Bearer (DRB) for supporting the UE-to-UE relay communication, wherein the first PC5 Relay RLC channel is established between the relay UE and the second end UE;
the relay UE associates a second PC5 Relay RLC channel with a second end-to-end SL DRB for supporting the UE-to-UE relay communication, wherein the second PC5 Relay RLC channel is established between the relay UE and the second end UE;
the relay UE determines to serve the first end-to-end SL DRB and the second end-to-end SL DRB with the second PC5 Relay RLC channel; and
the relay UE, in response to the determination of serving the first end-to-end SL DRB and the second end-to-end SL DRB with the second PC5 Relay RLC channel, releases the first PC5 Relay RLC channel.

16. The method of claim 15, wherein the second PC5 Relay RLC channel is still associated with the second end-to-end SL DRB after the modification of the second PC5 Relay RLC channel.

17. The method of claim 15, wherein the second PC5 Relay RLC channel is established for serving the second end-to-end SL DRB based on a first system information and is determined for serving the first end-to-end SL DRB and the second end-to-end SL DRB based on a second system information or a pre-configuration or is derived from the second system information or the pre-configuration to serve the first end-to-end SL DRB and the second end-to-end SL DRB, and/or wherein the first/second system information is a SIB12.

18. The method of claim 15, wherein the second PC5 Relay RLC channel is established for serving the second end-to-end SL DRB based on a pre-configuration and is determined for serving the first end-to-end SL DRB and the second end-to-end SL DRB based on a system information or is derived from the system information to serve the first end-to-end SL DRB and the second end-to-end SL DRB.

19. The method of claim 18, wherein the system information is a SIB12.

20. The method of claim 15, wherein the PC5 connection is a layer-2 link, a unicast link or a PC5 Radio Resource Control (RRC) connection.

* * * * *